Dec. 20, 1960 R. C. AVERY 2,965,718
TRANSLATOR CIRCUIT
Filed April 18, 1958 31 Sheets-Sheet 1

INVENTOR
R. C. AVERY
BY
Donald M. Sluft
ATTORNEY

Dec. 20, 1960 R. C. AVERY 2,965,718

TRANSLATOR CIRCUIT

Filed April 18, 1958 31 Sheets-Sheet 2

INVENTOR
R. C. AVERY
BY
Donald M Duft
ATTORNEY

Dec. 20, 1960 R. C. AVERY 2,965,718

TRANSLATOR CIRCUIT

Filed April 18, 1958 31 Sheets-Sheet 3

INVENTOR
R. C. AVERY
BY
Donald M. Duft
ATTORNEY

Dec. 20, 1960 R. C. AVERY 2,965,718
TRANSLATOR CIRCUIT
Filed April 18, 1958 31 Sheets-Sheet 4

INVENTOR
R. C. AVERY
BY
Donald M Duft
ATTORNEY

Dec. 20, 1960 R. C. AVERY 2,965,718

TRANSLATOR CIRCUIT

Filed April 18, 1958 31 Sheets-Sheet 5

INVENTOR
R. C. AVERY
BY Donald M Duft
ATTORNEY

Dec. 20, 1960 R. C. AVERY 2,965,718

TRANSLATOR CIRCUIT

Filed April 18, 1958 31 Sheets-Sheet 6

INVENTOR
R. C. AVERY
BY
Donald M. Duft
ATTORNEY

Dec. 20, 1960 R. C. AVERY 2,965,718

TRANSLATOR CIRCUIT

Filed April 18, 1958 31 Sheets-Sheet 7

INVENTOR
R. C. AVERY
BY
Donald M Duft
ATTORNEY

Dec. 20, 1960

R. C. AVERY 2,965,718

TRANSLATOR CIRCUIT

Filed April 18, 1958

31 Sheets-Sheet 8

INVENTOR
R. C. AVERY
BY
Donald M. Duft
ATTORNEY

Dec. 20, 1960

R. C. AVERY

TRANSLATOR CIRCUIT 2,965,718

Filed April 18, 1958

31 Sheets-Sheet 9

INVENTOR
R. C. AVERY
BY
Donald M. Duft
ATTORNEY

Dec. 20, 1960 R. C. AVERY 2,965,718

TRANSLATOR CIRCUIT

Filed April 18, 1958 31 Sheets-Sheet 10

INVENTOR
R. C. AVERY
BY
Donald M Duft
ATTORNEY

Dec. 20, 1960 | R. C. AVERY | 2,965,718

TRANSLATOR CIRCUIT

Filed April 18, 1958 | 31 Sheets-Sheet 11

INVENTOR
R. C. AVERY

BY Donald M Duft
ATTORNEY

Dec. 20, 1960

R. C. AVERY

TRANSLATOR CIRCUIT 2,965,718

Filed April 18, 1958

31 Sheets-Sheet 12

INVENTOR
R. C. AVERY
BY
Donald M Duft
ATTORNEY

INVENTOR
R. C. AVERY
BY
Donald M Duft
ATTORNEY

Dec. 20, 1960

R. C. AVERY

TRANSLATOR CIRCUIT 2,965,718

Filed April 18, 1958

31 Sheets-Sheet 14

INVENTOR
R. C. AVERY
BY Donald M. Duft
ATTORNEY

INVENTOR
R. C. AVERY
BY Donald M Duft
ATTORNEY

Dec. 20, 1960 R. C. AVERY 2,965,718

TRANSLATOR CIRCUIT

Filed April 18, 1958 31 Sheets-Sheet 16

INVENTOR
R. C. AVERY
BY Donald M Duft
ATTORNEY

Dec. 20, 1960 R. C. AVERY 2,965,718

TRANSLATOR CIRCUIT

Filed April 18, 1958 31 Sheets-Sheet 17

INVENTOR
R. C. AVERY
BY
Donald M Duft
ATTORNEY

Dec. 20, 1960 R. C. AVERY 2,965,718

TRANSLATOR CIRCUIT

Filed April 18, 1958 31 Sheets-Sheet 18

INVENTOR
R. C. AVERY
BY Donald M Duft
ATTORNEY

Dec. 20, 1960 R. C. AVERY 2,965,718

TRANSLATOR CIRCUIT

Filed April 18, 1958 31 Sheets-Sheet 19

INVENTOR
R. C. AVERY

BY Donald M. Duft

ATTORNEY

Dec. 20, 1960

R. C. AVERY

TRANSLATOR CIRCUIT 2,965,718

Filed April 18, 1958

31 Sheets-Sheet 20

INVENTOR
R. C. AVERY
BY
Donald M Duft
ATTORNEY

Dec. 20, 1960 R. C. AVERY 2,965,718

TRANSLATOR CIRCUIT

Filed April 18, 1958 31 Sheets-Sheet 21

INVENTOR
R. C. AVERY

BY
Donald M Duft
ATTORNEY

Dec. 20, 1960 R. C. AVERY 2,965,718

TRANSLATOR CIRCUIT

Filed April 18, 1958 31 Sheets-Sheet 22

INVENTOR
R. C. AVERY
BY
Donald M Duft
ATTORNEY

Dec. 20, 1960 R. C. AVERY 2,965,718

TRANSLATOR CIRCUIT

Filed April 18, 1958 31 Sheets-Sheet 23

INVENTOR
R. C. AVERY
BY
Donald M Duft
ATTORNEY

Dec. 20, 1960 R. C. AVERY 2,965,718

TRANSLATOR CIRCUIT

Filed April 18, 1958 31 Sheets-Sheet 24

INVENTOR
R. C. AVERY

BY

Donald M Duft

ATTORNEY

Dec. 20, 1960 R. C. AVERY 2,965,718

TRANSLATOR CIRCUIT

Filed April 18, 1958

31 Sheets-Sheet 25

INVENTOR
R. C. AVERY

BY Donald M Duft

ATTORNEY

Dec. 20, 1960

R. C. AVERY

TRANSLATOR CIRCUIT 2,965,718

Filed April 18, 1958

31 Sheets-Sheet 26

INVENTOR
R. C. AVERY
BY
Donald M Duft
ATTORNEY

Dec. 20, 1960 R. C. AVERY 2,965,718

TRANSLATOR CIRCUIT

Filed April 18, 1958 31 Sheets-Sheet 27

INVENTOR
R. C. AVERY

BY Donald M Duft

ATTORNEY

INVENTOR
R. C. AVERY
BY
Donald M Duft
ATTORNEY

Dec. 20, 1960 R. C. AVERY 2,965,718

TRANSLATOR CIRCUIT

Filed April 18, 1958 31 Sheets-Sheet 29

INVENTOR
R. C. AVERY
BY
Donald M Duft
ATTORNEY

INVENTOR
R. C. AVERY
BY
Donald M Duft
ATTORNEY

Dec. 20, 1960 R. C. AVERY 2,965,718

TRANSLATOR CIRCUIT

Filed April 18, 1958 31 Sheets-Sheet 31

INVENTOR
R. C. AVERY
BY
Donald M. Duft
ATTORNEY

United States Patent Office 2,965,718

Patented Dec. 20, 1960

2,965,718

TRANSLATOR CIRCUIT

Robert C. Avery, Jackson Heights, N.Y., assignor to Bell Telephone Laboratories, Incorporated, New York, N.Y., a corporation of New York Filed Apr. 18, 1958, Ser. No. 729,280

19 Claims. (Cl. 179—18)

This invention pertains to a translator and, more specifically, to a translator which, in response to the receipt of information pertaining to the originating and terminating offices involved in a telephone call, derives certain charging and billing information for the call.

One of the main objectives of the present-day switching art is to extend the customer's dialing range so that ultimately he will be able to dial a call to any telephone in the country in much the same way that he now dials local calls. Several steps toward this goal have already been taken. A fundamental plan for automatic toll switching has been adopted which involves, among other things, a nationwide numbering plan covering the United States and Canada. In accordance with this plan, each customer is given a distinctive 10 digit designation which consists of a 3 digit regional or area code, a 3 digit central office code, and a 4 digit customer's number. In many parts of the country, automatic toll switching systems now enable operators to complete a large percentage of all toll calls by dialing directly to the called telephones. In order that customers may use these toll switching systems to dial their own toll calls, some automatic means for recording the necessary billing information on such calls must be provided.

The automatic message accounting system (AMA) was developed by the Bell System for this purpose. In central offices having this equipment, all of the data required for billing of customer-dialed calls are automatically perforated in code on paper tapes. These tapes are taken to an accounting center where they are processed by suitable machines to produce customer bills.

The information for each call is recorded on the tape in three stages or entries. The initial entry is recorded after the customer has finished dialing. One time entry, called the answer entry, is recorded when the conversation starts, while another time entry, called the disconnect entry, is recorded when the conversation ends. For short haul calls that are to be billed on a message unit basis, the initial entry contains only the calling office code and telephone number, together with the charging rate. This information, together with the duration of the call is sufficient for determining the charges. On toll calls, the initial entry also includes the called subscriber's office and telephone number.

The AMA system enables a subscriber to dial directly to points outside his local area by automatically recording all the necessary billing information. This equipment can only be installed in central offices where the dial traffic to charge points is sufficiently heavy to warrant the investment required for its installation. There are, however, many offices in areas where such traffic is relatively light and where the installation of AMA equipment would not be economical; but customers in these regions, too, should be offered the benefits of direct dialing to long distance or to multicharge points. The solution to this problem is to centralize the machinery for recording the charging information; that is, to make one AMA installation serve a number of low traffic areas and thus, gather into the dialing network many stations that were previously thought to be outside the economical range of extended customer dialing because of the expense of local AMA equipment. Installations of this type are referred to as CAMA centers. CAMA (centralized automatic message accounting) can also be installed in areas served by local AMA offices to extend the dialing range of four-party customers who are not, as yet, served by local AMA equipment due to the problem of identifying the calling party. The identity of a calling subscriber on a four-party line is orally ascertained at the CAMA office. When the amount of traffic that can be handled by one CAMA unit is considered, its installation cost can be justified more easily.

For a more complete description of a CAMA switching center, reference is made to an article entitled "Centralized Automatic Message Accounting," by M. E. Maloney, on pp. 241 through 243 of the Bell Laboratories Record of July 1954, and to an article by G. V. King entitled "Centralized Automatic Message Accounting System," on pp. 1331–1342 of the Bell System Technical Journal of November 1954. These two articles, together with the references cited therein, adequately describe, for the purposes of this specification, the facilities of a typical CAMA switching center. Although the present specification is in no way dependent upon the two aforementioned articles for its completeness, these articles do contain helpful background information describing the general location and nature of the switching system of which the present invention is a part.

The present invention pertains to a translator which comprises that portion of the CAMA switching center equipment known as the billing indexer. A brief functional description of a prior art billing indexer is contained in an article entitled "CAMA: Transverter and Billing Indexer" by R. P. Foltz and G. F. Sohnle on pp. 267 through 270 of the Bell Laboratories Record of July 1955 and in an article entitled "The Full Stature of the Crossbar Tandem Switching System," by J. Meszar, on pp. 486 through 496 of Communications and Electronics of September 1956. The billing indexer described in these articles is also disclosed in the Breed et al. Patent No. 2,848,543, issued August 19, 1958, and entitled, "Centralized Automatic Message Accounting (CAMA) For Tandem Offices Using Operator Identification."

The billing indexer was a new control unit specifically designed for CAMA switching centers and as such has two significant functions. The first is to determine the charging plan or rate (but not the cost) applicable to each call. The second function is to determine the type of initial entry that should be perforated on the AMA tape for each call. For most calls which are billed on a message unit basis, the billing indexer signals the transverter that a bulk-billed initial entry is to be perforated. This entry contains only the calling office code and telephone number, together with the charging rate. For toll calls and for short haul calls for which extra information is desired, the billing indexer signals the transverter that a toll statement type of initial entry is to be perforated which contains all the information of the bulk-billed initial entry plus the called subscriber's number.

The most significant function of this circuit is to determine the charging plan applicable to each call. For bulk-billed calls it assigns one of 8 digits (1 through 8) as the message billing index, depending on the calling and called offices. Each message billing index digit 1 through 8 represents a specific combination of the following four parameters:

(1) The number of minutes allotted for the initial conversation.

(2) The number of message units chargeable for this initial period.

(3) The number of minutes allotted for each overtime conversation.

(4) The number of message units chargeable for each overtime.

For detailed billed calls (usual toll calls) the billing indexer assigns the digit 9 as the message billing index irrespective of the origin of the calling office or the destination of the called office. A separate billing index digit of 0 is assigned to nonchargeable test calls.

In local AMA offices the message billing index is relatively easy to obtain as it is almost solely a function of the terminating office. In tandem offices, however, the complexity of obtaining this index is multiplied by the large number of originating central offices which may be in different numbering areas and by extensive bulk-billed tandem terminating coverage. While the billing indexer is an intricate circuit, in principle it is straight forward. Technically, it is a multistage selecting circuit for choosing one of eight billing indices for each combination of 20 originating and 60 terminating rate treatments.

The billing indexer comprising the subject-matter of this invention performs the same overall function as does the billing indexer known heretofore. However, outside of furnishing similar information, the present billing indexer is completely new and different. It utilizes new and improved circuits together with new and improved components which, when combined into an operating unit, result in a more compact and more economical billing indexer.

It is therefore an object of the invention to provide a new and improved translator.

It is a further object of the invention to provide a new and improved translator for supplying charging and billing information pertaining to telephone calls.

It is a further object of the invention to provide a new and improved translator which, in response to information pertaining to the calling and called offices involved in a telephone call, supplies information pertaining to the charge for the call together with information indicating the manner in which the calling subscriber is to be billed for the call.

The distinctions between the present and the prior art billing indexer lie not so much in the nature of the output information produced therefrom as in the manner in which this information is produced and in the equipment used. Both billing indexers require input information identifying both the calling and called offices. In both, the input information pertaining to the calling office is fed to a circuit which produces an output indication uniquely identifying the calling office together with certain characteristics thereof for each call. These characteristics may include the area of origin, and the rate class. These are described in detail hereinafter.

In both billing indexers, the input information pertaining to the terminating or called office for each call is fed to a circuit, the output of which uniquely identifies the called office. In the prior billing indexer, the output information identifying the calling office and its characteristics is applied to a first translator circuit which derives information known as the originating rate treatment. The originating rate treatment is dependent only on the calling office and its characteristics for a particular call and represents the manner in which all calls from this office having these characteristics are to be charged. The output information identifying the called office is fed to a second translator circuit which produces an output indication known as the terminating rate treatment. The terminating rate treatment represents a certain charge pattern for all calls to an office regardless of their origin. The outputs of these two translators is fed to a third translator which derives the message billing index for the call.

In summary, insofar as the prior art billing indexer is concerned, it may be seen that it has three separate translator circuits. The first one produces the originating rate treatment. The second produces the terminating rate treatment, while the third receives as its input information the output of the first two translators and, in response thereto, produces the message billing index.

The present billing indexer furnishes similar output information. However, it does so in a manner that requires much less equipment and therefore results in a far more compact and inexpensive component. It uses a single translator a plurality of times for bulk-billed and toll calls, instead of using a plurality of translators once. Also, it uses the translator only once for toll calls. Once an output indication is obtained unique to the calling office and its characteristics for a call, a translator is called in, which makes a first translation to determine the originating rate treatment. This information is entered and stored along with certain other items of information in a group of register relays. The translator is then released. Next, the output indication unique to the called office is fed to the same translator which makes a translation to determine the terminating rate treatment. This data is also stored in a group of register relays. The translator is then released. Next, the billing indexer takes the originating and terminating rate treatments which are now stored in the register relays, feeds them into the same translator which then derives the message billing index for this specific combination of the originating and terminating rate treatments.

In summary, it may be seen that the present billing indexer contains only one translator which is used three times during bulk-billed calls. It first receives information identifying the calling office and its characteristics to produce the originating rate treatment and other information. Secondly, it receives information identifying the called office to produce the terminating rate treatment. It then receives as input information the terminating and originating rate treatments to produce the message billing index for the call. The feature of utilizing the same translator a plurality of times results in a considerable saving of equipment and space over that which would be required for three separate translators.

A feature of the invention is the utilization of a single translator a plurality of times during the processing of data pertaining to a single problem.

A further feature of the invention is the utilization of a single translator a plurality of times during the processing of information pertaining to a call.

A further feature of the invention is the utilization of a single translator to receive a first bit of information and produce a translated output therefrom, to receive a second bit of information and produce a second translated output therefrom, and then to accept as a third bit of information said first two translated outputs and from this produce a third output representing desired information.

The arrangement whereby a single translator is successively used a plurality of times is additionally advantageous in that it permits checking circuits to be used at the end of each translation to determine whether or not any further translations are necessary. The first translation performed by the billing indexer may be termed the originating office code translation since most of the input information for this translation pertains to the identification of the calling office together with its characteristics for this call. If this input information is partially defective, such as for example, if it represents a nonworking originating office, the billing indexer recognizes this fact and makes no further translations. Except, however, for area code calls, it proceeds with a second translation to check for vacant and denied terminating codes. Also, if the information received for the second translation and pertaining to the called office is defective, the billing indexer recognizes this situation and makes no third translation. This situation could arise when the calling subscriber erroneously dials a code which does not represent a working office.

The billing indexer makes three successive translations for most bulk-billed and test calls. Three translations are necessary in these cases since the billing indexer does not have sufficient information to compute the billing index until the end of the third translation. As is explained in detail hereinafter, only one, rather than three, translations are made for calls which are to be billed on a toll statement basis. Only one translation is needed on these calls since the billing indexer has produced all the information required by the transverter at the end of the first translation. This expedient allows the billing indexer to perform its function more quickly so that it may release and serve other calls.

It is a further feature of the invention to provide a billing indexer which normally makes three translations in processing a call, but which under certain situations may make fewer than three translations.

It is a further feature of the invention to provide a translator which, after making one translation, ascertains whether or not a further translation is to be made from the nature of the information derived during the first translation.

A further feature of the invention is the provision of a translator circuit which normally makes three successive translations upon the receipt of a plurality of items of information, but which ascertains from the results of each translation whether a succeeding translation is to be made.

A further feature of this invention is the provision of a billing indexer which normally makes three successive translations during the processing of a call, but which determines from the results of the first and second translations whether or not a third translation is to be made.

A further feature of the invention is the provision of a billing indexer which can make a plurality of translations during the processing of a call, but which makes only a single translation upon the recept of information signifying that the call is to be billed on a toll statement basis.

A further feature of the invention is the provision of a billing indexer which may make a plurality of translations during the processing of information pertaining to a call, but which makes only a single translation in the event that the information pertaining to the calling office is defective.

A further feature of the invention is the provision of a billing indexer which may make three translations during the processing of a call, but which makes only two translations in the event that the information received pertaining to the called office is defective.

The portion of the billing indexer, which is utilized successively for each translation, comprises a coil field having six groups of five coils each. Each coil has a cold cathode gas tube associated therewith. Wire jumpers are selectively threaded through the six groups of coils in accordance with the data that each jumper represents. When a surge of current is passed through each jumper, a potential is induced in the inductances through which it is threaded, which potentials cause the gas tubes associated therewith to fire and operate register relays.

Three groups of jumpers are threaded through the coils. A jumper in the first group is used during the first translation, one in the second group is used during the second translation, while one in the third is used for the third translation. The jumpers which are used during the first translation are connected to originating office code points, which points identify the calling office together with its characteristics for each call. For each call, a surge of current is passed through the jumper connected to the calling office code point. This current fires all the gas tubes associated with the inductors through which the energized jumper is threaded. The outputs of the fired gas tubes are connected by means of connector relays to a first series of register relays during the first translation to operate them and register the information derived at this time.

The second set of jumpers threaded through the coil field is used during the second translation when information pertaining to the called office is derived. Each jumper in this second group is connected to an individual terminating office code point which represents a particular terminating office. Therefore, each jumper is associated with and identifies a terminating office code which may appear in each of three areas. The current flowing through the jumper selected during the second translation fires the tubes associated with all the coils through which it is threaded. A second set of connector relays are operated during this translation to interconnect the outputs of the energized gas tubes representing the desired terminating office code in the desired terminating area with a second set of register relays to store the information derived during this translation.

Part of the information derived during the first translation comprises the originating rate treatment. The information derived from the second translation comprises the terminating rate treatment. The third translation is used to produce an output indication unique to the particular combination of originating and terminating rate treatments derived during the first and second translations. In the particular embodiment of the invention as disclosed herein, there may be a maximum of 20 originating and 60 terminating rate treatments. Therefore, there are 1200 (20×60) different combinations of originating and terminating rate treatments. In the present invention, a relay tree, the relays of which are operated under control of the originating and terminating rate treatments, provides 240 output terminals, each of which represents five different unique combinations of originating and terminating rate treatments (240×5=1200). The third set of jumpers are connected to these 240 output terminals and selectively threaded through the coil field. Inasmuch as each output terminal of this relay three represents five different combinations of originating and terminating rate treatments, each jumper in the third group likewise represents five different combinations of originating and terminating rate treatments. Each jumper in this group is selectively threaded through five different groups of coils in the coil field so that the surge current through a jumper produces an output indication in each group representing the message billing index assigned to the unique combination of originating and terminating rate treatments represented thereby. Connector relays are operated at this time to connect only the output of the desired coil group which represents the particular combination of originating and terminating rate treatments involved for this call with the register relays to operate them and store the message billing index.

It is, therefore, a further feature of the invention to provide an inductive translating means which is operated a plurality of times during the processing of a call in order to obtain the message billing index therefor.

It is a further feature of the invention to provide an inductive translator having three different sets of jumpers threaded therethrough with the jumpers being energized successively during the processing of a call to obtain the message billing index therefor.

A further feature of the invention is the provision of an inductive translator which is operated successively to translate different items of information in combination with means under control of the inductive translator to ascertain from the nature of the information derived on one translation whether or not a succeeding translation is to be made.

These and other features and objects of the invention will be more readily apparent from the following description, the appended claims, and the drawings in which:

Figs. 1 through 30 contain the circuit of a preferred exemplary embodiment of the invention;

Fig. 31 illustrates how Figs. 1 through 30 should be arranged with respect to each other; and Fig. 32 illustrates the manner in which a CAMA office might be arranged geographically with respect to the local offices which it serves on an originating basis.

GENERAL DESCRIPTION

The billing indexer comprising the subject-matter of the present invention, when installed for use in a CAMA switching office, works in close connection with a component of switching equipment called a transverter. The details concerning the relationship between the transverter and the billing indexer need not be disclosed in detail herein since they are discussed at length in the publications and patent application cited in the preceding paragraphs. All that need be said by way of review at this point is that the transverter receives certain items of information concerning a call from other switching components. After receiving this information, it attempts to connect itself to a billing indexer. The billing indexer's function is to receive the information from the transverter, perform certain operations thereon, and then feed back to the transverter information it derives in response to the receipt of the information from the transverter. The main item of information supplied to the transverter is the message billing index.

The billing indexer is a much faster operating unit than is the transverter and, therefore, most installations will contain fewer billing indexers than there are transverters. The specific embodiment in the information disclosed herein contemplates two billing indexers and four transverters. The billing indexers contain the necessary preference and seizure circuits so that they will service the transverters on an equitable basis during busy periods and also, so that two or more transverters will never seize the same billing indexer simultaneously.

The present drawings disclose only those circuit elements within the transverter as are necessary for an understanding of the present invention. In general, these circuit elements mainly comprise the relay contacts within the transverter which close to transmit the necessary items of information to the billing indexer, and the relays within the transverter which operate in response to the receipt of output information from the billing indexer. The remaining circuit elements comprising the transverter are not shown in detail since they comprise no part of the present invention. Reference is made to the aforementioned patent of Breed et al. for details of this nature. The Breed et al. patent discloses an entire CAMA switching office and, in particular, shows the detailed circuits of a transverter, a sender, a transverter connector, and a different version of a billing indexer.

The presently described billing indexer, which is essentially an elaborate translator, is shown and described in connection with the units of switching equipment with which it will be associated in its commercial embodiment and with which it was designed to operate. The billing indexer was disclosed in such a manner because it is believed that the operation of any complex piece of equipment, such as this is, can be more readily understood when accompanied by a description which sets forth the surrounding environment of the complex equipment and which discusses and describes the reasons why the billing indexer operates in a certain manner rather than just describing how it operates without regard to its environment.

The billing indexer is not dependent, patentwise, upon either the transverter or any other switching component since it comprises a new and novel translator per se. If desired, the input wires to the billing indexer, which now are shown as running from the transverter, could be connected instead, to manually operable keys which could be closed by an operator. The billing indexer would work equally well in this situation and, in response to the selective operation of the keys by the operator, would undergo the same operations it now does and would derive the same items of output information. The output information in this case could be manifested by the energization of lights, rather than by the operation of relays within the transverter as is now shown. In this case, the output wires from the billing indexer would be connected to a panel of indicator lamps. Although this showing would be adequate, patentwise, it would leave much to be desired insofar as concerns clarity of understanding since such a description would fail to convey an appreciation of the overall system of which the billing indexer is a part.

Fig. 32 contains a map illustrating the relationship between the CAMA office and the local offices it serves on an originating call basis. This map shows portions of three national areas 501, 601, and 901. The CAMA office is shown as being physically located within national area 601 and is connected by means of trunks to local offices within each of the three national areas.

National areas 901, 501, and 601 are also designated areas 0, 1 and 2, respectively. These national area designations represent the national area code for each area in accordance with the nationwide area numbering plan now in use throughout the United States and parts of Canada. Area designations 0, 1 and 2, on the other hand, are merely local in nature and are only of interest to this particular CAMA office for reasons discussed hereafter.

Normally a subscriber in one national area will dial ten digits when attempting to call a subscriber in a different national area. For example, as shown on Fig. 32, a subscriber served by the BE–9 office will first dial the area code 901 and then dial the regular 7 digit telephone number of a subscriber served by the LO–7 office when attempting to contact him.

There are, however, certain instances where a single metropolitan area may include subscribers in two or more national areas. This is shown on Fig. 32 by the circle which encompasses a portion of each of the three areas and which is commonly referred to as the circle or community of interest. For example, the circle shown on Fig. 32 might represent a city, the main portion of which is located in area 601 but having suburbs whose residents regard the entire area encompassed by the circle as a single homogeneous metropolitan unit. It is sometimes desirable, in these cases, that a subscriber served by the TO–7 office in area 501 should be able to dial 7 rather than 10 digits to reach a subscriber served by the RO–5 office in area 601. In other words, it is sometimes desirable that any subscriber served by an office within the circle should be able to dial only seven digits to reach any other subscriber served by any other office within the circle, regardless of which national area the calling and called offices are located.

The community of interest feature is used whenever possible. It is not used in all such situations due to the fact that it severely reduces the number of available office codes. Whenever this feature is used, there can be no code conflicts within the metropolitan area involved. An office code appearing in one portion of the community of interest cannot be used in another area. For example, the office code TO–7 in area 501 cannot be used in either of areas 901 or 601 when the community of interest feature is present. This is easily understood. If a subscriber served by office RO–5 in area 601 is to be allowed to reach a subscriber in another area by dialing only seven digits, such as for example, a subscriber served by office TO–7, the switching equipment at the CAMA office would have no way of knowing how to route the call if the code TO–7 represents the office shown in area 501 plus an office located in another area. Therefore, it is readily seen that those office codes used within the community of interest must, of necessity, represent only a single office.

When the community of interest feature is not present, a subscriber served by office TO–7, for example, will have to dial ten digits to call a subscriber served by office RO–5. A subscriber in office TO–7 would still only have to dial seven digits, however, when calling a subscriber in office BE–9 since both offices are located within area 501. This is in spite of the fact that the actual path of the call extends from office TO–7, to the CAMA office in area 601, and then back to office BE–9 in area 501. The CAMA office will direct the call to office BE–9 in area 501 and not to a similarly designated office in one of the other areas since an area code (X0X or X1X) not having been dialed, it recognizes that the calling subscriber desires to call a party in his own area. The CAMA office knows the area in which a calling subscriber is located and, therefore, knows that all 7 digit calls originating from any area are to be directed to call offices in the same area.

If subscriber TO–7 in area 501 desired to call a subscriber in office BE–9 in area 601 (assuming there was such an office in this area), he would first dial the area code 601 and then dial the 7 digit number of the called subscriber. The equipment in the CAMA office would recognize from the area code 601 that the calling subscriber desired to talk to a subscriber in office BE–9 in area 601.

The arrangement shown on Fig. 32 allows different types of calls to be billed in different manners. The community of interest feature has no bearing on the manner in which the calls are billed and, therefore, it is immaterial, insofar as the billing is concerned, whether or not the community of interest feature is present. For example, calls from office BA–3 to office LO–7 in the same area, or to TU–8 in area 601 might be billed on a bulk-billed basis and therefore, such calls would be charged for on a message unit basis. The charges for these calls would be included in the total charge for all message unit calls made by the subscriber during the billing period.

On the other hand, a call from office BA–3 to MU–6, might be billed on a toll statement basis with the charges for this call appearing on a toll statement slip appended to the customer's monthly bill. The billing indexer is intimately involved with this aspect of the operation since it tells the transverter whether the call is to be billed on a bulk-billed or on a toll statement basis. It also supplies the transverter with information indicating what charge rate is to be used for bulk-billed calls.

In the drawings, the relay contacts are shown detached from the relay windings. The first digit or pair of digits of each relay designation indicates the figure in which the relay appears while the letters represent the function thereof. Relay 16–TRU0, for example, appears in Fig. 16. The designation of the relay contacts includes in parentheses the relay designation with the digits before the parentheses indicating the figure in which the contacts appear. Contacts 20(16–TRU0), for example, appear in Fig. 20.

Contacts which are closed when the relay is operated (make contacts) are represented by an X crossing the lines representing the connecting conductors while contacts which open when the relay is operated (break contacts) are represented by a short line crossing the connecting conductors.

DETAILED DESCRIPTION

1. *Regular calls to bulk billed area*

1.01 *Operation of billing indexer connector circuits*

Figure 1:
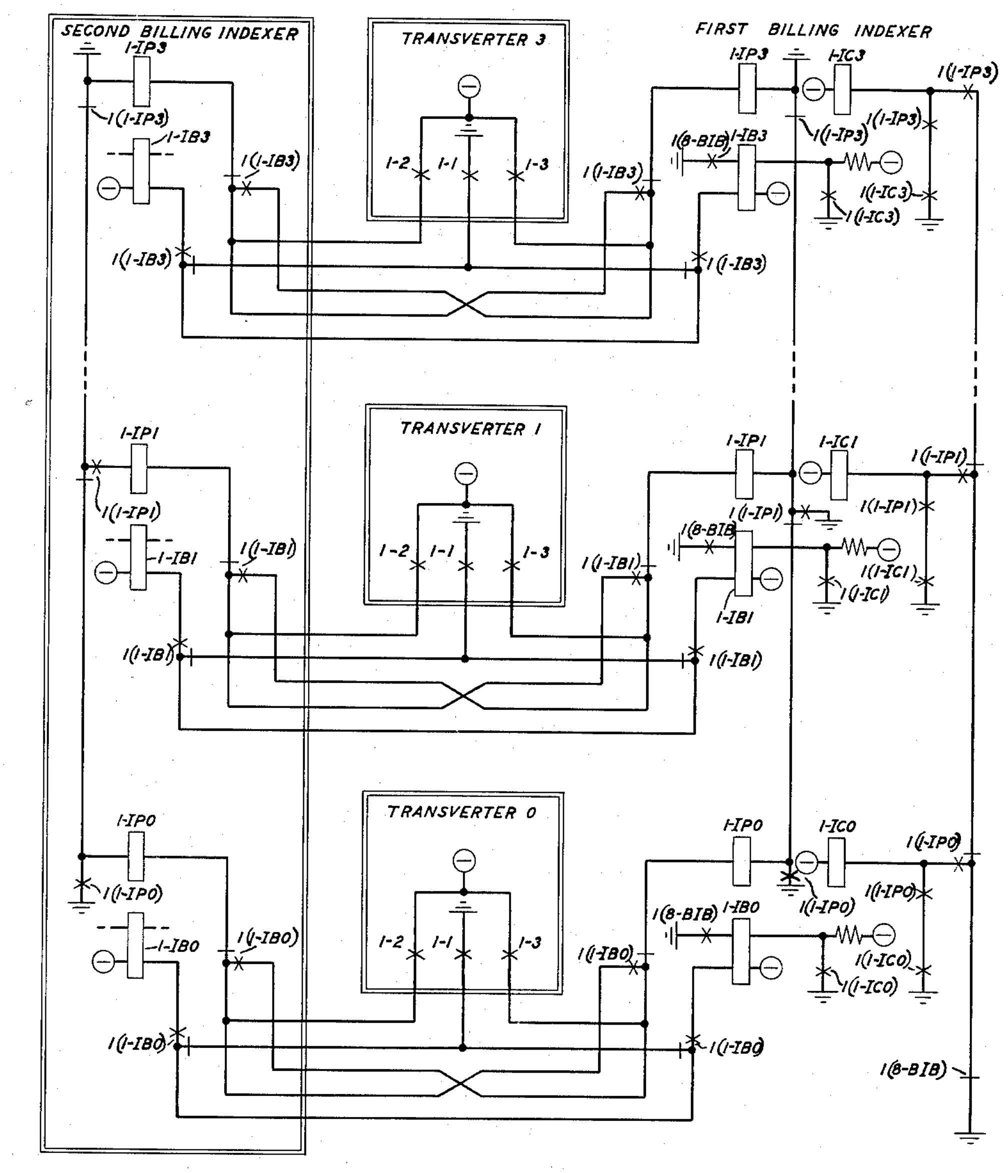

Fig. 1 contains a preference and connector circuit which allows two billing indexers to serve four transverters. Skeletonized portions of transverters 0, 1 and 3 are shown within the rectangles while the omission of transverter 2 is indicated by the dashed wiring. The right-hand half of Fig. 1 contains the detailed circuits of a portion of one billing indexer while the skeletonized circuit within the large rectangle on the left-hand side of this figure discloses those parts of a second billing indexer as are necessary for an understanding of the present invention. The two billing indexers are identical in all respects and therefore, the present drawings disclose the details of only a single billing indexer except in certain cases, of which Fig. 1 is an example, where portions of the second billing indexer are shown in order to better illustrate certain features of the invention.

Insofar as the preference and connector circuit in Fig. 1 is concerned, each transverter is functionally associated with that portion of each billing indexer circuit which is on the same horizontal level with it. For example, transverter 0 is associated with relays 1–IP0, 1–IC0 and 1–IB0, of the first billing indexer shown to the right of the box representing transverter 0. Transverter 0 is also functionally associated with similarly identified relays in the second billing indexer. The same relationship exists between each of the other transverters and the relays in each of the billing indexers.

It may be seen from an inspection of Fig. 1 that circuits within each transverter are operable to supply certain operating and holding potentials to the billing indexers. The details of the circuit within the transverters which operate and supply these various potentials are not shown in detail since they represent no part of the present invention. These circuits are represented, instead, by three make contacts designated 1, 2, and 3 in each transverter. Insofar as an understanding of the present invention is concerned, it is only necessary to appreciate that make contact 1 in each transverter may close and apply a ground, while make contacts 2 and 3 may operate and apply a negative battery to the billing indexer circuits.

When a transverter has progressed in its operation up to the point where it attempts to seize a billing indexer, it causes either its contacts 2 or 3 to close and supply a negative battery to one of the billing indexers. Each transverter has access to both billing indexers. The calls handled by each transverter are equitably distributed to the two billing indexers under control of the recorder number associated with the trunk involved in the call. The transverter receives the recorder number from the sender along with certain other items of information pertaining to the call. The even recorder numbers cause the first billing indexer to be preferred while the odd recorder numbers cause the second billing indexer to be preferred. Provision is made within each transverter whereby this preference is reversed on the second trial for a call.

Let it be assumed that transverter 0 attempts to seize the first billing indexer. This attempt is manifested by the closure of make contacts 3 in transverter 0 which extends a negative battery through break contacts 1(1–IB0), through the winding of relay 1–IP0, through break contacts 1(1–IP1) and 1(1–IP3) to ground. The current flowing over this circuit operates relay 1–IP0 which closes its make contacts 1(1–IP0) to supply an extra ground to the right-hand side of its winding.

Similar circuits exist whereby the closure of contacts 3 in transverter 3 operates relay 1–IP3 and whereby the closure of contacts 3 of transverter 1 operates relay 1–IP1. The right-hand winding terminals on each of relays 1–IP0, 1–IP1, 1–IP3 are connected to ground by means of a preference circuit comprising a break contact on each of these relays. For example, the right-hand winding terminal of relay 1–IP3 is connected directly to ground and therefore, this relay will operate whenever a negative battery is applied to its left-hand winding terminal by transverter 3. The right-hand winding terminal of relay 1–IP1 is connected to ground through break contacts 1(1–IP3) and therefore, relay 1–IP1 can only operate when relay 1–IP3 is unoperated. Similarly, relay 1–IP0 is connected to the same ground through series path comprising break contacts on each of relays 1–IP1, 1–IP2, and 1–IP3 so that it can operate only when these relays are unoperated. This arrangement comprises a preference circuit whereby each relay will be operated in a certain preferred order during busy periods when a plurality of transverters may be attempting to seize the same billing indexer.

Continuing with the previous assumption that transverter 0 closed its make contacts 3 to operate relay 1–IP0, the operation of this relay closes a path from ground, through break contacts 1(8–BIB) and make contacts 1(1–IP0) to operate relay 1–IC0. The operation of this relay closes a locking path to ground for itself through make contacts 1(1–IC0) and 1(1–IP0). This locking path holds relay 1–IC0 operated when relay 8–BIB operates in the manner described hereinafter.

The right-hand winding terminals of relays 1–IC0, 1, 2, 3 are connectable to ground on make contacts 1(8–BIB) by means of a preference circuit comprising a set of make and break contacts on each of relays 1–IP0, 1, 2, 3. This preference circuit is arranged so that relay 1–IC0 is first preferred and will always operate whenever make contacts 1(1–IP0) close upon the operation of relay 1–IP0. At the same time these make contacts close, break contacts 1(1–IP0) open and remove ground from the operating paths of relays 1–IC1, 2, 3. Similarly, the operation of relay 1–IP1 closes a path to operate relay 1–IC1, providing that relay 1–IP0 is unoperated, and in doing so, opens the operating paths for relays 1–IC2 and 1–IC3. Relays 1–IC0 . . . 1–IC3 are connector relays which are operable to connect the billing indexer to the various transverters.

It is necessary to associate the operating paths of relays 1–IC0, 1, 2, 3 with a preference circuit in order that only one of them may be operated at any single time. For example, assume that transverter 0 seizes the billing indexer at a time when all the other three transverters are idle and therefore, succeeds in operating relay 1–IP0 which locks to ground over make contacts 1(1–IP0). The operation of this relay causes the operation of relay 1–IC0 in the manner already described.

Also assume that a short time later transverter 3 attempts to serve a call and operates relay 1–IP3, the right-hand winding terminal of which is connected directly to ground. At this time it may be seen that both relays 1–IP0 and 1–IP3 are operated. The operation of relay 1–IP3 has no effect on the operation of 1–IP0 which remains operated over its locking path. Relay 1–IC3 cannot operate at this time because its operating path to ground on make contacts 1(8–BIB) is opened by means of the preference circuit at break contacts 1(1–IP0). The necessity of the preference circuit in the operation path of the connector relays may readily be seen since, if each of the connector relays, such as 1–IC3, were operated solely by means of a make contact on its associated relay 1–IP3, it would be possible for more than one connector relay to be operated at any single instant of time because it is quite possible that two or more of relays 1–IP0 . . . 1–IP3 may be operated simultaneously.

The operation of relay 1–IC0 upon the seizure of the billing indexer by transverter 0 closes make contacts 6(1–IC0) to extend a ground to operate relay 6–BI1 in the transverter. The operation of relay 6–BI1 indicates to the transverter that billing indexer 1 has been connected and that it may proceed with whatever circuit operations are associated with further processing of the call. Relay 6–BI1 has been shown only as a matter of interest and represents the circuits within the transverter which are responsive to the ground placed on lead BI1 when billing indexer 1 is seized. The details of this circuit constitute no part of the present invention and therefore, it is only necessary to appreciate that a ground on lead BI1 serves to notify the transverter that the first billing indexer has been seized. Similarly, a ground on lead BI2 would operate relay 6–BI2 to indicate that the second billing indexer has been seized.

The present drawings disclose the details of one billing indexer circuit together with as many skeletonized circuit elements of the other billing indexer, plus other common control circuits, as is necessary for an understanding of the invention. For example, on Fig. 6 skeletonized circuit elements of the sender, transverter connector, and transverter are shown within the appropriately entitled boxes. It should be appreciated that any telephone system in which the present invention might be used would contain a plurality of common control circuits. Therefore, the boxes entitled "sender" and "transverter connector" each represent one of the plurality of such circuits that would be present in a switching center. Also, the box entitled "transverters 0, 1, 2, 3" functionally represents the four transverters which are associated with the two billing indexers. The representation of a plurality of similar common control circuits by a single box containing skeletonized circuit elements somewhat simplifies the disclosure and facilitates an understanding of the invention. Therefore, in the previous paragraphs where it was discussed how the placing of a ground on lead BI–1 operates relay 6–BI1, it should be understood that only this relay in the transverter 0 was operated since it has been assumed that only transverter 0 was successful in seizing the billing indexer. Relays 6–BI1 in the other three transverters remain unoperated. Relay 6–BI2 is associated with the second billing indexer and would have operated if billing indexer 1 had been seized and placed a ground on lead BI2.

Referring back to Fig. 1, it may be observed that relays 1–IC0 through 1–IC3 are associated with transverters 0 through 3, respectively. The make contacts on lead BI1 on Fig. 6 actually represent make contacts on each of relays 1–IC0 through 1–IC3. The designation of these contacts as 6(1–IC0, 1, 2, 3) indicates that they represent four make contacts which serve to interconnect the first billing indexer with any one of the four transverters depending upon which one of relays 1–IC0 through 1–IC3 is operated. There are a number of other instances on the drawings where a single set of break or make contacts represent a plurality of contacts. In each case the contacts are designated in a manner similar to contacts 6(1–IC0, 1, 2, 3). Any contacts on the drawing which represent a plurality of contact sets may be recognized by this type of a designation. In describing a circuit path containing contacts of this type, only the specific contacts will be enumerated that are on the single relay which has been assumed to have operated. Thus, the path over which relay 6–BI1 operates, upon the operation of relay 1–IC0, is specified to be from ground, through make contacts 6(1–IC0), over lead BI1 to the winding of relay 6–BI1. This nomenclature will be utilized throughout the following circuit description.

The operation of relay 1–IC0 closes a ground through make contacts 5(1–IP0), and 5(1–IC0) to operate relay 5–GC. The operation of relay 5–GC controls a number of ground connections to various circuits within the billing indexer, speeds up the release of the billing indexer, and prevents false operations during the release time by opening the grounds it supplies simultaneously.

The operation of relay 1–IC0 closes a path from ground through make contacts 6(1–IC0) to operate relay 6–ON. The operation of relay 6–ON provides a number of off-normal ground and battery connections to various parts of the billing indexer circuit to indicate that the circuit has been seized by a transverter. One of the off-normal grounds provided by the operation of relay 6–ON extends a path from ground through make contacts 7(5–GC), 7(6–ON), break contacts 7(18–OTK), to the winding of relay 7–OCN which now operates. The operation of this relay interconnects the register relays which are used during the originating office code translation with the gas tubes shown in Figs. 22 through 27.

Another off-normal ground and an off-normal battery on contacts of relay 6–ON cause the release of the timer circuit comprising relay 7–OT by closing make contacts 7(6–ON) and thereby allowing current to flow in both windings of relay 7–OT. The upper or biasing winding is controlling at this time. Ground is also closed to resistor 7–R1 for reasons hereinafter described. The closure of make contacts 9(6–ON) similarly causes a release of the timer circuit comprising relay 9–TT while the closure of make contacts 10(6–ON) causes the release of the timer circuit comprising relay 10–MBT. The closure of make contacts 5(6–ON) closes a path from ground to operate relay 5–SRG.

Another of the off-normal grounds provided by relay 6–ON effects circuit operations to insure that this billing indexer will be made busy to any other transverter which may attempt to seize it while it is serving this call for transverter 0. This function is indicated by the closure of contacts 8(6–ON) which extends a ground to operate relay 8–BIB. The operation of relay 8–BIB closes its make contacts on Fig. 1 which connects a ground to the upper left-hand winding terminal on each of relays 1–IB0 through 1–IB3. The closure of make contacts 1(8–BIB) associated with relay 1–IB0 has no effect on the relay because a ground is also placed on the other side of the upper winding at this time by make contacts 1(1–IC0) of relay 1–IC0 operated. Relay 1–IC0 is the only one of relays 1–IC0 through 1–IC3 which is operated at this time. Therefore, all of relays 1–IB1 through 1–IB3 operate when the contacts 1(8–BIB) associated therewith close and place a ground on the upper left-hand winding terminal on each of these relays. Referring to relay 1–IB3, its upper right-hand winding terminal has a resistance battery thereon instead of a ground since contacts 1(1–IC3) are not closed at this time. Therefore, the closure of make contacts 1(8–BIB) associated with relay 1–IB3 operates the relay.

The operation of relays 1–IB1 through 1–IB3 closes a path whereby the closure of contacts 3 in each of transverters 1 through 3 closes a path to the relays 1–IP1 through 1–IP3 in the second billing indexer instead of the first billing indexer which is now busy serving transverter 0. For example, if transverter 3 should close its contacts 1–3 in an attempt to seize the first billing indexer, the negative battery will be extended from contacts 1–3, through make contacts 1(1–IB3), through break contacts 1(1–IB3) in the second billing indexer to operate relay 1–IP3 therein. The circuits within the first billing indexer, which are associated with transverters 1 and 2, are in a similar condition at this time so that the closure of the contacts 1–3 in each of these transverters would cause each transverter to attempt to seize the second rather than the first billing indexer.

The second billing indexer is provided with identical preference and connector circuits whereby whenever it is busy serving a call, it will cause any later operating transverter to attempt to seize the first billing indexer.

1.02 *Information received by billing indexer*

The operation of the connector relay 1–IC0 closes a number of circuits over which the billing indexer receives from the transverter the plurality of items of information it needs in order to perform its function in connection with the processing of a call. Some of this information is received by the transverter from the sender while other is derived from information received from the sender. Altogether, the billing indexer receives seven items of information from the transverter. The first item is the originating office code which comprises the first three digits (the two letters and the first numerical) of the calling party's telephone number. The second item is the originating area which indicates in which of the three possible areas the calling party is located. A third item of information is the originating rate class which comprises a single digit representing certain charging information necessary to compute the charges for the call. For example, a subscriber billed on a flat rate basis might be charged a certain amount for the call while another subscriber billed on a message unit basis will have a different charge.

The fourth item of information received is the terminating office code which comprises the first three digits of the called subscriber's number. The fifth item received is an indication as to whether seven or ten digits were dialed by the calling subscriber. The sixth item of information received is the terminating area, which information comprises a single digit identifying whether or not the called subscriber is located in one of the three possible bulk-billed areas and if so, which one, or whether he is located in an area to which bulk billing is not permissible so far as the calling party is concerned. This item is received from the transverter on 10 digit calls and from the output of the first translation on seven digit calls.

The last item of information received by the billing indexer from the transverter is an indication as to whether the calling office code is supplied by the CAMA operator, who obtained it orally from a calling subscriber, or whether it is supplied automatically by prior switching equipment. It the information is supplied by the operator, a path is closed from ground in the transverter, through make contacts 6–OD in the transverter, through make contacts 6(1–IC0), to the winding of relay 6–OD to operate it. On the other hand, if this information was received from automatic equipment, a path is closed from ground in the transverter, through make contacts 6–AD in the transverter, through make contacts 6(1–IC0) to the winding of relay 6–AD to operate it. Relay 6–OD causes the CAMA operator to be recalled if an error is detected in the originating code, whereas with relay 6–AD operated, a trouble record is produced under the conditions, as hereinafter described.

Figure 32:
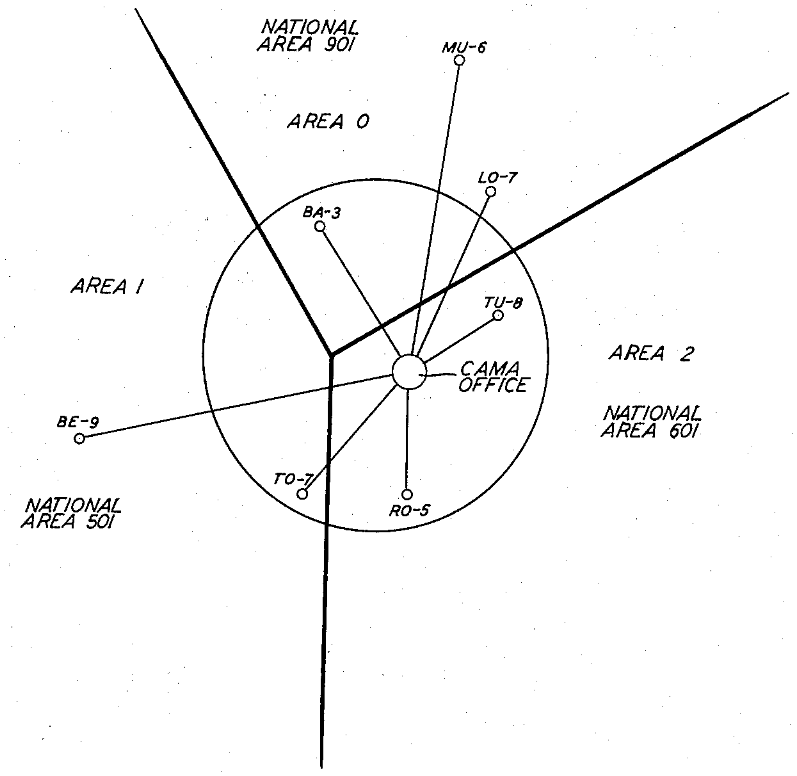

Fig. 32 shows a map containing three national areas 501, 601 and 901. Also shown thereon is a circle which has a portion of each of areas 501, 601 and 901 contained within it. The area within this circle is referred to hereinafter as the community or circle of interest. The relationship between the various subscribers in this circle may take a variety of forms depending upon geographical, business and other considerations. For example, under one set of conditions, each subscriber could complete calls to any subscriber in his area by dialing seven digits and could complete a call to subscribers in any other national area only by dialing ten digits. With this arrangement, if desired, a subscriber located within the circle of interest could be charged for calls to any other subscriber within the circle of interest on a bulk billed basis regardless of whether the called subscriber is in the same or in a different national area. On the other hand, a subscriber located within the circle of interest could be bulk billed for only those calls completed to subscribers within the circle of interest which are also in the same national area as the calling subscriber. All calls to any other subscribers, regardless of where situated, would then be billed on a toll statement basis. Other combinations of billing arrangements are also possible. For example, all three areas could be bulk billed beyond the circle of interest, or any one of them could be so billed.

Under a different set of conditions, subscribers within the circle of interest might be permitted to reach any other subscriber located within the circle, regardless of the area in which the called subscribers are located, by dialing seven digits. With this arrangement, a subscriber in area 0 and located in the circle of interest could complete a call to a subscriber in area 2 and located in the circle of interest by dialing seven digits. On the other hand, if this subscriber in area 0 desired to call a subscriber in area 2 outside the circle of interest, he would have to dial ten rather than seven digits. However, this subscriber in area 0 would still only have to dial seven digits in contacting a subscriber located in a remote section of area 0.

It is necessary that there be no conflicting office codes if the subscribers in one area are to be permitted to dial subscribers situated in another area by dialing only seven digits. This arrangement ties up office codes since a given office code can appear in only one of the three areas if subscribers in other areas are to be able to reach it by dialing only seven digits.

Let it be assumed that a subscriber in national area 901 (also local area 0) having a telephone number BA–3–4500 (2234500) calls a subscriber in the same area having the telephone number LO – 7 – 8911 (5678911). The equipment in the originating office (BA–3) responds to the incoming dial pulses as the desired number is dialed and, after it is ascertained that the call is an extra charge call, the calling office seizes a trunk to the CAMA office in order to complete the call. After the calling office has seized a trunk leading to the CAMA office, it transmits the information it has concerning the call to the sender in the CAMA office. The CAMA sender then proceeds to effect a number of further circuit operations in connection with the call.

One of the circuit operations effected by the sender is the seizure of a transverter and, in turn, a billing indexer in order to obtain certain charging information for the call. The sender transmits some of the information it has received to the transverter. The transverter transmits some of the information it receives to the billing indexer. The aforementioned seven items of information comprise the information transmitted from the transverter to the billing indexer.

The information identifying the originating office code is fed to and stored in the billing indexer on a two-out-of-five code basis. The five relays designated 6–OA0, 1, 2, 4, 7 are selectively operated by the transverter to store the first digit of the originating office code. These five relays together with their five operating paths are represented by a single relay and a single operating path on Fig. 6 for purposes of simplicity. However, it is to be understood that this showing symbolically represents five relays and five individual operating paths. This same showing is used in a number of other places throughout the specification in order to reduce the size and complexity of the drawings.

The first digit of the calling number, BA–3–4500, has a digital value of 2 and, therefore, a circuit is extended from ground in the sender, through the transverter connector, through the transverter, to operate relays 6–OA0 and 6–OA2 to represent the digit 2 in the two-out-of-five code. The path to operate relay 6–OA0 extends from ground on make contacts 6–OA0 in the sender, make contacts 6–SE and 6–TVE in the transverter connector, through lead OA0 in the transverter, through make contacts 6(1–IC0), to the winding of relay 6–OA0. The path to operate relay 6–OA2 extends from ground on make contacts 6–OA2 in the sender, through make contacts 6–SE and 6–TVE in the transverter connector, over lead OA2 in the transverter, through make contacts 6(1–IC0), to the winding of relay 6–OA2.

The second digit of the calling number also has a digital value of 2 and is stored in the billing indexer by the operation of relays 6–OB0 and 6–OB2 from ground on contacts 6–OB0 and 6–OB2 in the sender, respectively, through make contacts 6–SE and 6–TVE in the transverter connector, over leads OB0 and OB2 respectively in the transverter, through make contacts 6(1–IC0) to the windings of relays 6–OB0 and 6–OB2, respectively, in the billing indexer. Information representing the third digit of the originating office code, which has a digital value of 3, is stored in the billing indexer by the operation of relays 6–OC1 and 6–OC2, which together represent the digit 3 in the two-out-of-five code. The path over which these relays operate extends from ground on make contacts 6–OC1 and 6–OC2 in the sender, through make contacts 6–SE and 6–TVE in the transverter connector, over leads OC1 and OC2, respectively, in the transverter, through make contacts 6(1–IC0) to the windings of relays 6–OC1 and 6–OC2, respectively, in the billing indexer.

Relay 6–OAR0 is operated to indicate that the calling party is in area 0. The path for the operation of this relay extends from ground to the transverter, through two make contacts on relays 6–RG which are operated on a two-out-of-five basis, through terminals 6–RGA0–9 and 6–OAR0–2 in the transverter, through make contacts 6(1–IC0) to the winding of relay 6–OAR0 to operate it. These two sets of terminals in the transverter are selectively interconnected with jumper wires in order that the operation of the RG relays in the transverter on a two-out-of-five basis will operate the desired one of relays 6–OAR0–2 in the billing indexer.

The RG relays in the transverter are selectively operated in accordance with the recorder group number for the recorder that handled the call. A maximum of ten recorder groups can be associated with any CAMA office and therefore the recorder group number can take any value from 0 through 9. The ten terminals designated 6–RGA0–9 represent the ten possible recorder group numbers. These ten terminals are selectively cross-connected by wire jumpers to the terminals 6–OAR0–2 depending upon the office or offices which are assigned to each recorder group. All the offices assigned to a certain recorder group are in the same originating area and, therefore, an indication as to what recorder group serves the call provides a means for ascertaining the originating area of the call, with exceptions described later.

Let it be assumed that the originating rate class for this call is 1 and therefore, a circuit is now closed to operate relay 6–ORC1. The path over which this relay operates extends from ground in the sender, through make contacts on relay 6–ORC1 in the sender, through make contacts 6–SF and 6–TVF in the transverter connector, through lead ORC1 in the transverter, through make contacts 6(1–IC0) to the winding of relay 6–ORC1.

The transverter supplies information to the billing indexer on each call indicating whether or not the calling party dialed seven digits, thereby indicating a regular call, or whether he dialed ten digits thereby indicating an area code call. The transverter furnishes this information by operating either relay 5–7DG for a 7 digit call or relay 5–AC for an area code call. The hypothetical call now being described is a 7 digit call since both the calling and called parties are in the same national area. Therefore, relay 5–7DG is now operated from ground on the make contacts of relays 5—GC and 5–7DG2 in the transverter, through make contacts 5(1–IC0) to the winding of 5–7DG.

The A, B and C digits of the terminating office code (LO–7) have digital values of 5, 6 and 7, respectively. These digital values cause the operation of relays 6–TA1 and 6–TA4 for the A digit of 5, relays 6–TB2 and 6–TB4 for the B digit of 6, and relays 6–TC0 and 6–TC7 for the C digit of 7. Relays 6–TA1 and 6–TA4 are operated from ground on the make contacts of relays 6–A1 and 6–A4, respectively, in the transverter, through make contacts on relay 6–7DG1 in the transverter, through the make contacts 6(1–IC0) to the windings of relays 6–TA1 and 6–TA4, respectively. In a similar manner, relays 6–TB2 and 6–TB4, respectively, are operated from ground on make contacts 6–B2 and 6–B4, respectively, in the transverter, through make contacts on relay 6–7DG1 and make contacts 6(1–IC0). Also, relays 6–TC0 and 6–TC7, respectively, are operated from ground on the make contacts of relays 6–C0 and 6–C7, respectively, in the transverter, through make contacts 6–7DG1 and make contacts 6(1–IC0) to the windings of relays 6–TC0 and 6–TC7.

The above description pertaining to the circuit paths over which relays 6–TA0, 1, 2, 4, 7; 6–TB0, 1, 2, 4, 7 and 6–TC0, 1, 2, 4, 7 operated, assume that this is a 7 digit call and therefore the grounds to operate these relays originated within the transverter and were extended over the paths just described. In the event that this was a 10 digit area call instead of a 7 digit call, the grounds to operate these relays would come from the senders over obvious paths shown on Fig. 6. For example, the grounds to operate relays 6–TA0 and 6–TA4 would extend from make contacts on relays 6–D0 and 6–D4, respectively, in the sender, through make contacts 6–SB and 6–TVB in the transverter connector, through make contacts 6–AC0 in the transverter, through make contacts 6(1–IC0), to the windings of relays 6–TA0 and 6–TA4, respectively. The paths to operate relays 6–TB2 and 6–TB4 together with relays 6–TC0 and 6–TC7 are similar to those just described for relay 6–TA1 and 6–TA4 and are obvious from an inspection of Fig. 6 taken in conjunction with the circuit path already described.

The terminating area 0 (the location of the called subscriber) is indicated by the operation of relay 5–TAR0, upon the subsequent operation of relay AT0 as hereinafter described. The path over which this relay operates is described in section 1.074. If the called subscriber were located in local areas 1 or 2, one of relays 6–TAR1 and 5–TAR2 would have been operated instead of relay 5–TAR0.

National areas 901, 501 and 601 (local areas 0, 1 and 2, respectively), are the only three areas to which this particular CAMA office can handle calls on a bulk-billed basis. Accordingly, one of relays 5–TAR0, 1, or 2, is operated when a call is made to one of areas 0, 1, or 2, respectively. If the calling subscriber dials a subscriber located in a national area which is not one of these three, relay 5–TAR3 is operated to indicate that the called subscriber is located in an area other than the areas 501, 601 or 901 as shown in Fig. 32 and that the call must be billed on a toll statement basis.

1.03 *Identification of terminating area-10 digit calls*

The transverter translates the X0X or X1X area code it receives on 10 digit calls and therefore identifies the terminating area as one of the three possible bulk-billed areas (areas 0, 1 and 2) or identifies the terminating area as being an area to which bulk-billing is not permitted. Relays 5–TAR0 through 5–TAR3 record this information. Relays 5–TAR0 through 5–TAR2 represent the three terminating areas which may be arranged either for bulk-billing or toll statement treatment. These three areas are the only areas for which this CAMA office can handle calls on an originating basis. Relay 5–2TAR3 is operated for calls to all other terminating areas thereby indicating that toll statement treatment must be made for these calls.

The terminating area is assumed to be the same as the originating area for 7 digit calls and is determined by the billing indexer in a manner described later.

Figure 8:
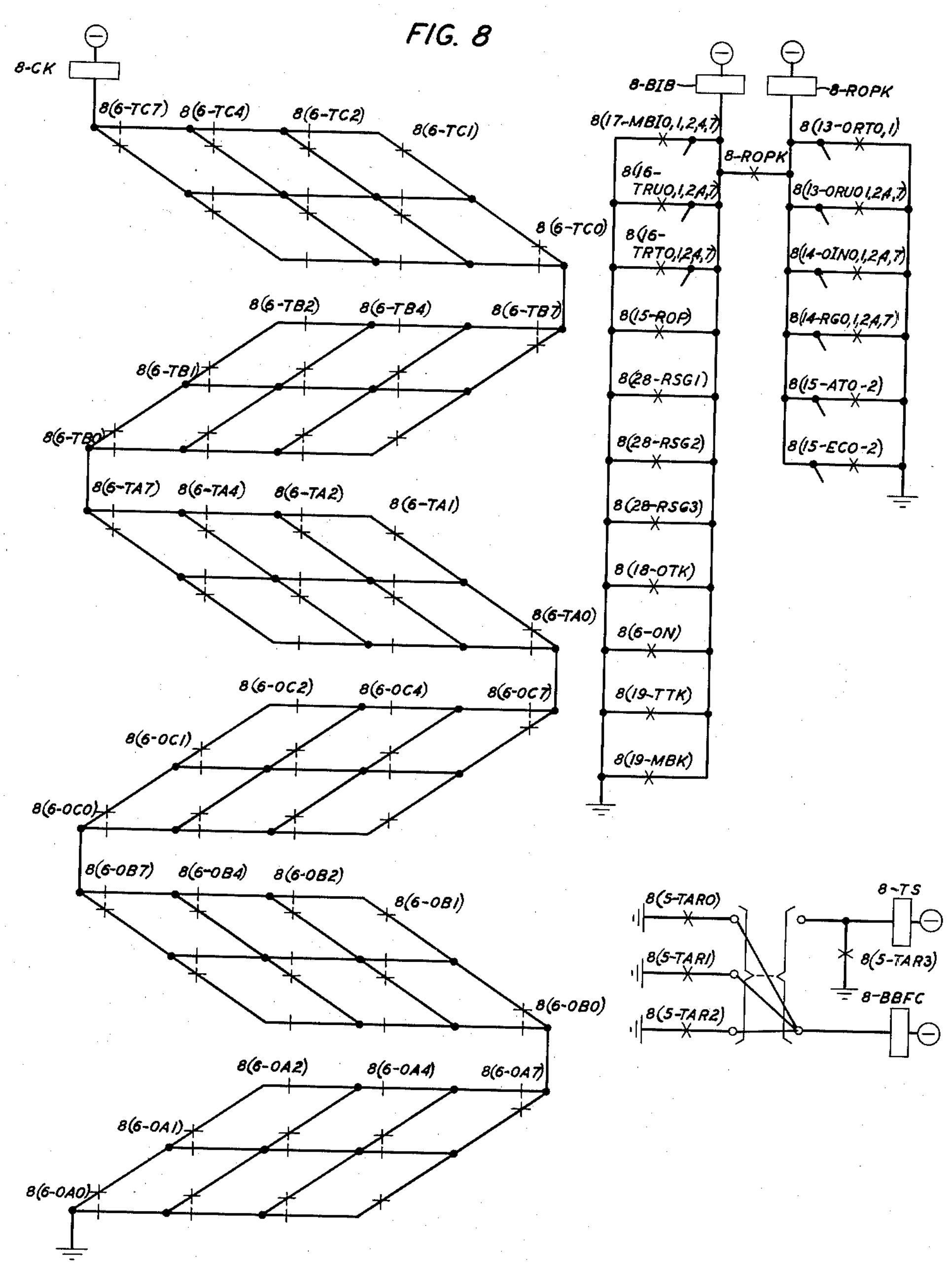

On Fig. 8, the contacts of relays 5–TAR0 through 5–TAR2 are selectively cross-connected to operate relay 8–BBFC or relay 8–TS to indicate that the area is on a bulk billing or a toll statement basis. Relay 8–BBFC is also used for toll statement billing with diversion of free calls. Relay 5–TAR3 is operated upon the reception of a call which is to be completed to an area which is not one of the three served by this CAMA office on an originating basis. The operation of this relay closes its contacts 8(5–TAR3) to operate relay 8–TS. The circuit on Fig. 8 shows that there are jumpers between the winding of relay 8–BBFC and make contacts on relays 5–TAR0, 1 and 2. Therefore, the operation of any of these three relays operates relay 8–BBFC to indicate that the call is to be billed on a bulk basis, or on a toll statement basis with free call diversion. If desired, or if calls to one of the three possible originating areas is not to be billed in this way, the jumper from the contacts of the relay representing this particular terminating area would be connected to the winding of relay 8–TS to operate it and to indicate that the billing is to be on a toll statement basis without diversion of free calls.

1.04 *Types of codes—terminating office code position*

The originating office code BA–3 (223) was stored in two-out-of-five code form in the three groups of relays 6–OA0, 1, 2, 4, 7; 6–OB0, 1, 2, 4, 7; and 6–OC0, 1, 2, 4, 7, respectively. The three digits of the called (terminating) office code LO–7 (567) are stored in a two-out-of-five code manner in the three groups of relays 6–TA0, 1, 2, 4, 7; 6–TB0, 1, 2, 4, 7; and 6–TC0, 1, 2, 4, 7, respectively.

Figure 6:
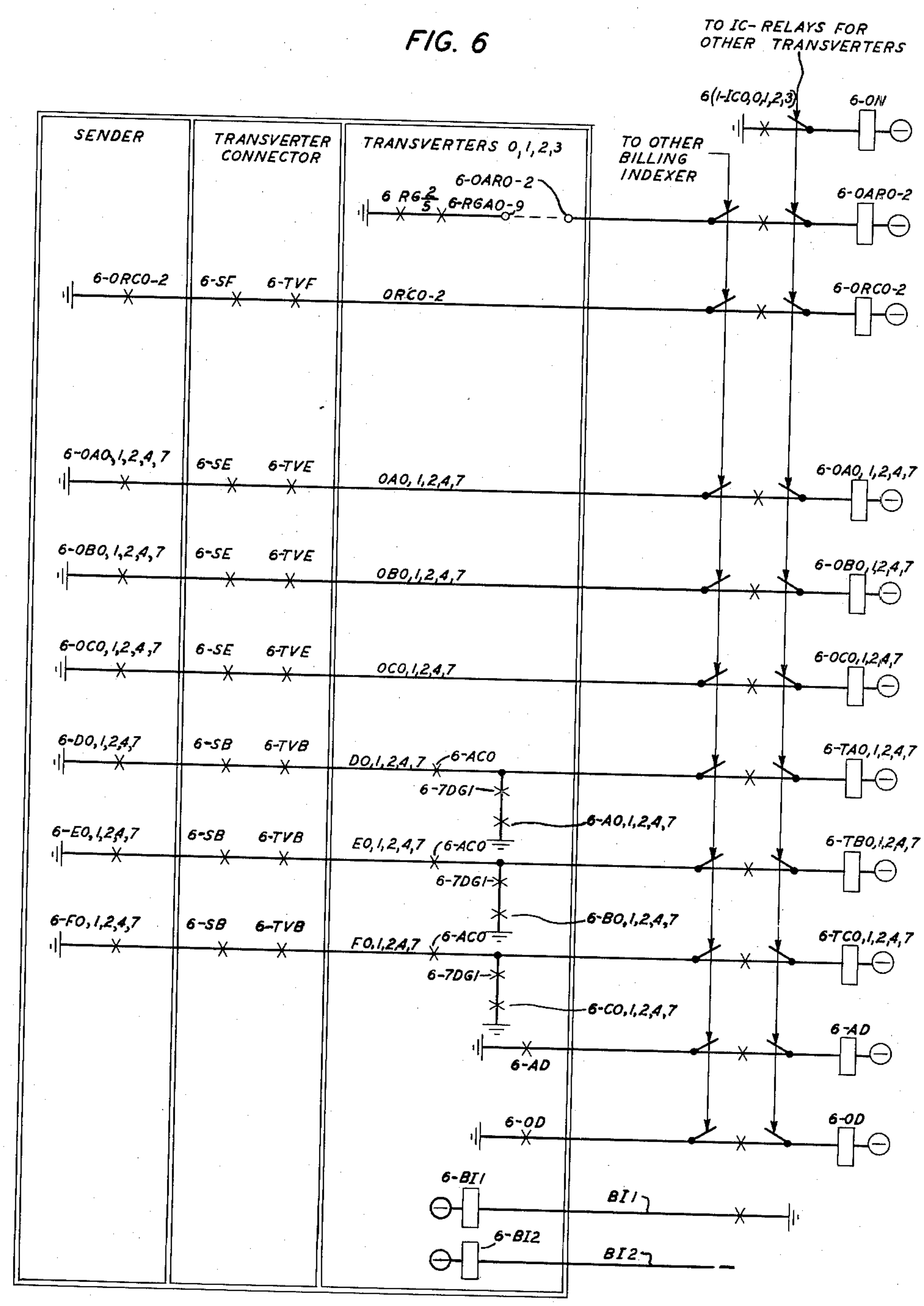

The array of contacts on the left-hand side of Fig. 8 extending from ground in the lower left-hand corner to the winding of relay 8–CK in the upper left-hand portion of the figure provides means of insuring that the three digits of the originating and terminating office codes are stored in the register relays of Fig. 6 in the proper form. More specifically, this circuit on Fig. 8, which comprises contacts on the register relays of Fig. 6, closes a path to operate relay 8–CK if two and only two relays are operated in each of the six groups of register relays associated with the originating and terminating office codes on Fig. 6. Each subgroup of contacts on Fig. 8 comprises what is commonly known in the art as a two-out-of-five check circuit and includes a set of make and a set of break contacts on each of the five relays in each group which receive information in a two-out-of-five code form. The operation of two relays in the group indicates that plausible information has been received while the operation of only a single relay, or the operation of three or more relays, indicates a trouble condition and signifies that the relays have been operated in an improper combination.

Each subgroup of contacts on Fig. 8 checks that its associated group of five relays on Fig. 6 have been operated in a proper combination by closing a path therethrough only upon the operation of two and only two of its associated five relays. The operation of only one of its five relays or, the operation of three of its five relays will not cause a path to be closed through the group of contacts.

Continuing with our hypothetical call wherein a subscriber having the telephone number BA–3–4500 (223–4500) calls a subscriber having the telephone number LO–7–8911 (567–8911) the ground in the lower left-hand corner of Fig. 8 is extended through make contacts 8(6–OA0), break contacts 8(6–OA1), make contacts 8(6–OA2), break contacts 8(6–OA4), 8(6–OA7), make contacts 8(6–OB0), break contacts 8(6–OB1), make contacts 8(6–OB2), break contacts 8(6–OB4), 8(6–OB7), 8(6–OC0), make contacts 8(6–OC1), 8(6–OC2), break contacts 8(6–OC4), 8(6–OC7), 8(6–TA0), make contacts 8(6–TA1), break contacts 8(6–TA2), make contacts 8(6–TA4), break contacts 8(6–TA7), break contacts 8(6–TB0), 8(6–TB1), make contacts 8(6–TB2), 8(6–TB4), break contacts 8(6–TB7), make contacts 8(6–TC0), break contacts 8(6–TC1), 8(6–TC2), 8(6–TC4), make contacts 8(6–TC7), to the winding of relay 8–CK which now operates and indicates that the six groups of register relays on Fig. 6 associated with the originating and terminating office codes have been operated in a plausible combinational form.

The operation of relay 8–CK closes a path to effect the operation of one of relays 7–ABX, 7–VTC, and 7–TC under control of the terminating office code A and B digits registered by relays 6–TA0, 1, 2, 4, 7 and 6–TB0, 1, 2, 4, 7, respectively, as shown on the following table:

| Terminating Code A Digit | Terminating Code B Digit | Relay Operated |
|---|---|---|
| 2–9 | 2–9 | 7–ABX |
| 1 | 0 | 7–TC |
| 0 | – | 7–VTC |
| 1 | 1–9 | 7–VTC |
| 2–9 | 0 | 7–VTC |
| 2–9 | 1 | 7–VTC |

Relay 7–ABX operated indicates that the terminating office code digits received are in the series used for central office designations (220–299, 320–399, etc.). Relay 7–TC is operated for calls to test lines or test boards, which calls are originated by the maintenance force (10X codes). Relay 7–VTC operated indicates that a toll code (0XX or 1XX) or an area code (X0X or X1X) was dialed in error in the terminating office code positions. The action of the circuit on calls involving the operation of relays 7–TC and 7–VTC is described later. Relay 7–ABX will be operated for all correctly dialed subscriber calls.

Since the terminating office code for the call now being described is 567, a path is now closed upon the operation of relay 8–CK from ground through make contacts 7(1–IC0), 7(8–CK), 7(6–TA4), break contacts 7(6–TA7), make contacts 7(6–TB4), break contacts 7(6–TB7) to the winding of relay 7–ABX which now operates.

1.05 *Originating code point selection*

Relays 6–OA0, 1, 2, 4, 7; 6–OB0, 1, 2, 4, 7; and 6–OC0, 1, 2, 4, 7 are operated as previously described on a two-out-of-five code basis to record the three digits (223) of the originating office code. The contacts of relays 6–OB0, 1, 2, 4, 7 are arranged in a circuit shown on Fig. 7 so that one of relays 7–B2 through 7–B9 is operated in accordance with the value of the B digit of the originating office code. The B digit of 2 now registered in these relays closes a path from ground through make contacts 7(6–OB0) and 7(6–OB2) to operate relay 7–B2.

Figure 7:
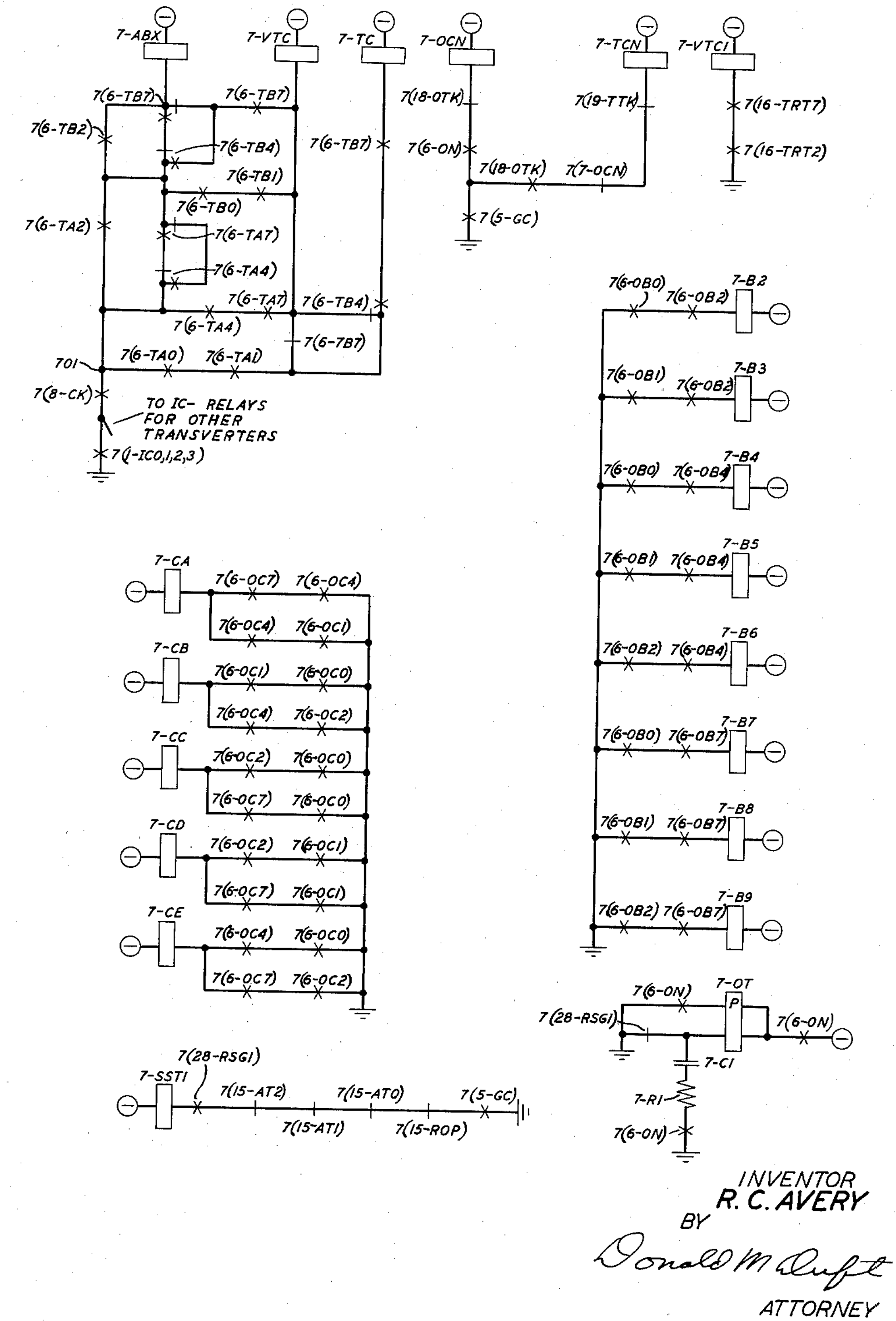

The contacts of relays 6–OC0, 1, 2, 4, 7 are arranged in a circuit on Fig. 7 to operate one of relays 7–CA, 7–CB, 7–CC, 7–CD, 7–CE in accordance with the numerical value of the C digit of the originating office code as follows:

| C Digit | Relays Operated |
|---|---|
| 0 or 5 | 7–CA |
| 1 or 6 | 7–CB |
| 2 or 7 | 7–CC |
| 3 or 8 | 7–CD |
| 4 or 9 | 7–CE |

The C digit of the originating office code for our hypothetical call is 3 and, therefore, a path is closed at this time from ground through make contacts 7(6–OC1) and 7(6–OC2) to operate relay 7–CD.

The circuit next described comprises a translator which determines whether or not the digits received as representing the A, B, and C digits of the originating office code actually represent a working office in one of the three areas served by this CAMA office on an originating basis. The present billing indexer circuit is arranged for a maximum of 48 originating offices which may be located in one, two or three national areas. Therefore, it may be said that the translator analyzes each of the thousand different three digit code combinations which could represent an originating office and determines which 48 of these represent a valid working office insofar as the CAMA office is concerned. If the translator determines that the A, B and C digits received do not represent one of the 48 working offices, it supplies an indication to a vacant originating code circuit which effects the necessary circuit actions within the billing indexer to inform the transverter that information pertaining to an invalid originating office code has been received. On the other hand, if the translator determines that the A, B and C digits received represent one of the 48 working office codes, it proceeds to obtain certain preliminary charging information pertaining to this originating office in a manner described hereinafter.

Figure 11:
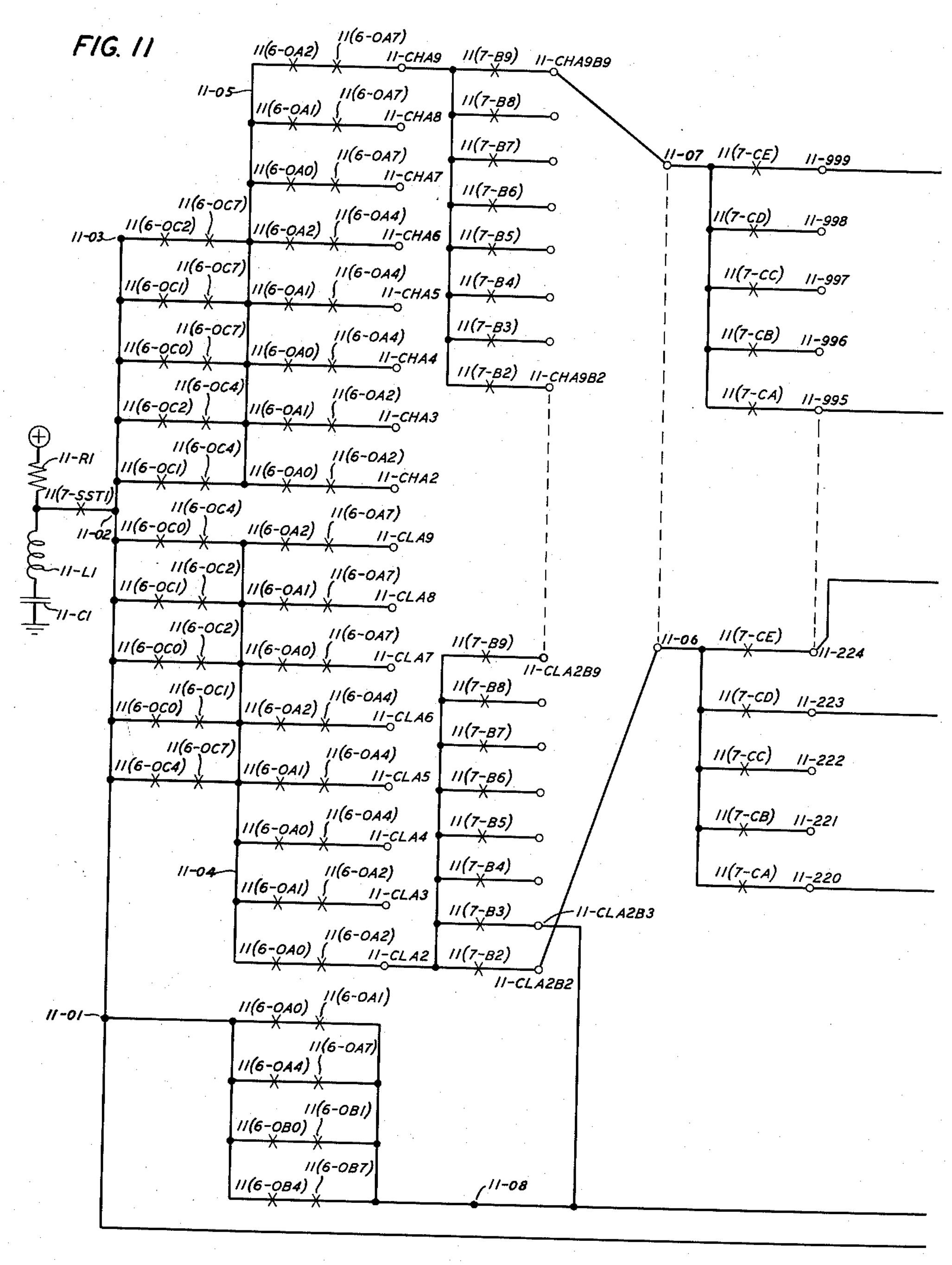
Figure 28:
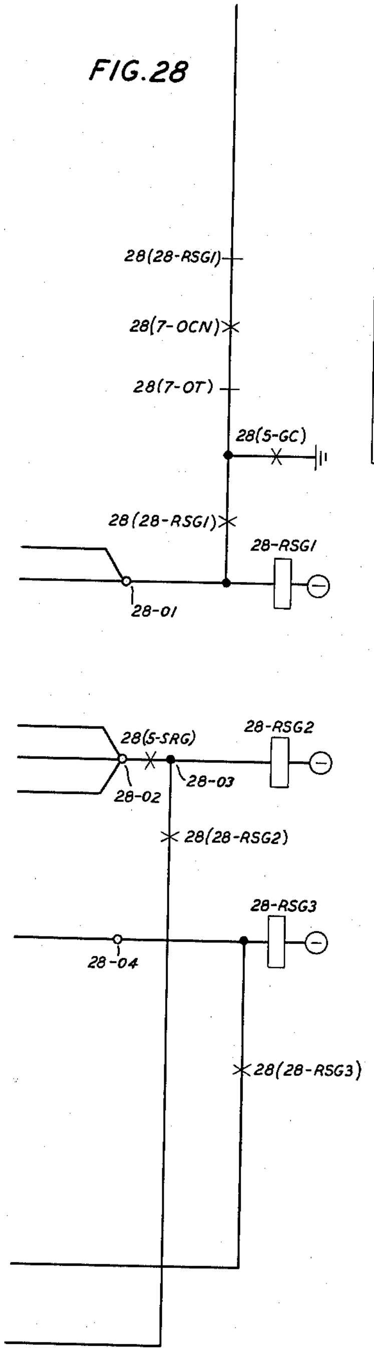
Figure 31:
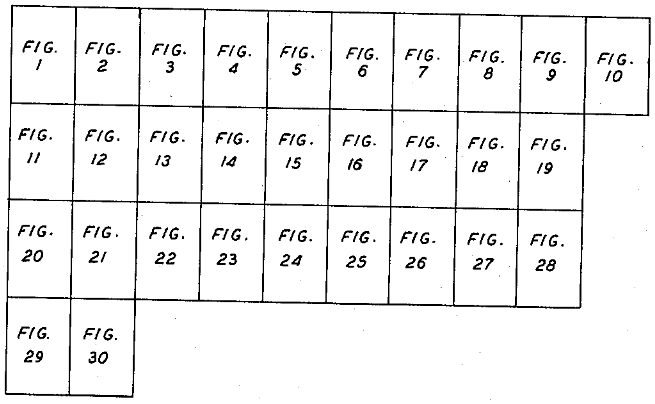

The input signal for the translator extends from ground on contacts 28(5–GC) which are now closed, through break contacts 28(7–OT), make contacts 28(7–OCN), break contacts 28(28–RSG1), over the wire extending from Fig. 28 to the lower left-hand corner of Fig. 11, to terminal 11–01. Immediately to the right of terminal 11–01 is a group of contacts on the relays registering the A and B digits of the originating office code. This group of contacts closes a circuit from terminal 11–01 to terminal 11–08 and then to terminal 12–VOC in the event that either or both of the A and B digits are a 0 or a 1. These digits are not used for originating office codes. Therefore, the presence of a 0 or a 1 for either the A or B digit indicates that the call was not originated by a paying subscriber and therefore the billing indexer need not go through its usual operations in order to derive charging information for the call. The closure of the path between terminals 11–01 and 12–VOC (vacant originating code) places a ground on this terminal which, in a manner described hereinafter, effects the necessary circuit action so that the billing indexer does not derive charging information for the call.

The ground on terminal 11–01 is also extended upwards to terminals 11–02 and 11–03 to which are connected the contacts of relays 6–OC0, 1, 2, 4, 7, which are operated to represent in two-out-of-five code form the C digit of the originating office code. The contacts on these relays comprise the first step of the translator and together provide a means for translating the C digit. The contacts on these relays apply a ground either to conductor 11–04 or to 11–05 depending upon the numerical value of the C digit. Ground is applied from terminal 11–01 to conductor 11–04 in the event the C digit has a numerical value from 0 through 4, while ground is applied from terminal 11–02 to conductor 11–05 in the event that the C digit falls within the range from 5 to 9. It will be convenient for purposes of the following discussion if a ground on conductor 11–04 is thought of as representing the low values of the C digit (0–4) while a ground on conductor 11–05 is thought of as representing the high values of the C digit (5–9).

The A, B and C digits of the originating office code for our hypothetical call are 2, 2 and 3, respectively, and therefore, a path is closed at this time from ground on terminal 11–01, through make contacts 11(6–OC1) and 11(6–OC2) to conductor 11–04. The contacts of relays 6–OA0, 1, 2, 4, 7, which are connected to conductors 11–04 and 11–05 provide a one-out-of-eight translation for the A digit. The contacts on these relays connected to conductor 11–04 provide this translation for the low values of the C digit while the contacts connected to conductor 11–05 provide this A digit translation for high values of the C digit.

Continuing with our hypothetical call whose originating office code is 223, the ground on conductor 11–04 is extended through make contacts 11(6–OA0) and 11(6–OA2) to terminal 11–CLA2 which indicates a low C digit and an A digit of 2.

Terminal 11–CLA2 is connected to a pair of make contacts on each of relays 7–B2 through 7–B9. The contacts on these relays provide a B digit translation for low values of the C digit in combination with an A digit of 2. In a similar manner, each of terminals 11–CLA3 through 11–CLA9 are individually associated with similar sets of contacts on relays 7–B2 through 7–B9 for translating the B digital values for low values of C combined with A digits of 3 through 9. In a similar manner, each of terminals 11–CHA2 through 11–CHA9 are individually associated with similar sets of contacts on relays 7–B2 through 7–B9 for translating the A and B digits of the originating office codes having a high C digit value.

Continuing with our hypothetical call having an originating office code of 223, a path is extended from terminal 11–CLA2 through make contacts 11(7–B2) to terminal 11–CLA2B2.

The ground potential on terminal 11–CLA2B2 indicates that the originating office code has an A digit of 2, a B digit of 2 and a C digit value from 0 to 4. Thus, this terminal represents office codes 220 to 224. Similarly, the terminal immediately above represents office codes 230 to 234 while the terminal 11–CLA2B9 represents office codes 290 through 294. Terminal 11–CLA3 is similarly connected to an individual set of contacts (not shown) on relays 7–B2 through 7–B9 and a ground on the right-hand terminal on each of these relay contacts represents office codes 320 through 324, 330 through 334 . . . 390 through 394. Terminals 11–CLA4 through 11–CLA9 are also associated with an individual set of make contacts (not shown) on each of relays 7–B2 through 7–B9 and likewise, a ground on the right-hand terminals of these contacts represent office codes 420 through 424, 430 through 434 . . . 920 through 924 . . . 990 through 994.

In a similar manner, each of terminals 11–CHA2 through 11–CHA9 are associated with an individual set of make contacts on relay 7–B2 through 7–B9. Ground on the output terminals associated with these contacts represents office codes 225 through 229, 235 through 239, 325 through 329, 335 through 339 . . . 925 through 929 . . . 995 through 999.

As has already been discussed, each of the sixteen terminals 11–CLA2 through 11–CLA9 and 11–CHA2 through 11–CHA9 has an individual set of eight make contacts on relays 7–B2 through (7–B9) associated therewith. Therefore, there are 128 (16×8) terminals in the group 11–CLA2B2 . . . 11–CLA2B9 . . . 11–CHA9B2 . . . 11–CHA9B9. Each of these terminals represents a translation for a unique value of the A digit, a unique value of the B digit and a partial translation indicating a C digit value of 0 through 4 or 5 through 9. All of these 128 terminals, each of which represents one or more originating office codes, are not needed in the present circuit which, in the embodiment disclosed herein, has facilities for a maximum of only 48 originating office codes. The exact number of terminals 11–CLA2B2 . . . 11–CHA9B9, which will be needed to represent all the working originating office codes depends upon the numerical arrangements of these codes for any given installation. For example, if the 48 originating office codes were bunched together so that they ran serially with no omission from Nos. 220 through 267, then only terminals 11–CLA2B2, 11–CHA2B2, 11–CLA2B3, 11–CHA2B3, 11–CLA2B4, 11–CHA2B4, 11–CLA2B5, 11–CHA2B5, 11–CLA2B6, and 11–CHA2B6 would be required. The remaining ones of the 128 terminals in this group would then represent non-working office codes and would be connected to terminal 12–VOC which represents all vacant office codes.

On the other hand, the originating office codes might be widely separated in such a manner so that none of terminals 11–CLA2B2 . . . 11–CHA9B9 represent more than one working office. In this case, 48 of these terminals would represent the 48 working originating offices while the remaining ones of these 128 terminals would be connected to terminal 12–VOC to represent a vacant originating office code.

The 48 originating office codes could also be arranged so that some of terminals 11–CLA2B2 . . . 11–CHA9B9 represent two or more working office codes while the rest either represent a single working office code or a vacant office code.

Each of terminals 11–CLA2B2 . . . 11–CHA9B9 represent only a partial translation for the C digit. Therefore, whenever one of these terminals represents one or more working office codes, it is necessary to obtain a further translation in order to obtain a unique value for the C digit and thereby identify which one of the plurality of working office codes associated with this terminal is involved on a particular call. This further C digit translation is not necessary for those terminals representing no working central offices since in this case the particular value of the C digit is of no importance.

Each of terminals 11–CLA2B2 . . . 11–CHA9B9 representing one or more working office codes is connected to an individual set of make contacts on each of relays 7–CA through 7–CE in order to obtain a unique translation for the value of the C digit. It will be recalled that relays 7–CA through 7–CE represent C digit values of 0 through 4 or 5 through 9, respectively. Therefore, the contacts of these relays associated with terminals 11–CLA2B2 through 11–CLA2B9, etc. (representing the low values of the C digit), represent C digit values from 0 through 4 while the contacts of these relays associated with the terminals representing the high values of the C digit (5 through 9) represent C digit values of 5 through 9.

Let it be assumed that terminal 11–CLA2B2 represents one or more working office codes, one of which is the originating office code of 223 for our hypothetical call. Therefore, this terminal is cross-connected to terminal 11–06 in order to obtain a further translation for the C digit whenever a ground appears on terminal 11–CLA2B2. Terminal 11–CHA9B9 is also assumed to represent a plurality of working office codes and is cross-connected to terminal 11–07 in order to obtain a further translation of the C digit whenever a ground appears on terminal 11–CHA9B9.

It has been described how the originating office code of 223 for our hypothetical call effected the operation of relay 7–CD. Therefore, the ground on terminal 11–CLA2B2 caused by the A and B digits of 2 is extended through make contacts 11(7–CD) to terminal 11–223 which represents the originating office code involved in this call.

It has already been discussed how, in some cases, certain office codes will appear in more than one of the three originating areas served by the CAMA office. For example, referring to the office code of 223 for our hypothetical call, it was stated that the office represented by this code is in originating area 0. It is quite possible that area 1 and, also area 2, could have an office identified by code 223. Situations such as this, i.e., where one or more areas have the same office code, are referred to in the art as code conflicts and will be referred to accordingly from here on.

It is necessary that those of terminals 11–220 . . . 11–999 which represent conflicting office codes be connected to a circuit which provides a further translation in order to identify the area of origin for the office represented by a conflicting code. For example, let it be assumed that the code 223 represents offices in each of areas 0, 1 and 2. Therefore, a ground on terminal 11–223 does not uniquely identify the calling office but, instead, only indicates that it is office 223 which may be located in any one of the three originating areas. Terminal 11–223 is cross-connected to terminal 12–01 in order to provide for a further translation to identify the calling office.

One of the items of information furnished to the billing indexer by the transverter is the originating area. This is manifested by the operation of one of relays 6–OAR0, 1 or 2. The calling subscriber for our hypothetical call is located in area 0 and, therefore, the transverter operated relay 6–OAR0. A set of make contacts on each of relays 6–OAR0, 1, 2 are connected to terminal 12–01, another set being connected to terminal 12–02 in order to provide a further translation for office codes involved in code conflicts. The ground on terminal 11–223 may now be traced through make contacts 12(6–OAR0) to terminal 12–223–0 which represents the calling office code 223 and originating area 0. The two terminals immediately above, represent the same office code in originating areas 1 and 2 respectively.

Terminal 11–995 is shown as representing conflicting office codes and is therefore connected to terminal 12–02 in order to provide for a translation of the originating area for calls involving originating office code 995. Similarly, any other of terminals 11–220 through 11–999 which represent conflicting office codes are connected to similar sets of contacts (not shown) on relays 6–OAR0, 1 and 2 in order to obtain a translation of the originating area.

Summarizing the description so far, a ground on one of terminals 11–220 through 11–999, which represents a non-conflicting office code, fully identifies the calling office represented thereby. On the other hand, the identity of offices involved in code conflicts is manifested by ground on one of terminals 12–223–0 through 12–223–2, and 12–995–0 through 12–995–2.

A further item of information required on each call is the rate-class information. Therefore, each of terminals such as 12–223–0, which represent offices involved in code conflicts, as well as terminals such as 11–220, which represents a non-conflicting office code, is connected to an individual set of make contacts on each of relays 6–ORC0, 1, 2 in order to obtain the required rate class information.

Figure 12:
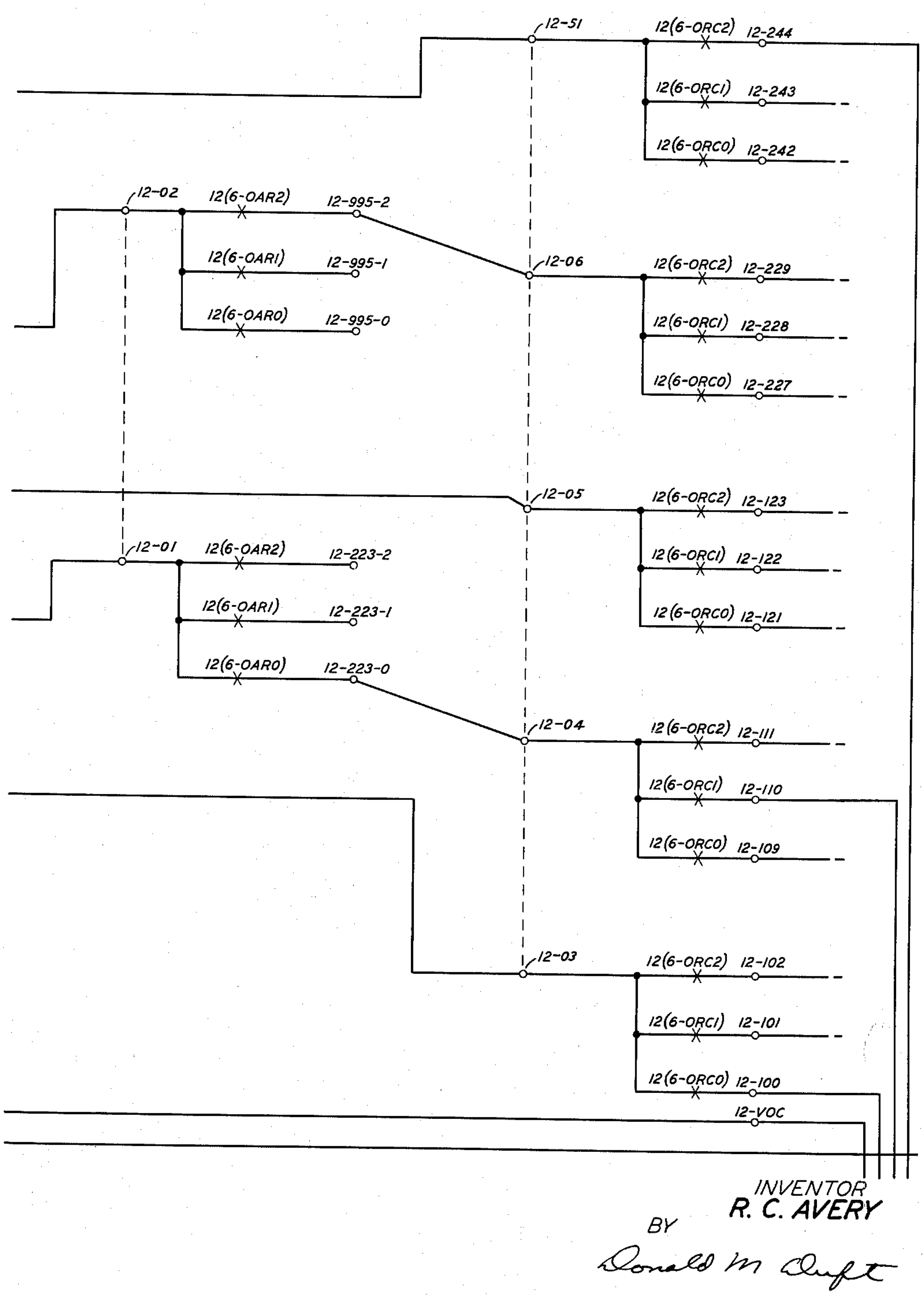
Figure 13:
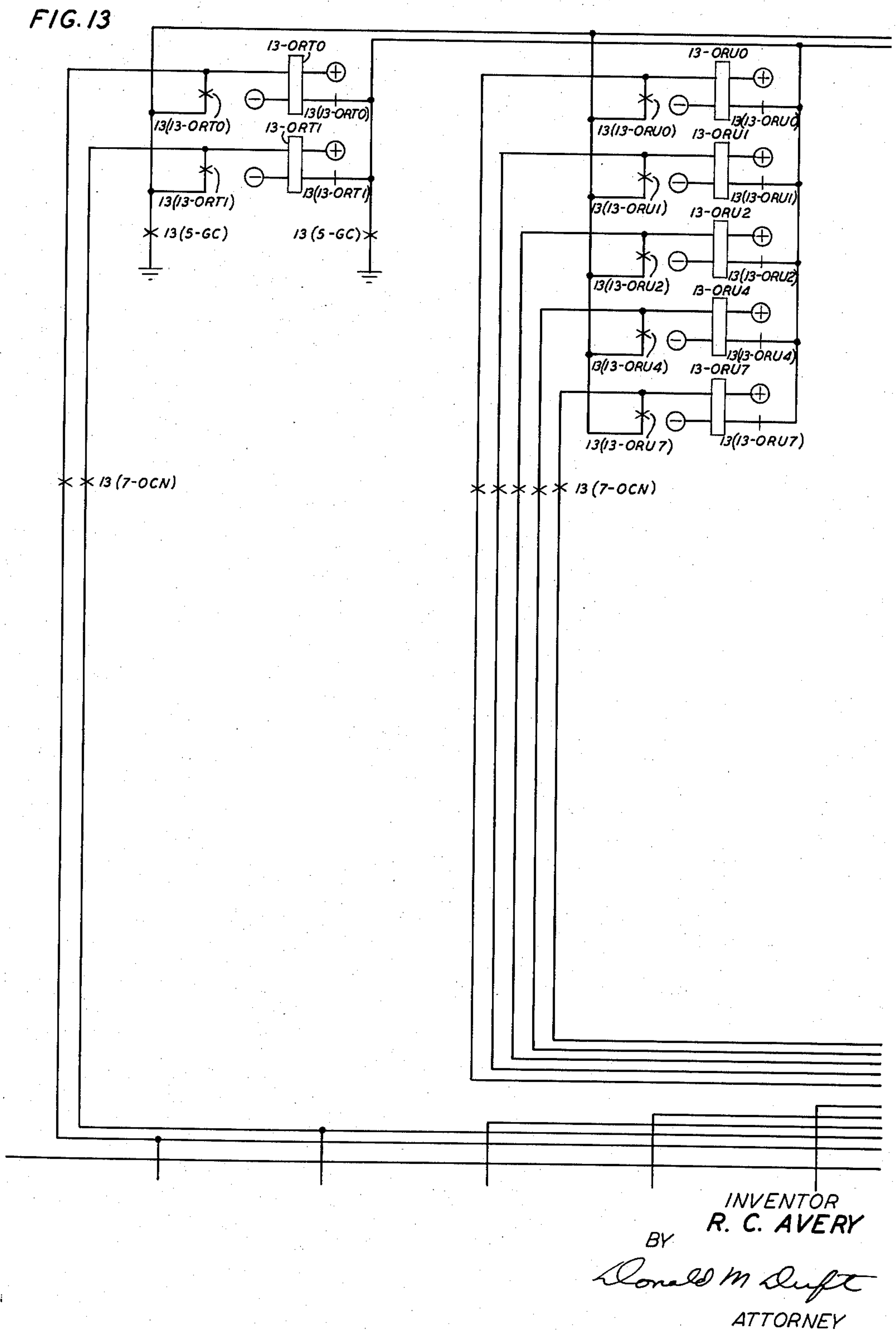
Figure 14:
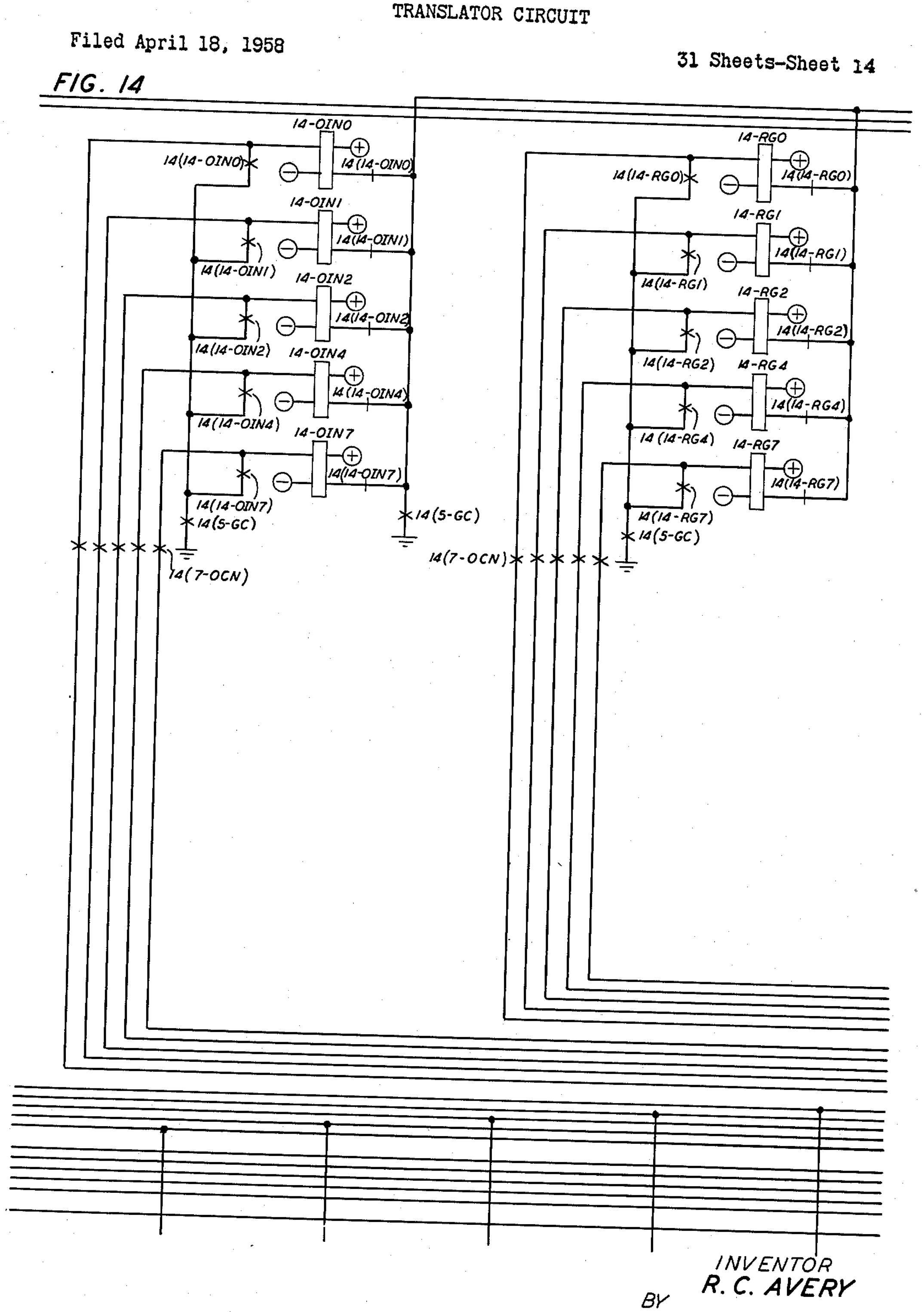
Figure 15:
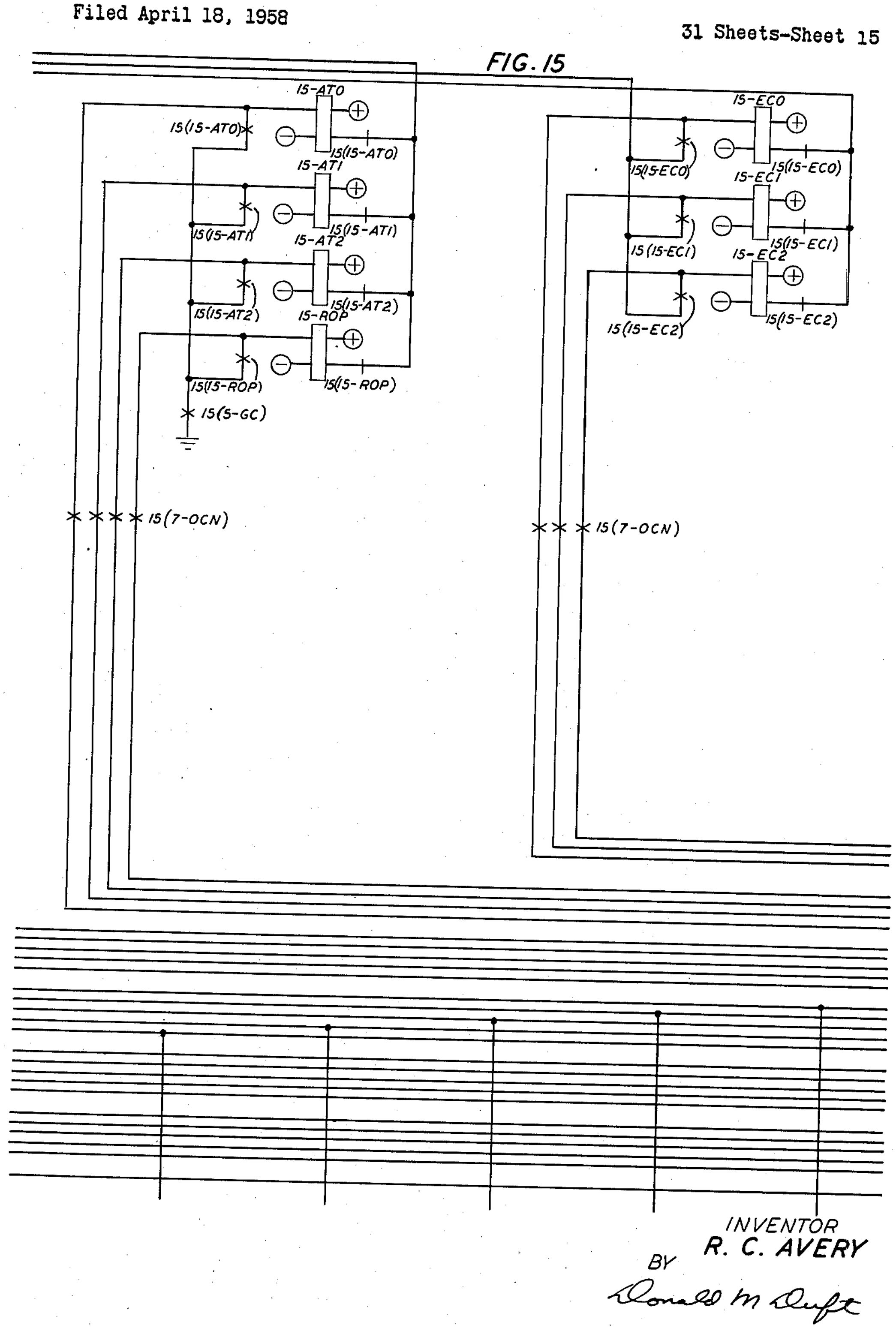

Reviewing briefly, the translator circuit disclosed on Figs. 11 and 12 provides a means of identifying the originating office for each call together with the rate-class information. This is true regardless of whether the originating office code is exclusive to a single office or whether it is a conflicting office code which represents a plurality of offices, each of which is in a different one of the three areas. The output indication identifying the originating office may come from terminals such as 11–220 which represents a non-conflicting originating working office code or it may come from a terminal such as 12–223–0 for conflicting office codes where the same office code represents working offices in two or more areas and therefore an area translation is required. Regardless of where the output indication exclusive to each working office comes from, it may be observed that if there are 48 working offices, as has been assumed herein, there will be 48 separate individual output indications each of which is exclusive to one of the working offices. Each of these offices may have three originating rate class digits associated therewith which are used to provide different charge treatments for different classes of service.

In order to obtain the charging information for each call, it is necessary to know not only the identification of the originating office but it is also necessary to know the rate class information. Therefore, each output indication from the translator identifying the calling office is connected to an individual set of make contacts on each of relay 6–ORC0, 6–ORC1, and 6–ORC2 in order to obtain the desired rate-class information. Since for 48 offices there will be 48 different output indications from the translator, there are 48 groups of contacts on relays 6–ORC0 through 6–ORC2 with each one of the 48 output indications from the translator being connected to an individual group of these contacts. These 48 groups of three contacts each are connected to terminals 12–100 through 12–244, thereby providing 144 output indications (3×48) each of which identifies the calling office and rate class for a particular call.

Returning to our hypothetical call for which the originating office code was 223 in area 0 and whose rate class is 1, it may be seen that the ground on 12–223–0 is extended to terminal 12–04, through make contacts 12(6–ORC1) to terminal 12–110. A wire is extended from terminal 12–110, as well as all the others of terminals 12–100 to 12–244 except those representing unused rate classes, and is selectively run through various combinations of the coils shown on Figs. 22 through 27 in order to obtain the following items of information for the call.

1.06 *Coil field*

The coil field consists of six groups of five coils each, the groups being designated 22A–, 23B–, 24C–, 25D–, 26E– and 27F– with the individual coils in each group being numbered 0, 1, 2, 4, and 7. Each coil has associated with it a tube, and resistances connected between a source of positive potential and ground which provide a permanent positive bias on the start anode of each tube. Jumpers from terminals 12–100 through 12–244 which represent working office and rate-class combinations are selectively threaded through the apertures in the required coils and are terminated at terminal 28–01.

A momentary surge of current through a jumper causes a voltage to be induced in the coils through which the jumper passes. This potential fires the tubes associated with these coils which, in turn, causes the operation of the register relays in accordance with the table shown in section 1.07. These relays are biased in the operate direction by means of their primary windings in order to increase their speed of operation. For example, relay 13–ORT0 is biased in its operate direction by the current flowing through its lower winding from negative battery, through its break contacts, through make contacts 13(5–GC) to ground. The current flowing through this path allows the relay to operate faster than it normally would when the path for its other winding is closed.

1.07 *First translation—originating code*

The closure of ground from one of punchings 12–100 through 12–244, through the associated jumper, to terminal 28–01 causes relay 28–RSG1 to operate. This relay locks to ground over a path including make contacts 28(28–RSG1) and 28(5–GC) to ground. At the same time, its break contacts 28(28–RSG1) open its operating path.

The operation of relay 28–RSG1 opens its break contacts 7(28–RSG1) to start timer 7–OT. The operation of this relay also closes a path from ground through contacts 7(5–GC), break contacts 7(15–ROP), 7(15–AT0), 7(15–AT1), 7(15–AT2), make contacts 7(28–RSG1) to the winding of relay 7–SST1 which now operates. The closure of make contacts 11(7–SST1) connects a source of surge current (elements 11–R1, 11–L1 and 11–C1) through the selected one of terminals 12–100 . . . 12–244 and the selected jumper to ground. This large surge current through the selected jumper causes a pulse to be induced in each coil through which it is threaded. The pulse induced in each coil fires its related tube. Make contacts on relay 7–OCN, which is now operated, connect the gas tubes to the register relays which record several items of information as follows:

| Item of Information | Coils Used | Relays Connected | Code Pattern |
|---|---|---|---|
| Originating Rate Treatment—Tens. | 22–A0, 1 | 13–ORT0, 1 | 1 out of 2. |
| Originating Rate Treatment—Units. | 23–B0, 1, 2, 4, 7 | 13–ORU0, 1, 2, 4, 7 | 2 out of 5. |
| Office Index | 24–C0, 1, 2, 4, 7 | 14–OIN0, 1, 2, 4, 7 | 2 out of 5. |
| Recorder Group | 25–D0, 1, 2, 4, 7 | 14–RG0, 1, 2, 4, 7 | 2 out of 5. |
| Area Transfer | 26–E0, 1, 2 | 15–AT0, 1, 2 | 1 out of 3. |
| Entry Combination | 27–F0, 1, 2 | 15–EC0, 1, 2 | 1 out of 3. |

The information indicated in the table above for each call is arbitrarily determined in accordance with the rate structure and in accordance with the relationship between the offices involved, the trunk circuits involved, and the recorder groups which serve each office. The originating rate treatment may be any value from 00 through 19. Coils 22–A0 and 22–A1 are used to indicate an originating rate treatment tens digit of 0 and 1, respectively, while coils 23–B0, B1, B2, B4, and B7 are used in a two-out-of-five pattern to represent an originating rate treatment units digit from 0 through 9. The office index may comprise any digit from 0 through 9 and provides an indication as to which of ten calling offices served a call. This information is supplied to the circuit in a two-out-of-five pattern by means of coils 24–C0 . . . 24–C7. The recorder group digit may have any value from 0 through 9 and is furnished in a two-out-of-five pattern by means of coils 25–D0 . . . 25–D7. The area transfer and entry combination digits provide certain other necessary information and are fed in a one-out-of-three pattern into the circuit by means of coils 26–E0 . . . 26–E2 and 27–F0 . . . 27–F2, respectively.

At the time each billing indexer is installed, information is given to the installer which shows how the jumper representing every working office and rate-class combination is to be threaded through the coils so as to give the desired output information therefrom when it is energized by the surge current.

Let it be assumed that for originating office code 223 in area 0, and rate class 1, the rate treatment is 09, the office index is 8, the recorder group is 6, the area transfer is 0 and the entry combination digit is 1. Therefore, the installer connects a wire from terminal 12–110, which represents office code 223 in area 0 with a rate class of 1, and threads this wire through coils 22–A0, 23–B2 and 23–B7, 24–C1 and 24–C7, 25–D2 and 25–D4, 26–E0, and 27–F1 to terminal 28–01. The corresponding information is ascertained for every other working office and rate-class combination and similar jumpers are extended from each of the remaining terminals 12–100 through 12–244 through the selected ones of the coils to terminal 28–01.

Continuing with our hypothetical call, the surge current passing through the jumper connected to terminal 12–110 induces a potential in coils 22–A0, 23–B2, 23–B7, 24–C1, 24–C7, 25–D2, 25–D4, 26–E0 and 27–F1. The potential generated in each coil is applied to the start anode (element 1) of its related tube, which causes it to break down and conduct. The breakdown and conduction of tube 22–A0 causes relay 13–ORT0 to operate over the path extending from positive battery on one side of its winding, through its winding, make contact 13(7–OCN), anode 2 of the tube 22–A0, the tube gap, the cathode 3 of the tube to ground. Relay 13–ORT0 in operating closes a locking path for itself through its make contacts 13(13–ORT0), make contacts 13(5–GC) to ground. In a similar manner, the breakdown and operation of the rest of the tubes associated with the above-enumerated coils causes the register relays to operate and lock in the following manner:

| Tubes | Relays |
|---|---|
| 22–A0 | 13–ORT0 |
| 23–B2 | 13–ORU2 |
| 23–B7 | 13–ORU7 |
| 24–C1 | 14–OIN1 |
| 24–C7 | 14, OIN7 |
| 25–D2 | 14–RG2 |
| 25–D4 | 14–RG4 |
| 26–E0 | 15–AT0 |
| 27–F1 | 15–EC1 |

1.071 *Originating rate treatment*

Rate treatments are patterns representing charging rates to other offices. They are used both for the originating and terminating offices involved in a call. They are advantageous in that several offices may have corresponding charging rates to or from all other offices, and therefore, all offices having the same rate pattern to other offices are assigned the same originating rate treatment digits. In this manner, a comparatively small number of rate treatments may be used to determine the charging rates. This method reduces the amount of equipment which would be required if the offices involved on each call were compared directly to determine this information.

Provision is made herein for 20 originating rate treatments, numbered 00 to 19, to which the possible 144 originating office and rate-class combinations are assigned as required. The originating rate treatment, recorded in relays 13–ORT0, 1 and 13–ORU0, 1, 2, 4, 7, is combined with the terminating rate treatment (explained in detail hereinafter) to determine the message billing index as described later.

1.072 *Office index*

The office index is a single digit 0 to 9 which is used to identify the calling one of the ten offices which may be assigned to a recorder. This information is used to perforate the office index digit on the AMA tape. It is sent to the transverter on a two-out-of-five basis from ground on the make contacts of the operated ones of relays 14–OIN0, 1, 2, 4, 7 on Fig. 3, through make contacts 3(1–IC0) to operate associated relays in the transverter. These operated relays in the transverter effect the necessary subsequent circuit operations whereby the office index is perforated on the AMA tape.

1.073 *Area transfer*

The number of the recorder to which an incoming trunk is assigned in the central office is one of the items of information which the transverter receives from the sender. The transverter uses this number for selection of the recorder and in addition translates it into an originating area indication. This causes the operation of one of relays 6–OAR0, 1, 2 as previously described. These relays are used to differentiate between conflicting codes, i.e., originating code numbers which appear in more than one area. It, therefore, follows that each originating office involved in a code conflict must be assigned to a recorder which correctly identifies the area in which the office is located.

There is no such requirement with respect to non-conflicting codes as there is no need for area discrimination in these cases. It is, therefore, possible to assign offices having non-conflicting codes to any recorders, without restriction as to the area indication provided that the correct area can be determined in some other manner. The total number of recorders required can be reduced by this expedient in some cases.

The area transfer feature provides for this type of assignment by operating one of relays 15–AT0, 1, 2 under control of the originating code rather than under control of the recorder number. These three relays represent the three possible originating areas and the operated one indicates the area in which the calling office is located.

It is necessary that all conflicting office codes be assigned the proper recorder since the translation of these codes to provide a unique output indication on one of terminals 12–100 to 12–244 is controlled in part by make contacts on relays 6–OAR0, 1, and 2 which, in turn, are operated by the transverter under control of the recorder number. No such requirement is necessary for non-conflicting codes since their translation path to provide a unique output indication on Fig. 12 does not include the make contacts on any of relays 6–OAR0, 1, 2.

1.074 *Identification of terminating area—7 digit calls*

For 10 digit calls the terminating area is identified by the transverter as one of the three possible bulk-billed areas or as some other area, and one of relays 5–TAR0, 1, 2, 3 is operated accordingly. Any 7 digit call received by this office will necessarily come from one of the three areas it serves on an originating basis. With the exception of certain special conditions which are described later, the terminating area for these 7 digit calls must be the same as the originating area.

It has been previously described in connection with our hypothetical call how the transverter operates relay 5–7DG in the billing indexer to indicate a 7 digit call. The operation of relay 5–7DG together with the operation of relay 15–AT0 closes a path to operate relay 5–TAR0 from ground on make contacts 5(5–7DG), make contacts 5(15–AT0) through the windings of relays 5–TAR0 and 5–XTAR to negative battery. Relay 5–XTAR does not operate at this time since it is of the marginal type and operates only in the event that, due to a circuit defect, two or more of relays 5–TAR0 through 5–TAR3 are operated. This same circuit also grounds a lead to the transverter to indicate that the terminating area for this call is area 0. The transverter forwards this information to the marker to enable it to complete the call to the proper terminating area.

The operation of relay 5–TAR0 operates relay 8–BBFC from ground on make contacts 8(5–TAR0). The terminating area information produced by the operation of one of relays 15–AT0, 1, 2 is only useful circuitwise for 7 digit calls on which the transverter does not supply the billing indexer with the terminating area. It will be recalled in connection with the description in the section 1.03 that for 10 digit calls, the transverter indicates the identity of the terminating area by directly operating one of relays 5–TAR0, 1 or 2 for one of the three bulk-billed areas or relay 5–TAR3 if the call is to be completed to an area other than one of the three bulk-billed areas.

1.075 *Recorder group check*

A recorder group consists of one or more recorders to which trunks from a maximum of 10 offices are assigned, and each of which is represented by a single digit, the office index. Each recorder has a capacity of 100 trunks. A single recorder is therefore sufficient for 10 offices if the total number of trunks from those offices is 100 or less. If more than 100 trunks extend from these 10 offices through this switching center, these offices are assigned to two or more recorders as required, and the trunks from each office are distributed as equally as possible over the recorders assigned to it.

Figure 2:
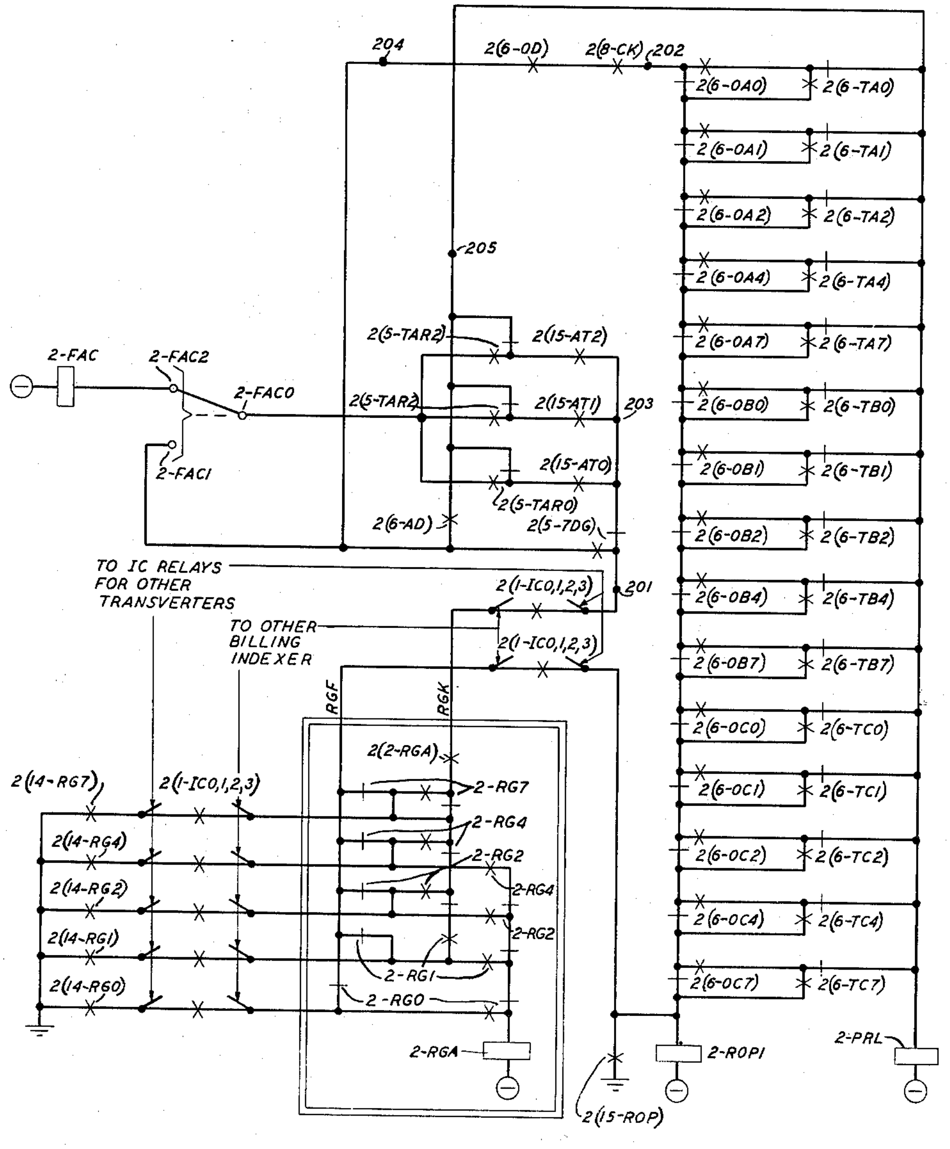

The recorder group number obtained as described above from the translation of the originating code and recorded in the operated two out of the five relays 14–RG0, 1, 2, 4, and 7 is transmitted to the transverter and therein compared with the recorder group number previously received from the sender and represented by the two operated relays out of the five whose contacts 2–RG0, 1, 2, 4 and 7 are shown within the rectangle representing the transverter in Fig. 2. The relays with which these contacts are associated were previously operated in accordance with the recorder number received from the sender which receives this information from the incoming trunk. The recorder number received by the transverter from the sender is compared for identity with the recorder group number received from the billing indexer. These two numbers should match, thereby indicating that the originating office code given by the subscriber and the trunk used on the call are associated with the same recorder group.

This check for the identity of the two recorder group numbers is made upon the operation of two of the billing indexer relays 14–RG0, 1, 2, 4, 7 whose contacts connect ground to similarly designated contacts in that portion of the transverter circuit shown within the rectangle of Fig. 2.

It was assumed in connection with section 1.07 that the recorder group number was 6 for our hypothetical call. Therefore, both contacts 2(14–RG2) and 2(14–RG4) are closed at this time. The closure of contacts 2(14–RG2) extends a ground through make contacts 2(1–IC0), through make contacts 2–RG2 in the transverter, break contacts 2–RG1 and 2–RG0 to the winding of relay 2–RGA in the transverter which now operates. A path is also extended at this time from ground through make contacts 2(14–RG4), 2(1–IC0), make contacts 2–RG4 in the transverter, break contacts 2–RG7 and make contacts 2–RGA in the transverter, make contacts 2(1–IC0), to terminal 201.

The ground on terminal 201, which functionally indicates a match between the two recorder group numbers, continues through circuit paths which are described in the immediate following section. If the recorder group numbers are not the same, ground is connected to lead RGF to operate relay 2–ROP1.

1.076 *Match check of office codes*

On intra-area calls, the originating and terminating office codes should never be the same, since local calls involving the same central office should never be routed through the CAMA switching center. If these codes are the same, it is presumed that the subscriber gave the called number in error when the CAMA operator asked for the calling number. A match check of these codes is made on all intra-area calls in which the CAMA operator is involved to detect the existence of this condition. This check is made on all 7 digit calls and on all area code calls in which the originating and terminating areas are the same.

For a regular 7 digit call, the ground on terminal 201 is extended through make contacts 2(5–7DG), the operation of which manifests a 7 digit call, through make contacts 2(6–OD), the operation of which manifests an operator identified call, through make contacts 2(8–CK), through a comparison circuit which comprises contacts on the register relays storing the originating and terminating office codes. This network is arranged so that in the event the originating and terminating office codes are identical, the ground on terminal 202 is extended to operate relay 2–ROP1. The operation of this relay effects certain circuit operations, which are described later, to recall the operator so that she may again request the calling number from the subscriber. This comparison circuit is also arranged so that in the event one or more digits of the two office codes are not identical, a circuit is closed from terminal 202 to the winding of relay 2–PRL which effects circuit operations, which are later described, to release the operator's position and allow the billing indexer to proceed with its processing of the call.

Continuing with our hypothetical call wherein the originating code is 223 while the terminating office code is 567, ground on terminal 202 is extended through make contacts 2(6–OA0), and through break contacts 2(6–TA0) to the winding of relay 2–PRL to operate it.

There are cases for 7 digit calls in which the calling number is not orally ascertained by the operator but, instead, is automatically obtained by the switching equipment at the subscriber's central office. In this case, relay 6–AD is operated from a ground in the transverter, thereby manifesting an automatically identified calling office code. The match check is skipped under these conditions, and "free call" routing is provided as hereinafter described. In this case, the ground on terminal 201 is extended through make contacts 2(5–7DG), 2(6–AD) to the winding of relay 2–PRL to operate it.

The circuit of Fig. 2 also contains provisions for effecting certain circuit operations for 10 digit calls depending upon whether or not the calling area code matches the called area code. On 10 digit calls the originating and terminating office codes may be the same since they represents central offices in different national areas. In these cases the code identity checking circuit is not used and, after a check to insure the calling and called areas are not the same, relay 2–PRL is operated since the office code checking is bypassed. If the calling and called area codes are different, the operated one of relays 15–AT0, 1, 2 will be different from the operated one of relays 5–TAR0, 1, 2 and, therefore, a path will be closed from terminal 203 through the operated one of contacts 2(15–AT0, 1, 2) through the normal one of break contacts 2(5–TAR0, 1, 2) to the winding of relay 2–PRL to operate it.

The circuit of Fig. 2 provides for two alternative circuit actions which may be effected in the event that the calling and called area codes are identical. Any time the calling area code matches the called area code a path will be closed from terminal 203 through the operated make contacts on one of relays 2(15–AT0, 1, 2) and through the corresponding make contact on the operated contacts of one of relays 2(5–TAR0, 1, 2) to terminal 2–FAC0. For example, if a subscriber in originating area 0 dials the national area code for a call that is to be completed in that area, both relays 15–AT0 and 5–TAR0 would be operated. A path would be closed at this time from terminal 203 through contacts 2(15–AT0) and 2(5–TAR0) to terminal 2–FAC0. The ground on terminal 2–FAC0 is an indication that the calling subscriber dialed his own national area code in attempting to reach a called party within his area when, actually, he should only dial a 7 digit number in attempting to reach any party within his own national area.

The circuit of Fig. 2 provides for two alternative circuit actions which may be effected in response to the ground on terminal 2–FAC0. First, the telephone company may decide that calls of this type should not be completed and should, therefore, be interrupted at this point and the calling subscriber advised to complete the call to the called party by dialing the proper 7 digit number. In this case, terminal 2–FAC0 is interconnected to terminal 2–FAC2 so that the ground on terminal 2–FAC0 operates relay 2–FAC. In a manner described hereinafter, the operation of relay 2–FAC interrupts and halts the processing of the call and effects circuit operations whereby the calling subscriber is advised to call again by dialing 7 digits.

Alternatively, the telephone company may choose to let calls of this type proceed in the normal manner. In this event terminal 2–FAC0 is connected to terminal 2–FAC1 which leads through make contacts 2(6–OD) and 2(8–CK), terminal 202, to the office code check circuit which checks that the originating and terminating office codes are not identical or are identical by operating either relay 2–PRL or 2–ROP1 in the manner hereinbefore described. If the originating office code was obtained automatically from the transverter as manifested by the operation of relay 6–AD, the ground on terminal 2–FAC1 is extended through make contacts 2(6–AD) to operate relay 2–PRL.

1.077 *Position release*

The CAMA operator's position remains connected to the sender while the above operations are taking place so that the operator may be recalled if an error should be detected in the originating code. For a regular call, however, relay 2–PRL operates as above described and indicates that the code is satisfactory and that the operator's position may be released after certain checks have been made.

1.078 *Entry combination*

Entry combinations are patterns used in conjunction with the message billing index, as described later, to determine the type of entry to be made on the AMA tape. Three such patterns are provided, represented by relays 15–EC0, 1 and 2 to which the 48 originating offices are assigned as required.

1.079 *Originating translation check*

The 7–OT timer, which was started by the operation of relay 28–RSG1 allows maximum time for the above operations and for the deionization of the tubes associated with the energized coils. All the gas tubes which fired on the first translation deionize as soon as their associated relays operate because their anodes are placed at ground potential, thereby short-circuiting the tube, as soon as the make contact on the associated relay operates. For example, anode 2 of gas tube 22A0 is placed at ground potential as soon as its relay 13–ORT0 is operated over the path extending from ground through make contacts 13(5–GC), 13(13–ORT0) to anode 2. At the expiration of this time interval relay 7–OT operates and, in turn, operates relay 18–OTK providing the correct number of register and control relays are operated at this time.

Continuing with our hypothetical call, a ground is extended through make contacts 18(5–GC), 18(7–OT), break contacts 18(5–XTAR), 18(7–TC), 18(7–VTC), make contacts 18(7–ABX), break contacts 18(5–AC), make contacts 18(5–7DG), break contacts 18(2–ROP1), make contacts 18(2–PRL), break contacts 18(2–FAC), make contacts 18(6–AD), where the originating code is automatically identified, break contacts 18(6–OD), break contacts 18(8–TS), make contacts 18(8–BBFC), break contacts 18(15–ROP) and 18(15–EC0), make contacts 18(15–EC1), break contacts 18(15–EC2), make contacts 18(13–ORT0), break contacts 18(13–ORT1), break contacts 18(13–ORU0), 18(13–ORU1), make contacts 18(13–ORU2), break contacts 18(13–ORU4), make contacts 18(13–ORU7), break conatcts 18(14–OIN0), make contacts 18(14–OIN1), break contacts 18(14–OIN2), 18(14–OIN4), make contacts 18(14–OIN7), break contacts 18(14–RG0), 18(14–RG1), make contacts 18(14–RG2), 18(14–RG4), break contacts 18(14–RG7), make contacts 18(15–AT0), break conatcts 18(15–AT1), 18(15–AT2), make contacts 18(8–ROPK) to the winding of relay 18–OTK which now operates.

It should be noted that the nature of the operation path of relay 18–OTK is such that it operates only if the proper number of register relays in each group are operated. For example, referring to the lower right-hand contact network comprising contacts on relays 7–ABX, 7–VTC and 7–TC, which represent an ABX call, a vacant terminating code call and a test call, respectively, the path from ground on break contacts 18(5–XTAR) can be completed to contacts 18(5–AC) only in the event that one, and no more than one of these three relays is operated.

Relay 8–ROPK operates when any of the register relays for the first translation operate. This circuit is shown in the upper right-hand corner of Fig. 8. Its operation functionally indicates that at least one of the relays which normally could be expected to operate on a successful call has operated. Break contacts 18(8–ROPK) open a path over which relay 18–OTK could be operated from ground on terminal 18–01 through make contacts 18(15–ROP). All the terminals on Figs. 11 and 12 which represent vacant originating code or vacant rate class positions are connected to terminal 12–VOC. A wire is extended from this terminal through only coil 26–E4 and then to terminal 28–01. At the time the contacts 11(7–SST1) close and send the surge current through this wire, only coil 26–E4 has a positive potential induced therein so that only the gas tube associated therewith operates and in turn operates relay 15–ROP. Inasmuch as the wire from terminal 12–VOC is threaded only through coil 26–E4, the surge current passing through this wire should not effect the operation of the gas tubes associated with any of the other coils and therefore, none of the contacts in the operation path of relay 8–ROPK should be operated. The operation path for this relay includes the contacts of every relay used on the first translation. Therefore, if the gas tube associated with another coil fires at this time due to a trouble condition, relay 8–ROPK will operate and its break contacts 18(8–ROPK) will open and prevent the ground on terminal 18–01 from being extended through make contacts 18(15–ROP) and break contacts 18(8–ROPK) to operate relay 18–OTK.

The operation of one of relays 5–TAR0, 1, 2, 3 is checked indirectly by the operation of either relay 8–BBFC or 8–TS. This check path is open at contacts 18(5–XTAR) which relay operates if more than one of relays 5–TAR0, 1, 2, 3 is operated at any one time.

With relays 2–PRL and 18–OTK operated, ground is extended through make contacts 4(5–GC), 4(18–OTK), 4(2–PRL), break contacts 4(2–FAC), and make contacts 4(1–IC0) to operate relay 4–PRL in the transverter.

This relay effects the subsequent circuit operations in the transverter so that the CAMA operator's position may be released from the sender.

The operation of relay 18–OTK also opens its break contacts 7(18–OTK) which break the operating path for relay 7–OCN thereby causing it to release and disconnect the gas tubes from the register relays used in the originating code translation.

1.08 *Terminating code point selection*

Upon the operation of relay 8–CK as previously described, a terminating code translation path is selected by means of relays 9–BR, 9–BS, 9–BT, 9–BU, 9–BV, 9–BW, 9–BTR2 . . . 9–BTR9, 9–BTS2 . . . 9–BTS9, and 9–BTT2 . . . 9–BTT9.

One of relays 9–BR, 9–BS, 9–BT and one of relays 9–BU, 9–BV and 9–BW operate under control of the B digit of the terminating code as follows:

| B Digit | 6–TB Relays Operated | BR–BW Relays |
|---|---|---|
| 2 | 0, 2 | 9–BR, BV |
| 3 | 1, 2 | 9–BR, BW |
| 4 | 0, 4 | 9–BS, BU |
| 5 | 1, 4 | 9–BS, BV |
| 6 | 2, 4 | 9–BS, BW |
| 7 | 0, 7 | 9–BT, BU |
| 8 | 1, 7 | 9–BT, BV |
| 9 | 2, 7 | 9–BT, BW |

The operated one of relays 9–BR, 9–BS, 9–BT causes the operation of one of relays 9–BTR2 . . . 9, 9–BTS2 . . . 9, or 9–BTT2 . . . 9 respectively, in accordance with the value of the A digit of the terminating code.

It has been assumed that the number of the called party is LO–7–8911 for our hypothetical call. Therefore, the terminating office code (LO–7) is 567. The A digit of 5 was entered in the billing indexer by the operation of relays 6–TA1 and 6–TA4. The B digit of 6 was entered into the circuit by the operation of relays 6–TB2 and 6–TB4. The C digit of 7 is represented by the operation of relays 6–TC0 and 6–TC7. The operation of these register relays for the B digit of the terminating office code together with the operation of relay 8–CK extends a ground through make contacts 9(8–CK), 9(6–TB2), 9(6–TB4) to operate relay 9–BS. A path is also closed at this time from ground on make contacts 9(8–CK) through 9(6–TB2), 9(6–TB4) to operate relay 9–BW. The operation of relays 9–BS and 9–BW together manifests the unique value of 6 for the B digit of the terminating office code.

Figure 29:
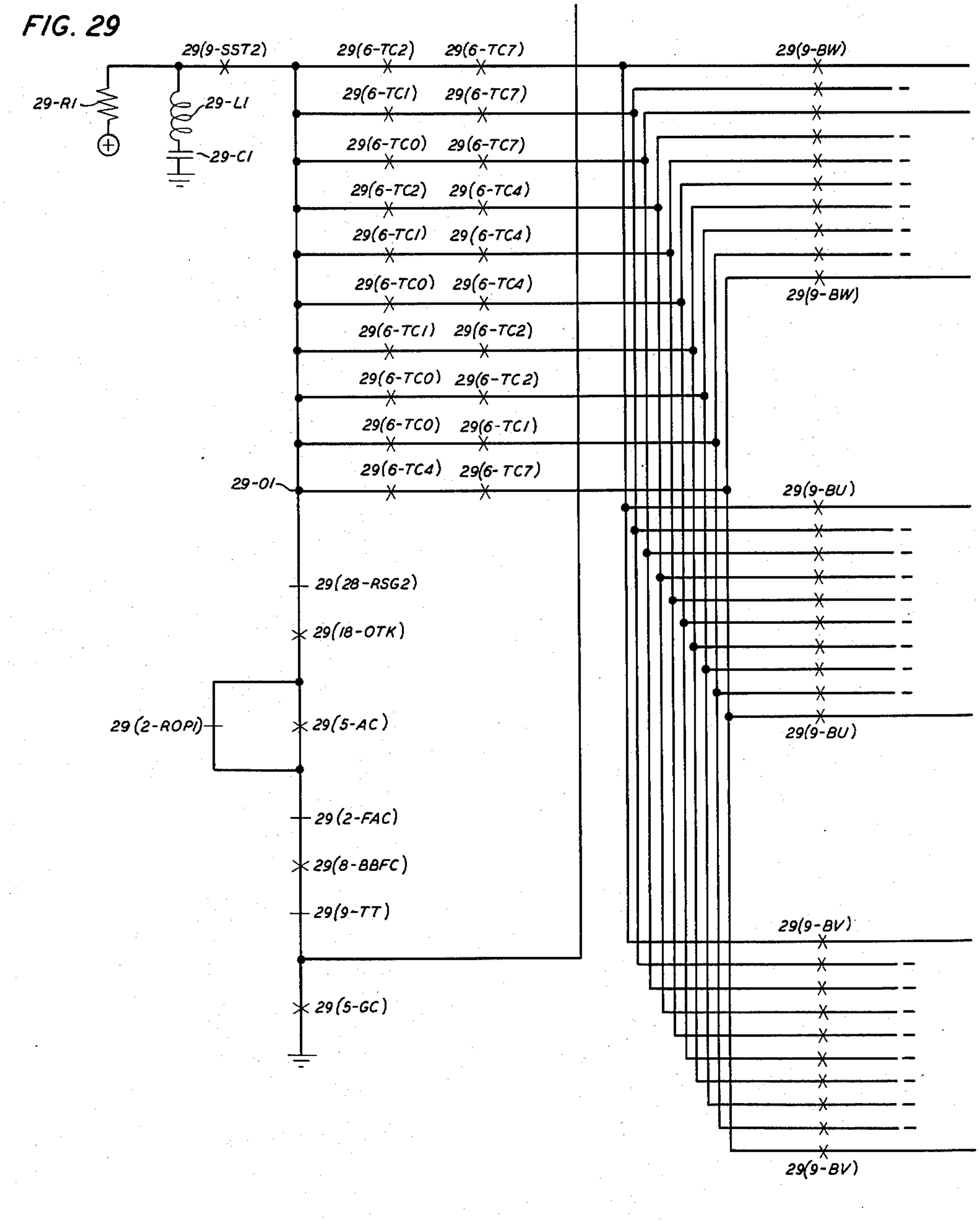

The operation of relay 9–BS completes a path from ground on make contacts 9(6–TA1), 9(6–TA4), 9(9–BS), to operate relay 9–BTS5. At this time a path may be traced on Fig. 29 from ground through make contacts 29(5–GC), break contacts 29(9–TT), make contacts 29(8–BBFC), break contacts 29(2–FAC), 29(2–ROP1), make contacts 29(18–OTK), break contacts 29(28–RSG2), to terminal 29–01.

The circuit paths and operations described in the immediately following paragraphs pertain to how a translation is made of the terminating office code in order to obtain a potential on an output terminal unique to each office code. Wires are connected from each of these output terminals and are selectively threaded through the coils of Figs. 22 through 27 so as to provide certain charging information pertaining to each terminating office. The relay contacts shown on Figs. 29 and 30 comprise the translating circuit for the terminating office code with the output terminals being numbered 30–220 through 30–999 and shown on the right-hand side of Fig. 30.

Continuing with the description of our hypothetical call whose terminating office code is 567, the ground on terminal 29–01 is extended through make contacts 29(6–TC0), 29(6–TC7), make contacts 29(9–BW), and 30(9–BTS5) to output terminal 30–567.

In the circuit path just described, it may be seen that the make contacts 29(6–TC0, 1, 2, 4, 7) operate in a two-out-of-five code manner to provide a one-out-of-ten translation for the value of the C digit of the terminating office code. This contact arrangement may be termed the C digit translator for purposes of discussion. The output of the C digit translator is applied to the ten make contacts on each of relays 29(9–BV), 29(9–BU) and 29(9–BW). The contacts on these three relays plus the relay contacts shown on the right-hand side of Fig. 30 provide a means for translating the A and B digits of the terminating office code.

The value of the B digit is uniquely determined by the operation of two of relays 9–BR through 9–BW as shown in the table in this section. The value of the A digit is manifested by the operation of two of relays 6–TA0, 1, 2, 4, 7 as previously described. The operation of the two relays manifesting the A digit together with the operation of one of the two relays manifesting the B digit causes the operation of one of relays 9–BTR2 . . . 9, 9–BTS2 . . . 9, or 9–BTT2 . . . 9 as previously described. For our hypothetical call it has already been described how the operation of relays 6–TA1 and 6–TA4 together with the operation of relay 9–BS effects the operation of relay 9–BTS5. The operation of relay 9–BTS5 represents a 5 for the A digit but still does not represent a unique value for the B digit which still could be any one of values 4, 5 or 6. Returning now to Fig. 30, the operation of relay 9–BTS5 together with the operation of relay 9–BW provides a translation for a unique value of the B digit (6) and extends the path from the output of the C digit translator through to output terminal 30–567.

Figure 30:
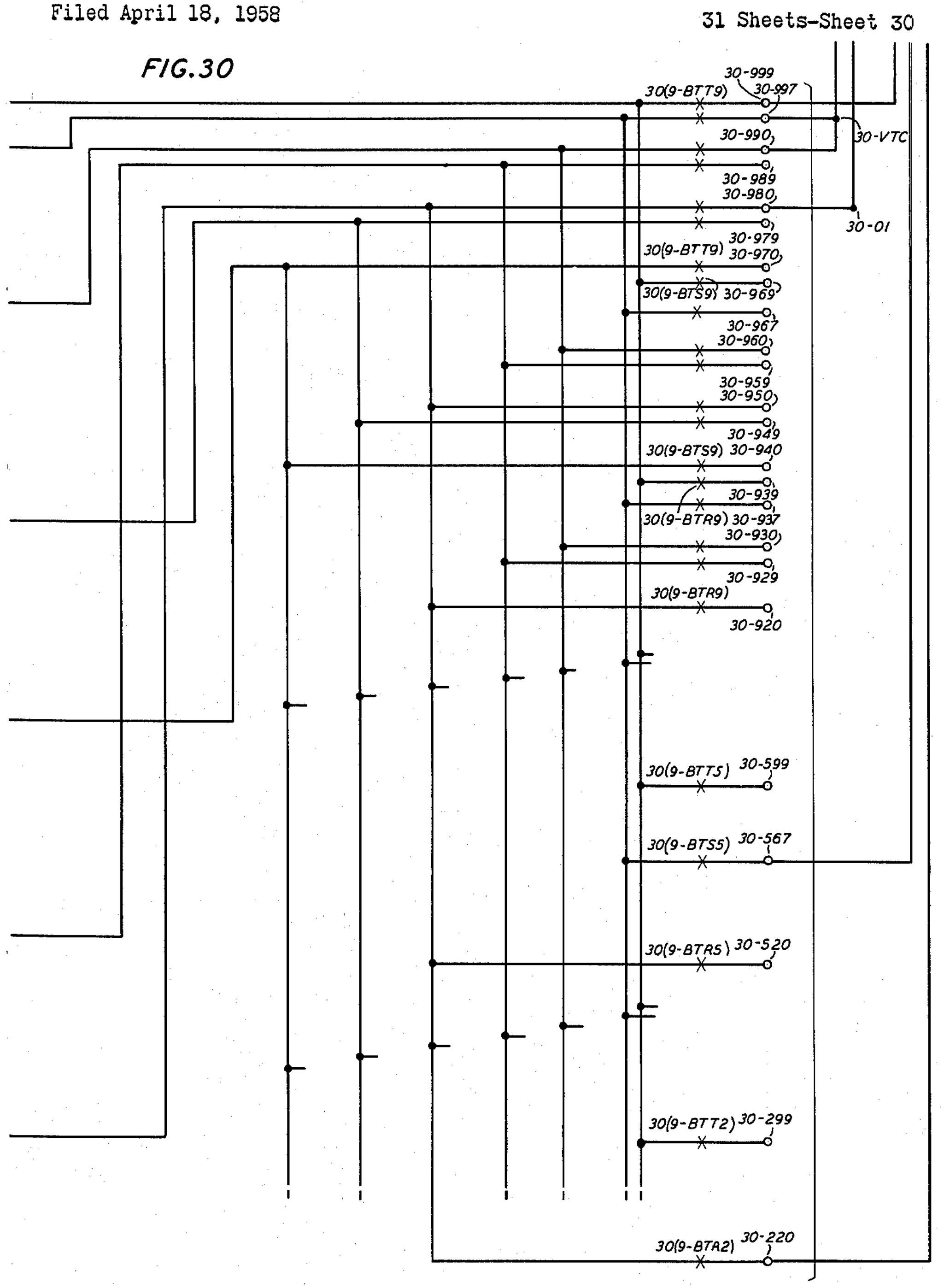

This somewhat unusual method of translating the B digit is necessitated by the fact that the physical embodiment of this invention will utilize relays having thirty make contacts for the relays such as 9–BTR9, 9–BTS9, and 9–BTT9, each of whose thirty contacts are shown in part on the upper right-hand portion of Fig. 30. The C digit may comprise any one of ten values while the B digit may take only eight different values (2 through 9). Therefore, for each value of the A digit, such as 9, the B digit translator must provide 8 times 10 or 80 outputs. The logic of the arrangement of these three relays may be noted by observing that relay 9–BTR9 is associated with output terminals numbered 920 through 939 while the contacts of relay 9–BTS9 are associated with output terminals 940 through 969, while the contacts of relay 9–BTT9 are associated with output terminals 970 through 999. Therefore, it may be seen that the operation of one of these three relays, 9–BTS9, for example, represents B digits of 4, 5 and 6.

Confining our attention to the contacts of relays 9–BTR9, 9–BTS9, and 9–BTT9 each of which has thirty contacts, with the first ten contacts of relay R–BTR9 not being used, if may be seen that contacts 29(9–BW) are connected to the top ten out of thirty contacts on each of these three relays while contacts 29(9–BV) are connected to the middle ten of the thirty contacts on each relay and with contacts 29(9–BU) being connected to the lower ten of the thirty contacts on each relay. Therefore, the closure of contacts 30(9–BTS9), for example, together with the closure of contacts 29(9–BW), for example, connects the output of the C translator to the upper ten of the thirty contacts 29(9–BTS9) thereby establishing the B digit as 6.

There are 640 output terminals in the group 30–220 through 30–999 which represent terminating office codes in the series 220 through 299, 320 through 399, et cetera, to 920 through 999.

1.09 *Second translation—terminating code*

The operation of relay 18–OTK opens its break contacts 7(18–OTK) to release relay 7–OCN. The release of relay 7–OCN closes a path from ground, through make contacts 7(5–GC), 7(18–OTK), through break contacts 7(7–OCN), 7(19–TTK) to the winding of relay 7–TCN to operate it.

The release of relay 7–OCN disconnects the register relays for the originating code translation from the gas tubes shown on Figs. 22 through 27. For example, register relays 13–ORT0, 1 and 13–ORU0, 1, 2, 4 and 7 are disconnected from the gas tubes by make contacts 13(7–OCN). Register relays 14–OIN0, 1, 2, 4, 7 and 14–RG0, 1, 2, 4, 7 are disconnected by means of make contacts 14(7–OCN). Register relays 15–AT0, 1, 2 and 15–EC0, 1, 2 are disconnected by means of make contacts 15(7–OCN).

Figure 16:
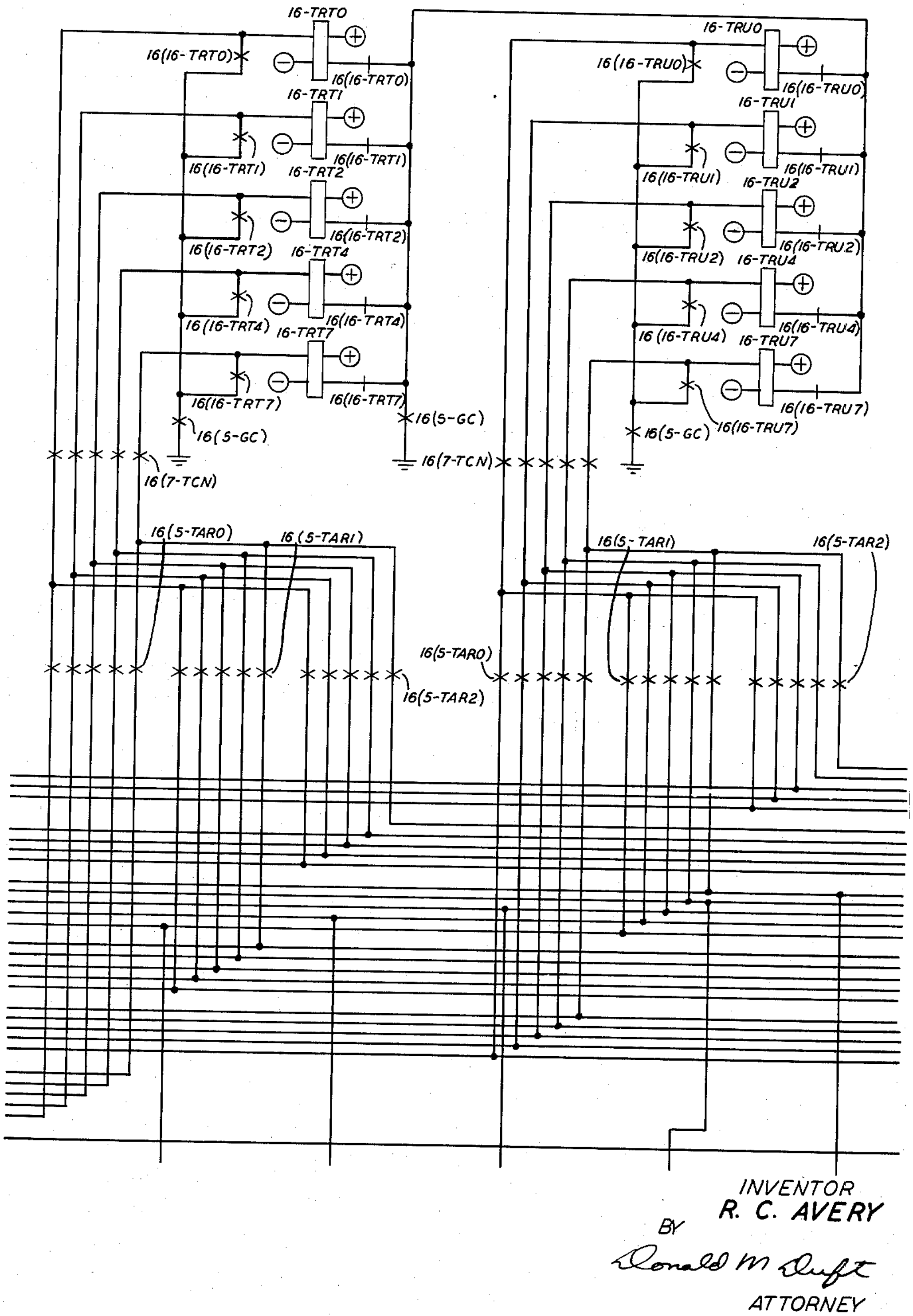

The operation of relay 7–TCN closes its make contacts 16(7–TCN) which partially closes a path to interconnect register relays 16–TRT0, 1, 2, 4, 7 and 16–TRU0, 1, 2, 4, 7 with the gas tubes. The register relays of Fig. 16 are interconnected with the gas tubes of Figs. 22 and 23, or those of Figs. 24 and 25 or those of Figs. 26 and 27 depending upon which one of relays 5–TAR0, 1, or 2 in operated at this time.

The information obtained during this second translation is referred to as the terminating rate treatment and comprises information pertaining to the terminating office code. This information is in the form of a 2 digit number with the tens digit being represented in two-out-of-five code form in relays 16–TRT0, 1, 2, 4 and 7 and with the units digit being stored in similar form in 16–TRU0, 1, 2, 4, 7.

Each one of output terminals 30–220 through 30–999 on Fig. 30 represents a particular terminating office code. However, each one of the three national areas to which bulk billing may be permitted from this CAMA office may have similarly designated terminating office codes for which the terminating rate treatment may be different. For example, the terminating office code of 567 for our hypothetical call, which has been assumed to represent a called office in area 0, may also represent offices in one or both of areas 1 and 2 as well. It is also quite possible that offices 567 in areas 1 and 2 will not have the same terminating rate treatment as does office 567 in area 0. It is, therefore, necessary that the terminating rate treatment for the proper terminating area, as well as for the correct terminating office code, be fed to the billing indexer during the second translation. This is accomplished as explained in the following paragraphs.

Let it be assumed that there is an office in each area represented by the terminating code 567. Let it also be assumed that the terminating rate treatment is 12 for this office in area 0, 24 for this office in area 1, and 37 for this office in area 2. Therefore, at the time the installation of this equipment is made, a wire is connected to terminal 30–567 on Fig. 30 and is threaded through the coils of Figs. 22 through 27 in the following order: 22–A0, 22–A1, 23–B0, 23–B2, 24–C0, 24–C2, 25–D0, 25–D4, 26–E1, 26–E2, 27–F0, 7–F7 to terminal 28–02.

Figure 22:
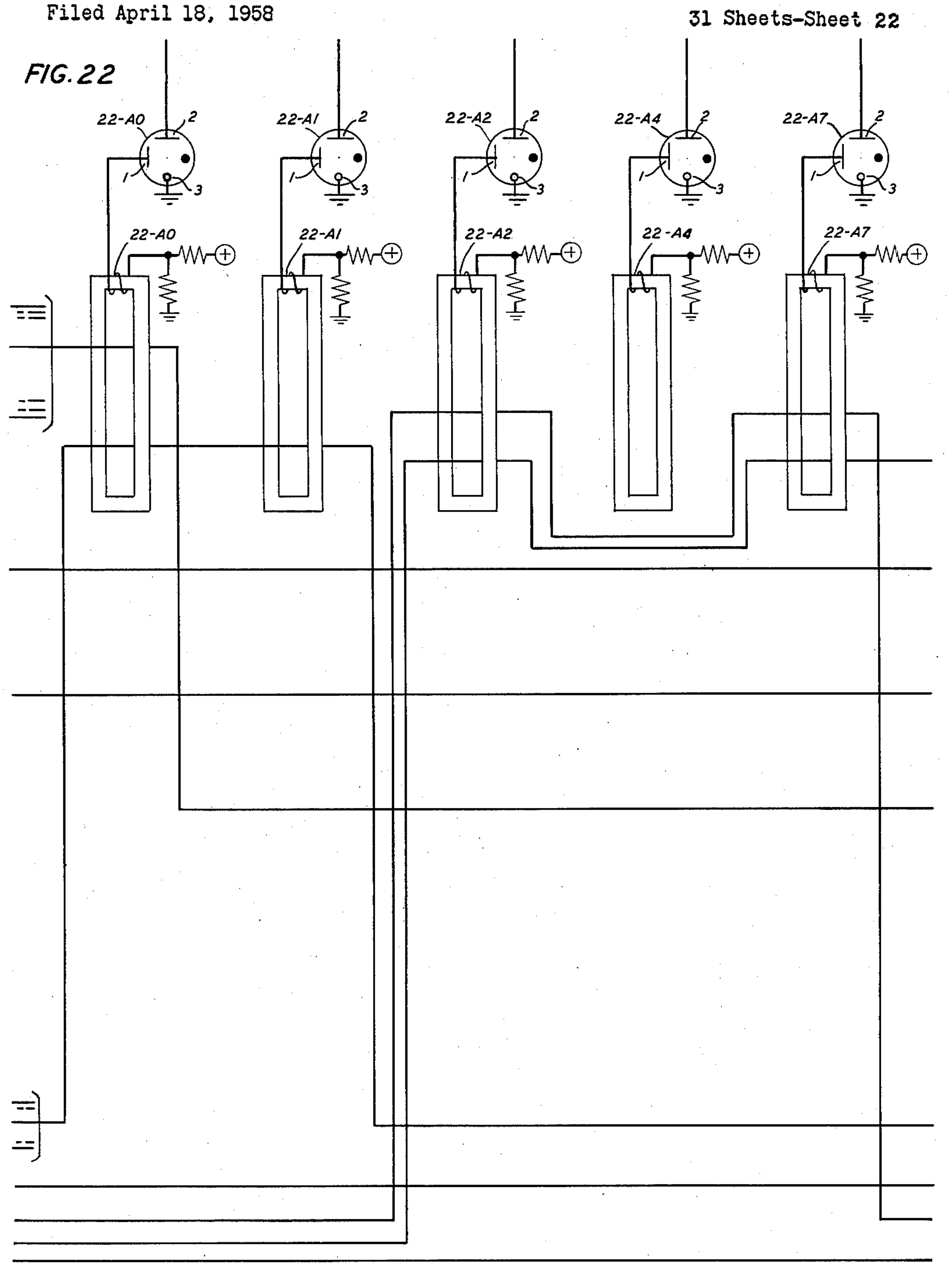
Figure 23:
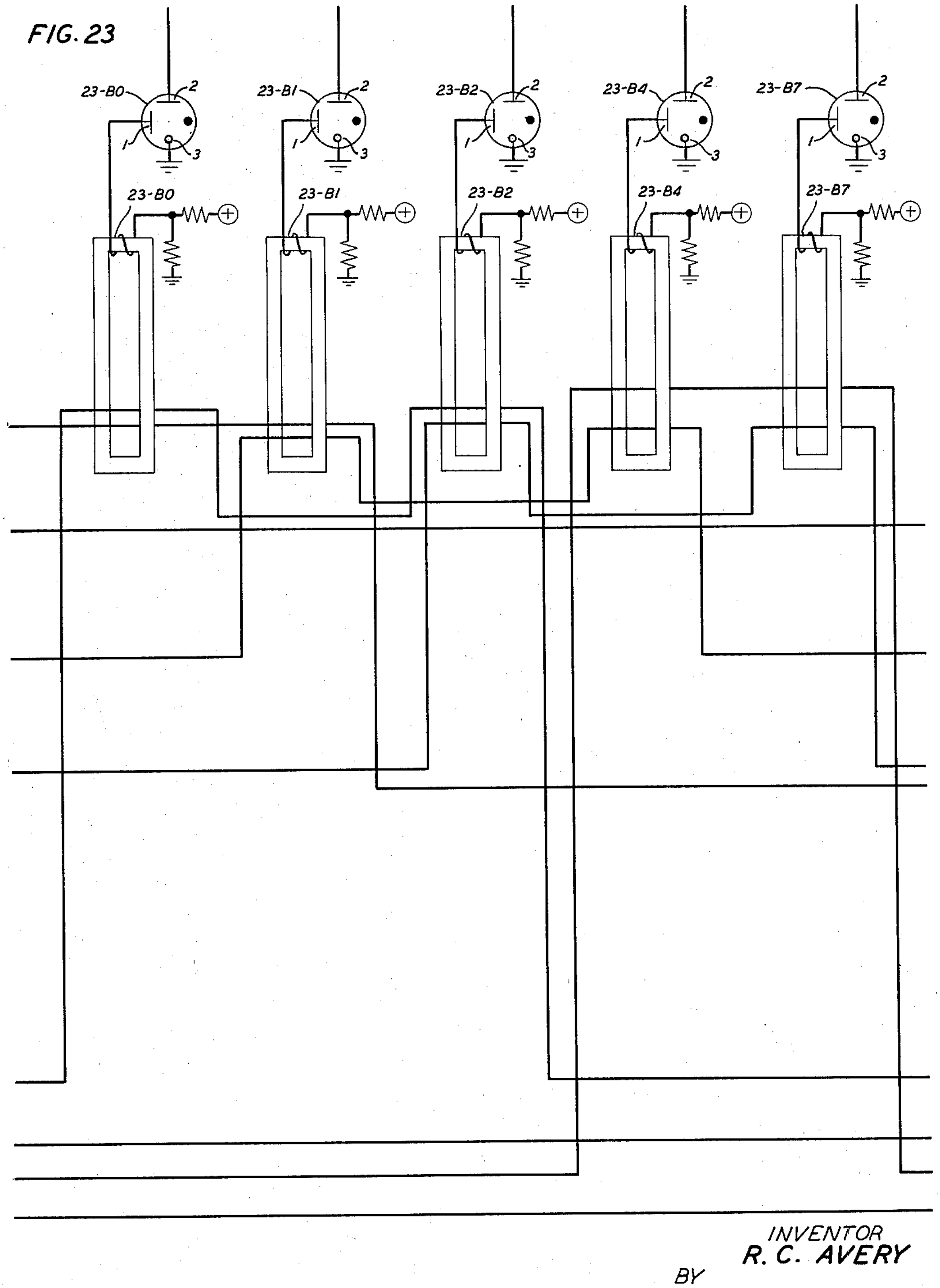
Figure 24:
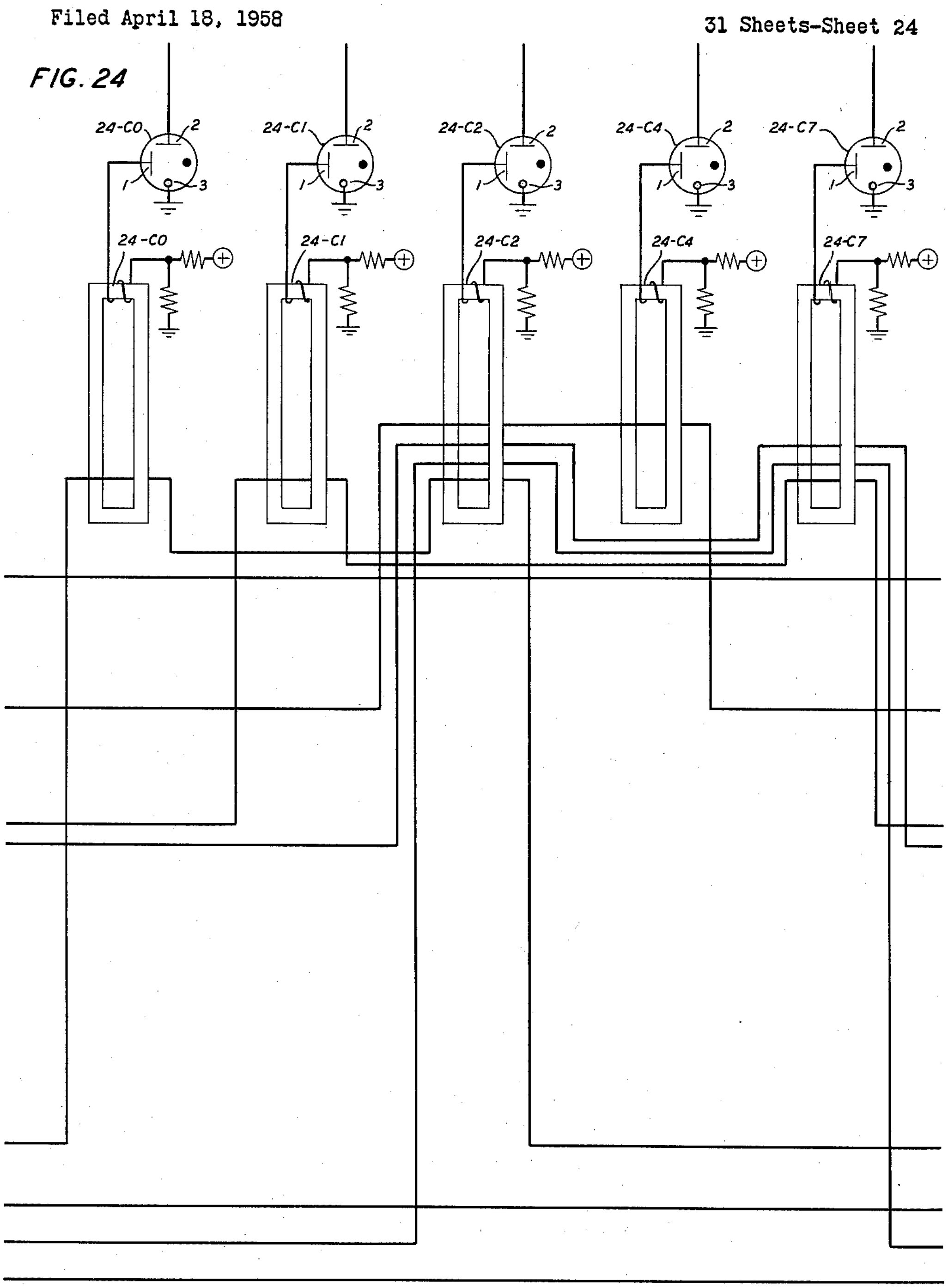
Figure 25:
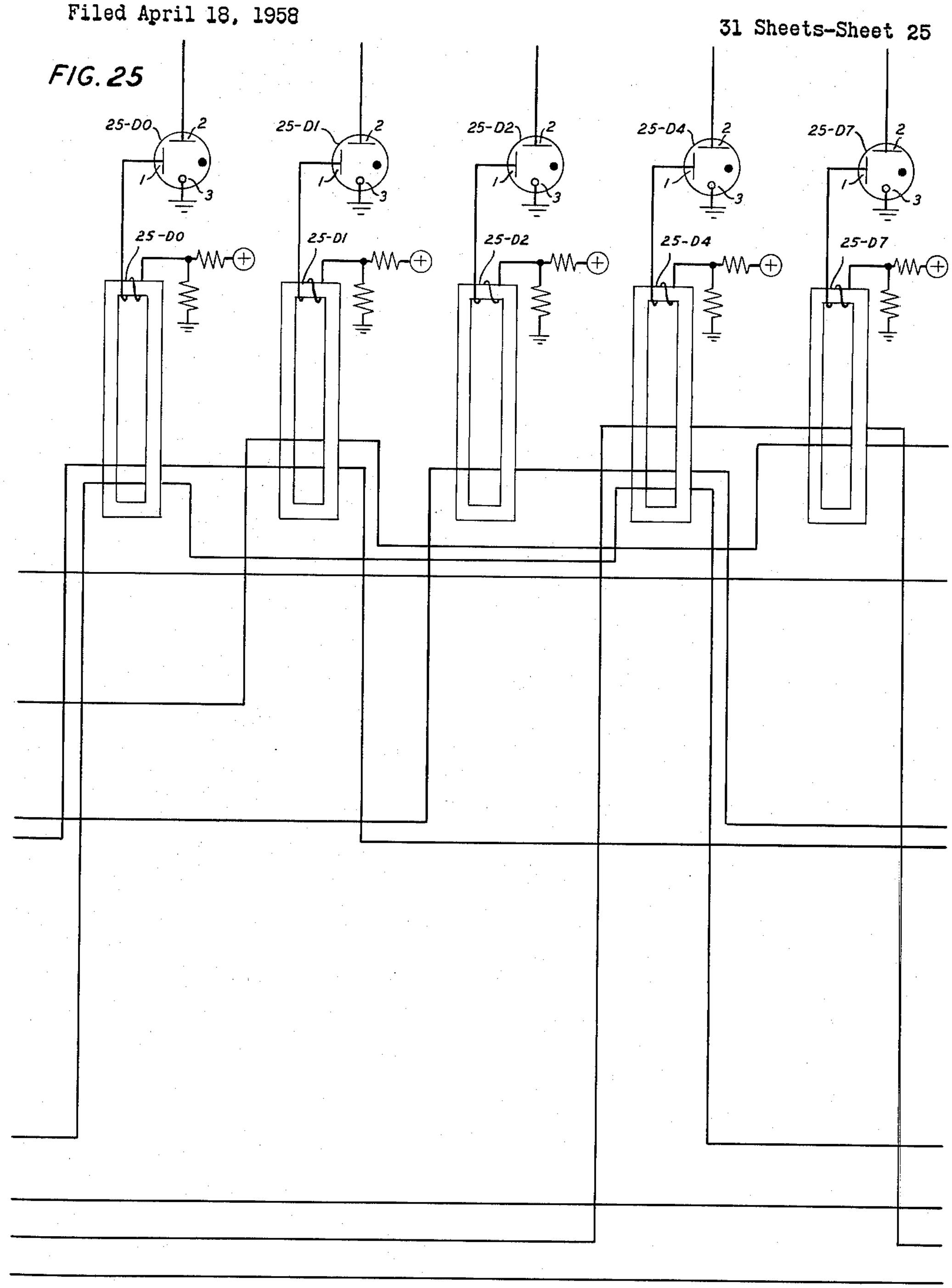
Figure 26:
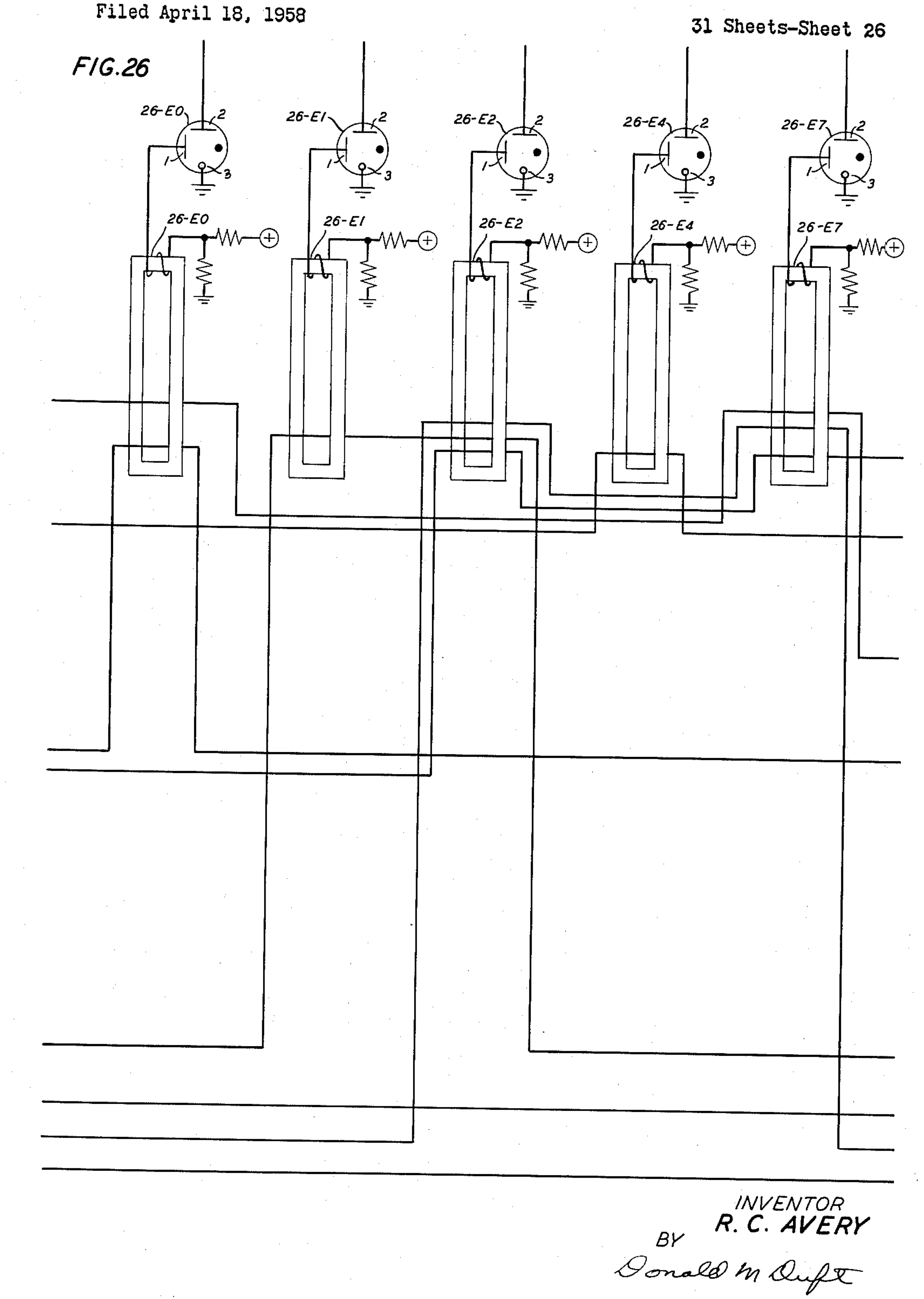
Figure 27:
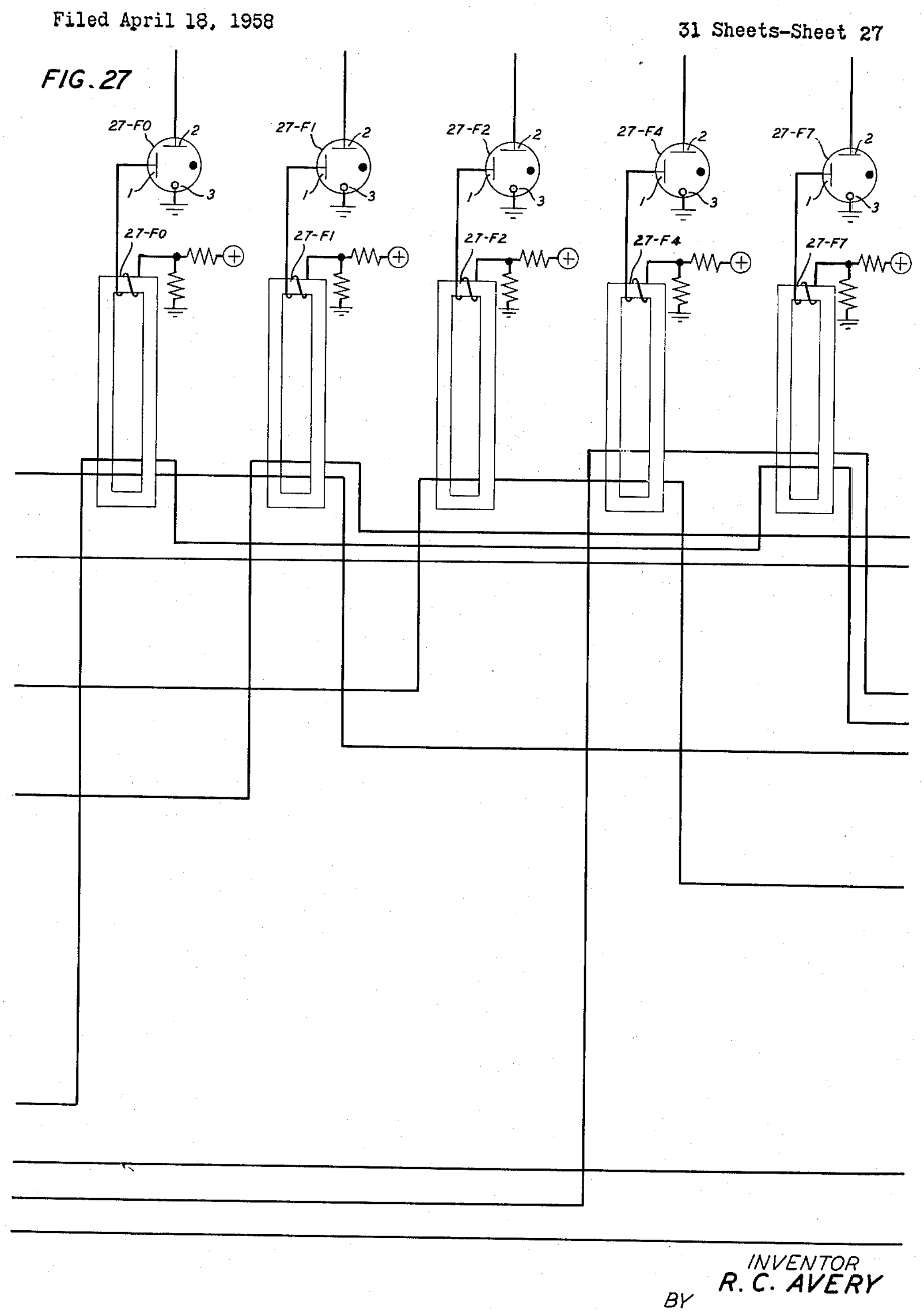

This wire is threaded through the coil fields whereby a heavy surge of current through the wire will produce a terminating rate treatment of 12 in the coils and tubes shown on Figs. 22 and 23, a terminating rate treatment of 24 in the coils and tubes shown on Figs. 24 and 25, and a terminating rate treatment of 37 in those shown on Figs. 26 and 27. Thus, since a current through this wire will produce the three terminating rate treatments, it is only necessary that the proper one be selected and fed to the register relays of Fig. 16. The selection of the desired terminating rate treatment is accomplished by the operation of one of relays 5-TAR0, 1, or 2. The closure of contacts 16(5–TAR0) connects the register relays to the gas tubes of Figs. 22 and 23 which supply the terminating rate treatment information for terminating area 0. If relay 5–TAR1 were operated, the closure of contacts 16(5–TAR1) would connect the register relays to the tubes of Figs. 24 and 25 which supply the terminating rate treatment for an office in terminating area 1. Similarly, if relay 5–TAR2 were operated, the closure of contacts 16(5–TAR2) would connect the register relays of Fig. 16 to the gas tubes shown on Figs. 26 and 27 which feed the terminating rate treatment information for an office in terminating area 2.

The operation of relay 18–OTK also completes a path from ground through make contacts 29(5–GC), break contacts 29(9–TT), make contacts 29(8–BBFC), break contacts 29(2–FAC), 29(2–ROP1), make contacts 29(18–OTK), break contacts 29(28–RSG2), make contacts 29(6–TC0), 29(6–TC7), 29(9–BW), 30(9–BTS5), terminal 30–567, through the coil field on Figs. 22 through 27 as previously enumerated, to terminal 28–02. Relay 5–SRG is operated by the closure of make contacts 5(6–ON) and, therefore, the ground on terminal 28–02 is extended through make contacts 28(5–SRG) to operate relay 28–RSG2. The operation of this relay closes a locking path for itself through its make contacts 28(28–RSG2) to ground on make contacts 29(5–GC). This relay also opens its operating path by opening break contacts 29(28–RSG2).

With relays 7–TCN and 28–RSG2 operated, the timer comprising relay 9–TT is operated through make contacts 9(6–ON), due to gradual decrease in the current in the resistance capacitance network associated therewith. Also, a ground is closed at this time through make contacts 9(7–TCN) and 9(28–RSG2) to operate relay 9–SST2. The operation of relay 9–SST2 closes its make contacts 29(9–SST2) which connect the source of surge current comprising resistance 29–R1, inductance 29–L1 and capacitance 29–C1 and thereby causes a heavy surge of current to flow through the translator network shown on Figs. 29 and 30, output terminal 30–567 and thence through the coil field in the manner hereinbefore enumerated to ground on terminal 28–03. The wire connected to terminal 567 has been assumed to be threaded through coils 22–A0, 22–A1, 23–B0, and 23–B2 among others, and therefore the potential induced in these coils at this time causes the gas tubes associated therewith to ionize. The gas tubes of Figs. 22 and 23 are connected to the register relays of Fig. 16 at this time by make contacts 16(5–TAR0) and 16(7–TCN), and therefore relays 16–TRT0, 16–TRT1, 16–TRU0 and 16–TRU2 operate and lock to register the terminating rate treatment of 12 therein. The coils on Figs. 24 through 27, through which this same wire is threaded, have voltages induced therein at this time but the gas tubes associated therewith cannot fire since their main anodes are not connected to a source of potential at this time.

The association of the coil groups and the terminating areas and the rate treatment information derived therefrom is as follows:

| Terminating Rate Treatment | Terminating Area and Relay Operated | Coils Used | Relays Operated (2 out of 5) |
|---|---|---|---|
| Tens Digit | 5–TAR0 | 22–A0, 1, 2, 4, 7 | 16–TRT0, 1, 2, 4, 7 |
| Units Digit | 5–TAR0 | 23–B0, 1, 2, 4, 7 | 16–TUR0, 1, 2, 4, 7 |
| Tens Digit | 5–TAR1 | 24–C0, 1, 2, 4, 7 | 16–TRT0, 1, 2, 4, 7 |
| Units Digit | 5–TAR1 | 25–D0, 1, 2, 4, 7 | 16–TRU0, 1, 2, 4, 7 |
| Tens Digit | 5–TAR2 | 26–E0, 1, 2, 4, 7 | 16–TRT0, 1, 2, 4, 7 |
| Units Digit | 5–TAR2 | 27–F0, 1, 2, 4, 7 | 16–TRU0, 1, 2, 4, 7 |

Provision is made for 60 terminating rate treatments, numbered 00 to 59, to which the theoretically possible 1920 terminating offices (640 in each of three areas) are assigned as required.

The timer comprising relay 9–TT started by the operation of relay 7–TCN and 28–RSG2, allows maximum time for the operation of the register relays of Fig. 16 and for deionization of the gas tubes. At the expiration of this time interval, relay 9–TT operates and, in turn, operates relay 19–TTK if exactly two relays in each of the two groups of register relays on Fig. 16 are operated. For example, continuing with our hypothetical call, a path is now closed from ground on make contacts 19(5–GC), 19(9–TT), make contacts 19(16–TRU0), break contacts 19(16–TRU1), make contacts 19(16–TRU2), break contacts 19(16–TRU4), 19(16–TRU7), make contacts 19(16–TRT0), 19(16–TRT1), break contacts 19(16–TRT2), 19(16–TRT4), 19(16–TRT7), through break contacts 19(16–TRT7) and 19(16–TRT2) in parallel, break contacts 19(7–VTC1) to operate relay 19–TTK.

It has previously been described how the terminating rate treatment may comprise any number from 00 to 59. In the event that the tens digit of the terminating rate treatment stored in the relays of Fig. 16 is a 9, for special cases described later, a path is closed from ground through make contacts 7(16–TRT2) and 7(16–TRT7) to operate relay 7–VTC1. The operation of this relay effects certain further circuit operations hereinafter described to insure that the call will not be completed in the normal manner. Even though the call is not to be completed in the event that relay 7–VTC1 operates, it is still desired to operate relay 19–TTK. In this case, the regular path to operate relay 19–TTK is open at break contacts 19(16–TRT2) and 19(16–TRT7). The ground appearing on terminal 19–01, as hereinbefore described, is extended through break contacts 19(16–TRT0), 19(16–TRT1), 19(16–TRT4), make contacts 19(7–VTC1) to operate relay 19–TTK. The path from terminal 19–01 includes the aforementioned break contacts since all these contacts should be normal in the event the tens digit is a 9, and thereby checks that relay 7–VTC1 is operated. This provision is a safety means to insure that relay 7–VTC1 would not operate falsely, such as from one side of its winding being accidentally grounded. If this should happen, the path could not be closed to operate relay 19–TTK because one of the aforementioned break contacts would also be opened in the event that the tens digit is not a 9.

1.10 *Selection of billing index cross-connecting terminal*

As previously described, the message billing index, which is a single digit having any value of 0 through 9, is determined by combining the originating and terminating rate treatments. Since there are twenty different originating rate treatments (00 through 19) and sixty terminating rate treatments (00 through 59), there are 1200 (20×60) different combinations of originating and terminating rate treatments. A physical analogy of this situation would be a large chart having the twenty originating rate treatments in its left-most column and having the sixty terminating rate treatments in its bottom-most row. The squares on the chart formed by the intersections of the rows and columns would represent the 1200 combinations of originating and terminating rate treatments.

Figure 21:
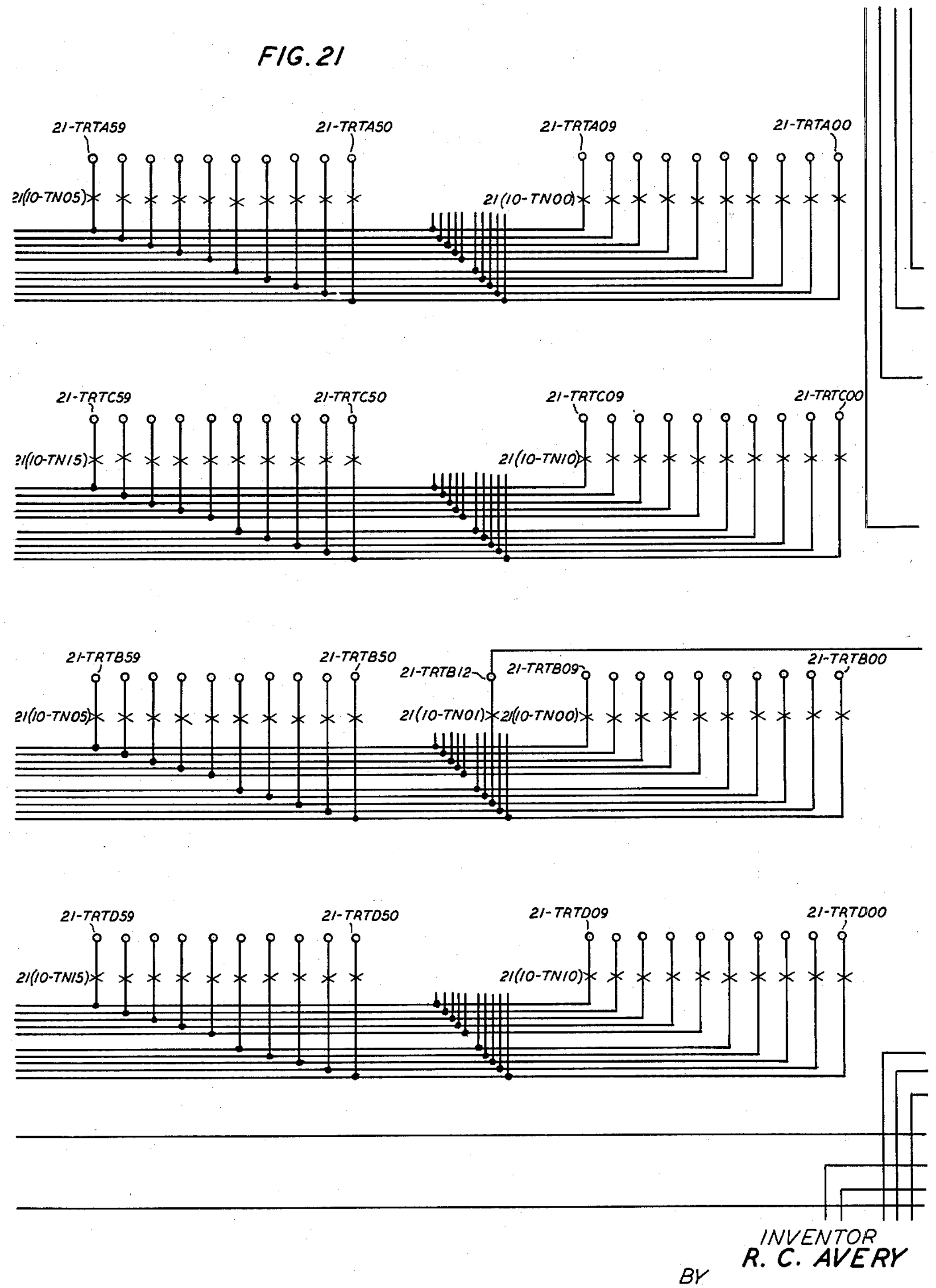

The circuits described in the following paragraphs provided a means of obtaining the 1200 different possible combinations as the originating and terminating rate treatment information is fed to the equipment involved. Four groups of terminals on Fig. 21 are provided, designated 21–TRTA00 through 21–TRTA59, 21–TRTB00 through 21–TRTB59, 21–TRTC00 through 21–TRTC59 and 21–TRTD00 through 21–TRTD59. These comprise four groups of sixty terminals each numbered 00 through 59. One of these 240 terminals is energized for each call. The group of terminals that is used on each call, as described below, is determined by the originating rate treatment as follows:

| Originating Rate Treatment | 21-TRT-Punching Group |
|---|---|
| 0 to 4 | A |
| 5 to 9 | B |
| 10 to 14 | C |
| 15 to 19 | D |

The terminal that is used in the selected group is determined by the terminating rate treatment and corresponds to it numerically.

The equipment described in the immediately preceding paragraphs provides a means of obtaining 240 (60×4) different outputs upon receipt of the originating and terminating rate treatments. The equipment described in the immediately following paragraphs provides a means of taking these 240 different outputs and, from them, obtaining the desired 1200 different outputs which correspond numerically to the 1200 different possible combinations of the originating and terminating rate treatments.

Jumper wires are connected to each of the 240 terminals of Fig. 21 and are selectively threaded through coil groups B through F as shown on Figs. 23 through 27 which represent, respectively, the first, second, third, fourth and fifth originating rate treatment in any group of five as specified above. The output of one of these groups is registered as required under control of the originating rate treatment so that only the output from the wanted coil group is used while the outputs from the other four coil groups are disregarded.

Figure 17:
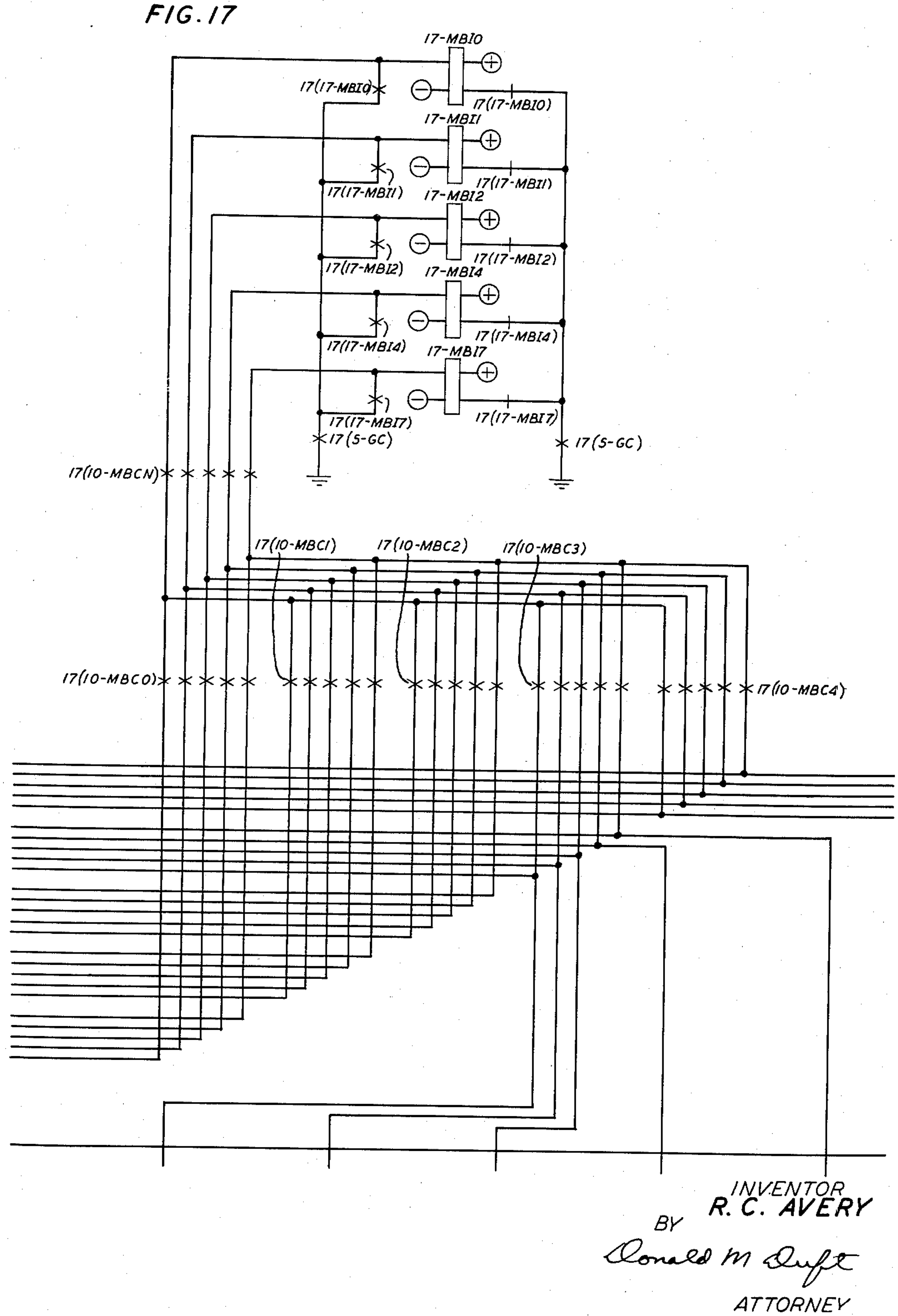
Figure 18:
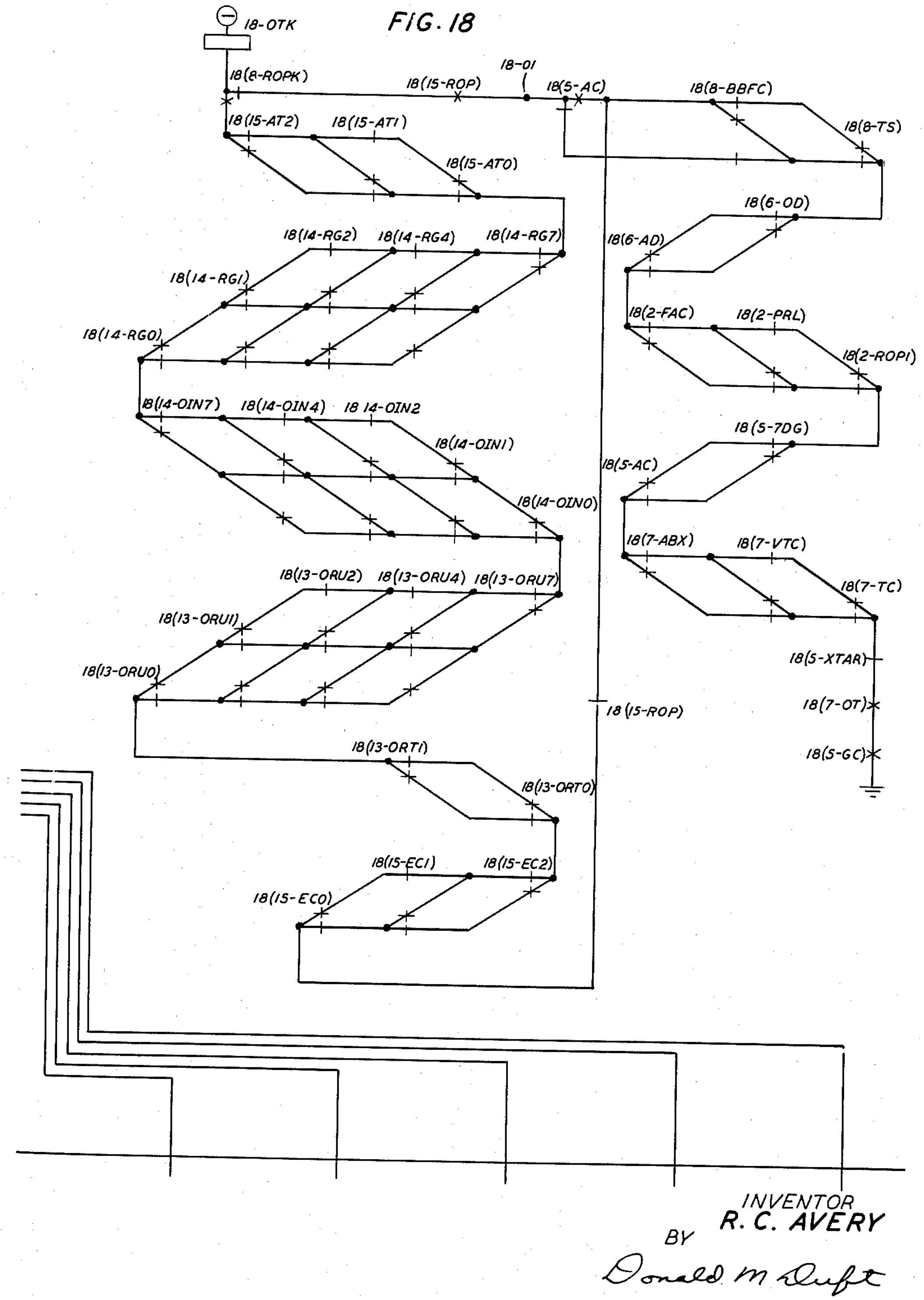

In summary, it now may be seen that the 1200 different desired possible combinations of outputs on the third translation are obtained by running each of the 240 jumpers connected to the 240 terminals on Fig. 21, through five sets of coils as shown on Figs. 23 through 27 and then connecting the output of only one of the five coil fields associated with each jumper to the register relays on Fig. 17.

Upon operation of two of relays 13–ORU0, 1, 2, 4, 7 in a two-out-of-five code form during the first translation, one of relays 10–MBC0, 1, 2, 3 and 4 is operated to connect the output of the required coil group to the main billing indexer circuit in accordance with the following table:

| Originating Rate Treatment | Units Digit of Originating Rate Treatment | Relay Operated | Associated Coil Group |
|---|---|---|---|
| 0, 5, 10 or 15 | 0 or 5 | 10–MBC0 | 23–B |
| 1, 6, 11 or 16 | 1 or 6 | 10–MBC1 | 24–C |
| 2, 7, 12 or 17 | 2 or 7 | 10–MBC2 | 25–D |
| 3, 8, 13 or 18 | 3 or 8 | 10–MBC3 | 26–E |
| 4, 9, 14 or 19 | 4 or 9 | 10–MBC4 | 27–F |

The 10–MBC– relay in operating extends its operating ground to operate relay 10–LO5 if the originating rate treatment units digit is 0 to 4 or to operate relay 10–HI5 if this digit is of a value of from 5 to 9.

Upon operation of two of relays 16–TRT0, 1, 2, 4 and 7 during the second translation, with one of relays 13–ORT0 and 13–ORT1 operated as previously described, one of relays 10–TN00 to 05 is operated if the originating rate treatment is 0 to 9 or one of relays 10–TN10 to 15 is operated if the originating rate treatment is 10 to 19.

The association of the terminals of Fig. 21 with the relays which control their selection is as follows:

| 21-TRT Punching Group | Originating Rate Treatment | Relays Operated |
|---|---|---|
| A | 0 to 4 | 10-LO5 10-TN00,01 or etc.-05 |
| B | 5 to 9 | 10-HI5 10-TN00,01 or etc.-05 |
| C | 10 to 14 | 10-LO5 10-TN10,11 or etc.-15 |
| D | 15 to 19 | 10-HI5 10-TN10,11 or etc–15 |

Relays 10–TN00 to 05 and 10–TN10 to 15, correspond, respectively, to tens digit 0 to 5 of the terminating rate treatment numbers and in combination with the relays 16–TRU0, 1, 2, 4 and 7 determine the terminal that is to be used within the selected group.

Continuing with the hypothetical call now being described, whose originating rate treatment is 09 and whose terminating rate treatment is 12, a path is now closed from ground through make contacts 10(13–ORU7), 10(13–ORU2), to the winding of relay 10–MBC4 to operate it. The operating path for this relay is extended through its make contacts 10(10–MBC4) to operate relay 10–HI5. A ground is also extended through make contacts 10(16–TRT0), 10(16–TRT1), 10(13–ORT0) to operate relay 10–TN01.

A path is extended at this time from ground through make contacts 20(5–GC), break contacts 20(10–MBT), 20(10–MBC0), 20(10–MBC1), 20(10–MBC2), 20(10–MBC3), make contacts 20(10–MBC4) to terminal 20–01. This ground is further extended through make contacts 20(19–TTK), break contacts 20(2–ROP1), 20(28–RSG3), to terminal 20–02. The ground on this terminal is further extended through make contacts 20(16–TRU0), 20(16–TRU2) to terminal 20–03. This ground is further extended from terminal 20–03, through make contacts 20(10–HI5) to terminal 20–04. The ground on this terminal is extended through make contacts 21(10–TN01) to terminal 21–TRTB12.

The wire connected to terminal 21–TRTB12 is threaded through the following coils and in the following sequence: 23–B1, 23–B4, 24–C2, 24–C4, 25–D1, 25–D7, 26–E0, 26–E7, 27–F2 and 27–F4. The wire leaving coil 27–F4 is connected to terminal 28–04 and then to the winding of relay 28–RSG3. It may be noted from a study of the coils through which this wire is threaded that any heavy pulse of current flowing therethrough will induce signals representing the digit 5 in the coils of Fig. 23, the digit 6 in the coils of Fig. 24, the digit 8 in the coils of Fig. 25, the digit 7 in the coils of Fig. 26, and the digit 6 in the coils of Fig. 27.

Each of the remaining terminals on Fig. 21 also has wires (not shown) connected to them which are likewise selectively threaded through the five sets of coils shown on Figs. 23 through 27 and then connected to terminal 28–04. However, for simplicity in presentation, only the wire connected to terminal 21–TRTB12 is shown.

1.11 *Third translation—message billing index*

When relay 19–TTK operates, relay 7–TCN releases and over its make contacts 16(7–TCN) disconnects the register relays shown on Fig. 16 from the gas tubes used on the second translation. Relay 9–SST2 releases as relay 7–TCN releases and opens its make contacts 9(7–TCN). Relay 10–MBCN operates at this time from ground through make contacts 10(19–TTK) and break contacts 10(7–TCN) to the winding of relay 10–MBCN. The operation of relay 19–TTK also extends the ground on terminal 20–01, through make contacts 20(19–TTK), break contacts 20(2–ROP1), 20(28–RSG3), terminal 20–02, make contacts 20(16–TRU0), 20(16–TRU2), terminal 20–03, make contacts 20(10–HI5), terminal 20–04, make contacts 21(10–TN01) to terminal 21–TRTB12. This ground is extended over the jumper connected to this terminal and through the coil fields as hereinbefore described to terminal 28–04 and the winding of relay 28–RSG3 to operate it. This relay locks to ground over make contacts 28(28–RSG3) and 20(5–GC). The operation of relay 28–RSG3 breaks its operating path at break contacts 20(28–RSG3).

Figure 20:
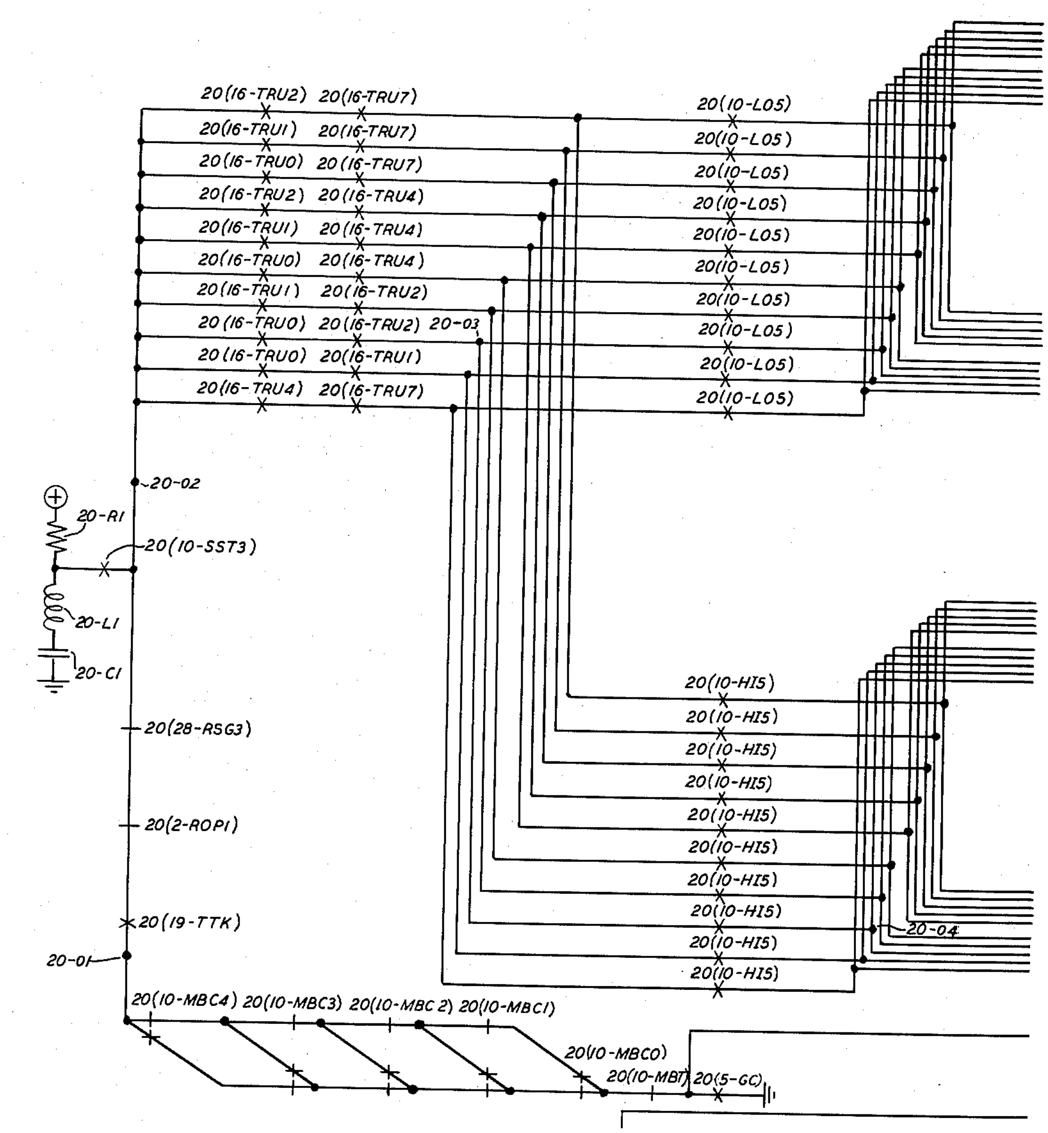

With relays 10–MBCN and 28–RSG3 operated the timer relay 10–MBT is started and relay 10–SST3 is operated. The operation of relay 10–SST3 closes its make contacts 20(10–SST3) and connects the surge current source comprising circuit elements 20–R1, 20–L1, and 20–C1, to the translator circuit shown on Figs. 20 and 21, through the jumper connected to terminal 21–TRTB12 to ground on terminal 28–04. The surge current through this jumper induces a potential in all the coils through which it is threaded which, in turn, applies a positive potential to the start anodes of their associated gas tubes. Since both relays 10–MBCN and 10–MBC4 are operated, the main anodes of the gas tubes shown on Fig. 27 are interconnected by means of make contacts 17(10–MBC4) and 17(10–MBCN) to the windings of relays 17–MBI0, 17–MBI1, 17–MBI2, 17–MBI4, and 17–MBI7.

Since the gas tubes shown on Fig. 27 are the only ones whose main anodes are interconnected with the register relays of Fig. 17, only these tubes have a positive potential on their main anodes at this time and hence, only these tubes can be fired across their main gap as the surge current appears on the jumper connected to terminal 28–04. This jumper is threaded through coils 27–F2 and 27–F4 and, therefore, the surge current through this jumper fires the tubes associated with these two coils which, in turn, cause relays 17–MBI2 and 17–MBI4 to operate and thereby represent a billing index of 6. The operation of these two relays closes a locking path for themselves through make contacts 17(17–MBI2) and 17(17–MBI4) through make contacts 17(5–GC) to ground.

The message billing indices 1 through 8 represent various charging rates for bulk-billed calls while the index 9 signifies a toll statement call. The latter may be used for calls to distant points in a bulk-billed area, and is used for all calls to offices in toll statement areas. The message billing index derived as above is sent to the transverter when relay 19–MBK operates as is later described and becomes a part of the AMA tape record.

1.111 *Free calls*

The message billing index 0, derived as shown in the third translation, is used as a signal for the transverter to indicate that the call is a free call, meaning that it is included in the flat rate dialing area for the calling customer, it should have been dialed directly, and it should not be going through a CAMA office. No tape record is made on these calls and they are routed to a special operator who informs the calling party of his error and requests him to redial the call.

1.112 *Type of entry*

The AMA recorder perforates either two or four-line initial entries for bulk-billed calls as required. For most bulk-billed calls, the two-line initial entry is perforated which contains information pertaining to the calling party's identity plus certain charging information. The four-line initial entry contains information identifying both the calling and called party and is perforated for bulk-billed calls at certain times when desired, for example, whenever the commercial office requires more complete information for answering subscribers' complaints pertaining to calls they may have had.

Four-line initial entries are more expensive and it is, therefore, desirable to restrict them to certain calling offices and/or certain message billing indices for which the number of complaints is sufficient to justify them. For this reason, three entry combination patterns are provided, represented by relays 15–EC0, 1 and 2, one of which is selected during the first translation as previously described. Within each entry combination, full flexibility is provided in controlling the type of initial entry to be perforated in accordance with the message billing index registered by the operated relays of Fig. 17.

Figure 19:
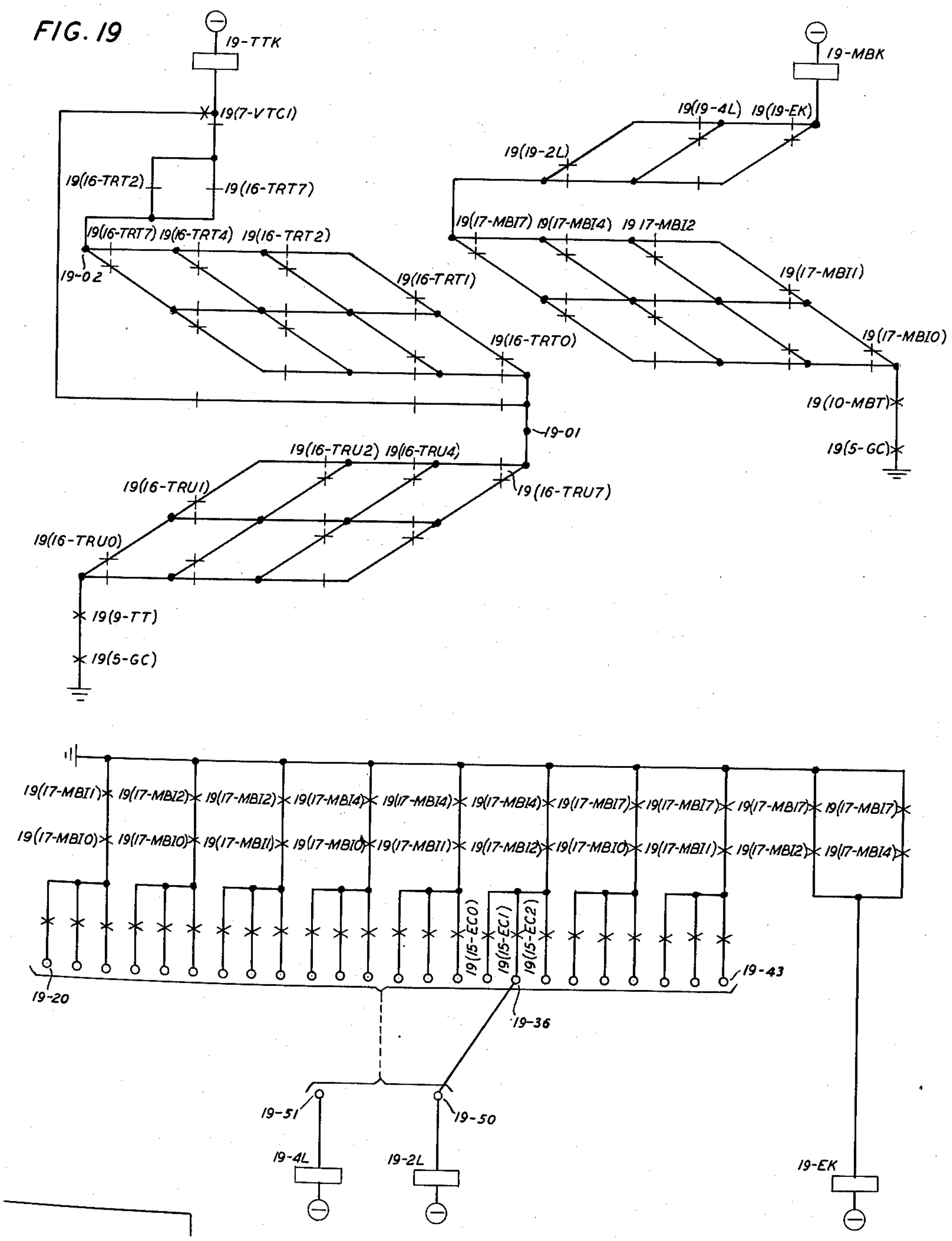

The make contacts of relays 15–EC0, 1 and 2, together with certain combinations of make contacts on the message billing index relays shown on Fig. 17, form a network shown on the lower half of Fig. 19 which either operates relay 19–2L to effect the perforation of a two-line initial entry or, operates relay 19–4L to effect the perforation of a four-line initial entry. Each of terminals 19–20 through 19–43 is selectively cross-connected to one or the other of terminals 19–50 and 19–51 so that either relay 19–2L or 19–4L is operated as required depending upon the message billing index and the entry combination digit for each call. With this arrangement, relay 19–2L or 19–4L, as required, operates when the message billing index is in the range from 1 to 8. If the message billing index is 0 or 9, relay 19–EK is operated for checking purposes. The make contacts of this relay are in the circuit over which relay 19–MBK operates. This relay is operated merely as a checking function in the event that one of the relays 19–2L or 19–4L are not operated in order that relay 19–MBK can operate.

Initial entries are not perforated for free calls. The number of lines required in the initial entry for toll statement calls can be four for compressed area codes or five for non-compressed codes as determined by the transverter.

For bulk-billed calls, the two-line or four-line initial entry information, derived as above, is sent to the transverter when relay 19–MBK operates as described hereinafter. Any transverter receiving a two-line signal converts it to a four-line signal if the trunk or calling line is marked for service observing in a central office. The timer comprising relay 10–MBT, started by the operation of relays 10–MBCN and 28–RSG3, allows maximum time for the above operations to take place during the third translation and for de-ionization of the tubes used. At the expiration of this interval, relay 10–MBT operates and, in turn, operates relay 19–MBK if two and only two of relays 17–MBI0, 1, 2, 4 and 7 are operated along with one of relays 19–2L, 19–4L and 19–EK. The operation of relay 19–MBK connects grounds to two leads of the transverter to signify the billing index and connects another ground to signify whether a two or four-line initial index is to be perforated.

Continuing with the hypothetical call described herein, wherein the entry combination digit is 1 and the message billing index is 6, a path is closed from ground through make contacts 19(17–MB14), 19(17–MB12), 19(15–EC1), terminal 19–36, over the wire interconnecting terminal 19–36 with terminal 19–50, to the winding of relay 19–2L to operate it.

After the timer circuit comprising relay 10–MBT operates, a path is closed from ground through make contacts 19(5–GC), 19(10–MBT), break contacts 19(17–MBI0), break contacts 19(17–MBI1), make contacts 19(17–MBI2), 19(17–MBI4), break contacts 19(17–MBI7), make contacts 19(19–2L), break contacts 19(19–4L), 19(19–EK), to the winding of relay 19–MBK to operate it.

A path is now closed from ground through make contacts 4(19–MBK), 4(19–2L), 4(1–IC0), to operate relay 4–2L in the transverter which effects the necessary circuit operations to insure that a two-line initial entry will be perforated on the AMA tape for this call.

A path is also closed at this time from ground through make contacts 3(19–MBK), 3(17–MBI4), 3(1–IC0), to the winding of relay 3–MBI4 to operate it. A path is also closed at this time from ground to make contacts 3(19–MBK), 3(17–MBI2), 3(1–IC0) to the winding of relay 3–MBI2 in the transverter. The operation of relays 3–MBI2 and 3–MBI4 in the transverter effects whatever further circuit operations are associated with the message billing index of 6.

1.12 *Release of the billing indexer*

The transverter having received the office index, the position release signal, the message billing index, and a two-line or four-line indication when required, checks this information and then opens the start lead to the billing indexer on Fig. 1. This releases the preference relays 1–IP0 through 1–IP3 and the connector relays 1–IC0 through 1–IC3 which, in turn, open the receiving, transmitting and control leads between the transverter and the billing indexer. All operated billing indexer relays now release thereby restoring the circuit to normal.

The transverter controls perforation of the AMA tape and then signals the sender to release the transverter and to call a marker to compelte the call.

2. *Regular calls to toll statement area*

2.1 *Types of toll statement areas*

As has been previously mentioned in connection with the description of a call on a bulk-billed basis, calls may be completed to any offices in the three possible originating areas served by this CAMA office either on a bulk-billed or on a toll statement basis. The description heretofore has described the circuit operation in connection with the billing of a call on a bulk-billed basis. The present section of the specification discusses the circuit operation in connection with the billing of a call on a toll statement basis. The requirements of the telephone offices in each area determine whether calls to other offices in the same area are to be billed on a bulk-billed or toll statement basis.

It was described in the previous section in connection with calls to a bulk-billed area, how free calls (those having a message billing index of 0) are recognized by combining the originating and terminating rate treatments into a third translation to obtain a message billing index of 0 in the same manner that a message billing index of from 1 to 9 is determined. This requires three translations. Free calls may also be identified in this same manner in the three areas served by this CAMA center on an originating basis and represented by relays 5–TAR0, 1 and 2 when any of these three areas are arranged for toll statement treatment. This feature is not applicable to other areas (those represented by relay 5–TAR3) and is not provided for them. As a practical matter, the distances involved in these cases are ordinarily greater than the free call range and, therefore, the omission of this feature for calls of this type causes little, if any, inconvenience.

The purpose of the free call diversion feature is to prevent the completion of free calls through the CAMA equipment and thereby discourage attempts of this nature. Such calls are included in the flat rate charge and should be dialed directly over the local trunks. By this means, unnecessary use of the more expensive CAMA routes, the associated operator's time, and tape processing for these calls are avoided.

Calls to toll statement areas not arranged for diversion of free calls require only one translation. It is not necessary in these cases to determine the message billing index by means of rate treatments since, as was mentioned in section 1.111, the message billing index is always 9 for calls requiring toll statement treatment. Therefore, the type of entry information is also not required at this time. For those CAMA centers serving areas requiring bulk billing and/or diversion of free calls, the billing indexer frames are fully equipped for three translations. For all CAMA centers arranged for toll statement treatment without bulk billing and diversion of free calls facilities, the originating rate treatment and entry combination register relays, the relay equipment used for the second and third translations, and part of the coil field, may be omitted.

2.2 *Toll statement area arranged for diversion of free calls*

The description in this section pertains to those calls to areas for which the billing is to be on a toll statement basis and also, when facilities are provided in the CAMA office for bulk billing and diversion of free calls. For calls to areas which are to be billed on a toll statement basis, the 5–TAR0, 1, or 2 relay representing such an area is cross-connected to operate relay 8–BBFC as before and three translations are made in a similar manner as for the previously described call to bulk-billed areas. The resulting message billing index obtained from the third translation, however, can be only a 0 or a 9, for free calls and toll statement calls, respectively. In other words, no calls to an area arranged for billing on a toll statement basis can have a message billing index from 1 to 8 since billing indices in this range represent bulk-billed calls. Therefore, all calls to an area arranged for billing on a toll statement basis must have a message billing index of either 0 or 9. However, some areas may be arranged so that the calls to the nearby points therein will be on a bulk-billed basis and, hence, will produce billing indices from 1 to 8, while calls to its more remote points are on a toll statement basis and, therefore, will have a message billing index of 9.

The message billing index 0 results in the call being routed to a special intercept operator without a tape record being made whereas the message billing index 9 indicates to the accounting center that the charges for each call are to be computed separately and itemized on the subscriber's bill. Entry combination and type of entry information are not required for calls of this type since the message billing indices 1 to 8 are not used. However, one of relays 15–EC0, 1, 2 is operated on each call in order to complete the originating translation check circuit comprising the operation path for relay 18–OTK.

2.3 *Toll statement area not arranged for diversion of free calls*

The description in this section pertains to calls to those areas which must be billed on a toll statement basis when no provision is made for bulk billing or the diversion of free calls. For these calls the relays 5–TAR0, 1 and 2 relays, as required, are cross-connected to operate relay 8–TS instead of 8–BBFC. Relay 5–TAR3, which is operated by the transverter for calls to other areas, is permanently wired to operate relay 8–TS. If the contacts of relay 5–TAR1 were cross-connected to operate relay 8–TS, thereby indicating that all calls to area 1 through this CAMA center are to be billed on a toll statement basis, relay 8–TS, rather than 8–BBFC, would operate whenever relay 5–TAR1 operates. The path to operate relay 28–RSG2 at the end of the first translation would be open at contacts 29(8–BBFC) and therefore, the second and third translations would not be made.

The office index is derived as previously described during the first translation and transmitted to the transverter. The recorder group and area transfer relays function in a similar manner as for a bulk-billed call. The originating rate treatment and entry combination relays are not required. However, if they are installed for use on calls to other areas they must be operated during the first translation in the usual manner in order to complete the check path for relay 18–OTK.

With relay 18–OTK operated the 4–PRL relay in the transverter is operated as before. With relays 18–OTK, 8–TS, 7–ABX and 2–PRL operated and with the relays 17–MBI0, 1, 2, 4 and 7 normal, a path is closed from ground through make contacts 3(18–OTK), 3(8–TS), 3(7–ABX), 3(2–PRL), to terminal 301. The ground on terminal 301 is extended through break contacts 3(17–MBI7), make contacts 3(1–IC0) to the winding of relay 3–MBI7 in the transverter to operate it. The ground on terminal 301 is also extended through break contacts 3(17–MBI2), make contacts 3(1–IC0) to the winding of relay 3–MBI2 in the transverter to operate it. The operation of relays 3–MBI2 and 3–MBI7 in the transverter provides the message billing index digit 9 thereto. The transverter checks this information and releases the billing indexer in the same manner as already described in section 1.12.

3 *Special calls*

3.0 *Recognition of special calls*

It was described in connection with section 1.04 how the contact network associated with relays 7–ABX, 7–VTC, and 7–TC operate these three relays in the following manner.

| Terminating Code A Digit | Terminating Code B Digit | Relay Operated |
|---|---|---|
| 2–9 | 2–9 | 7–ABX |
| 1 | 0 | 7–TC |
| 0 | – | 7–VTC |
| 1 | 1–9 | 7–VTC |
| 2–9 | 0 | 7–VTC |
| 2–9 | 1 | 7–VTC |

From a perusal of this table it may be observed that relay 7–ABX will be operated whenever the A and B digits of the terminating code both have a value anywhere from 2 through 9. This range of values for the A and B digits, together with any value from 0 through 9 for the C digit contains all the digital combinations representing conventional office codes. Conversely, no conventional office code has either a 1 or a 0 for either or both of its A and B digits. Therefore, these three relays together with their operating paths are provided to recognize whether or not a calling subscriber dialed a proper terminating office code. They effect certain circuit operations when a proper office code was dialed and effect certain other operations in the event that an improper office code was dialed.

Relay 7–TC would operate in the event that the subscriber dialed an office code having A and B digits of 1 and 0, respectively. The path over which this relay operates may be traced from ground through make contacts 7(1–IC0), 7(8–CK) to terminal 701. The ground on terminal 701 is extended through make contacts 7(6–TA0), 7(6–TA1), 7(6–TB4), and 7(6–TB7) to the winding of relay 7–TC.

In all other cases where a subscriber dials a terminating code having an A or B digit or both of 1 or 0, relay 7–VTC will be operated from ground on terminal 701 through the contact network interconnecting this relay with terminal 701. For example, assume the subscriber dials a terminating office code whose A and B digits both are 1. In this case, ground on terminal 701 is extended through make contacts 7(6–TA0), 7(6–TA1), break contacts 7(6–TB7) to the winding of relay 7–VTC.

3.1 *Calls to test lines and test boards*

As described under calls to bulk-billed areas, relay 7–TC is operated when relay 8–CK operates if the digits registered in the terminating office code positions represent a 10X code (100 to 109). Codes in this block are used by the maintenance crews to reach test lines and test boards. Calls of this type require only one translation, which is similar to the first translation for a bulk-billed call. In this case, however, there is no path to operate relay 28–RSG2 since 10X codes do not appear in the terminating office code translator. The office index is sent to the transverter as before, but is not used since no tape record is made. The message billing index and type of entry information is not required for the same reason.

When relay 18–OTK operates with relay 7–TC operated, a path is closed from ground through make contacts 4(18–OTK), 4(7–TC), 4(1–IC0), to the winding of relay 4–TC in the transverter to operate it. Relay 4–PRL in the transverter is also operated at this time as before described since relays 18–OTK and 2–PRL are now operated. The transverter checks this information, releases the billing indexer, and signals the sender to complete the call.

3.2 *Toll code or area code in terminating office code position*

The billing indexer is arranged to recognize toll codes 0XX and 1XX (except 10X codes) and area codes X0X and X1X when dialed in error in the terminating office code position on 10 digit calls. It causes such calls to be routed to an intercept operator. This applies to all areas reached through the CAMA center regardless of the type of billing involved.

As previously described, relay 7–VTC is operated when relay 8–CK operates under these conditions. Only one translation is made at this time since relay 28–RSG2 cannot operate. When relay 18–OTK operates with relay 7–VTC operated, a path is closed from ground through make contacts 4(18–OTK), 4(7–VTC), break contacts 4(2–FAC), make contacts 4(1–IC0) to the winding of relay 4–VTC in the transverter which operates to inform the transverter of this condition. The transverter then releases the billing indexer and signals the sender that the call should be completed to the vacant terminating code intercept route. No tape record is made at this time.

3.3 *Vacant terminating ABX codes*

Vacant terminating ABX codes in areas arranged for bulk billing, or for toll statement treatment with diversion of free calls, are cross-connected to provide terminating rate treatment tens digit 9 and units digit 0 instead of a regular rate treatment having a value anywhere from 00 to 59. Codes vacant in all of the possible bulk-billed areas are bunched at terminal 30–VTC and make use of one jumper in common which is run through the coil field. Thus, assume, for example, that the terminating office codes 997 and 990 are vacant codes in all of the three possible bulk-billed areas. In this case terminals 30–990 and 30–997 are connected to the terminal 30–VTC. The wire extends from this terminal through the following coils; 22–A2, 22–A7, 23–B4, 23–B7, 24–C2, 24–C7, 25–D4, 25–D7, 26–E2, 26–E7, 27–F4, 27–F7, to terminal 28–02.

By reference to the table in section 1.09, it may be seen that a surge of current through this jumper will fire the appropriate tubes to indicate a terminating rate treatment of 90 in all of the three possible bulk-billed areas. Therefore, relays 16–TRT2, 16–TRT7, 16–TRU4, 16–TRU7 will be operated to indicate a terminating rate treatment of 90.

A path is closed at this time from ground through make contacts 7(16–TRT2), 7(TRT7), to the winding of relay 7–VTC1 to operate it.

The path to operate relay 19–TTK extends from ground to terminal 19–01 as hereinbefore described and then through break contacts 19(16–TRT0), 19(TRT1), 19(16–TRT4), and make contacts 19(7–VTC1) to the winding of relay 19–TTK.

A path is also closed at this time from ground through make contacts 4(19–TTK), 4(7–VTC1), 4(16–TRU4), 4(16–TRU7), break contacts 4(7–VTC), 4(2–FAC), make contacts 4(1–IC0) to the winding of relay 4–VTC in the transverter which operates to indicate that a vacant terminating code has been dialed. Relay 4–PRL in the transverter is operated at this time as hereinbefore described.

Figure 10:
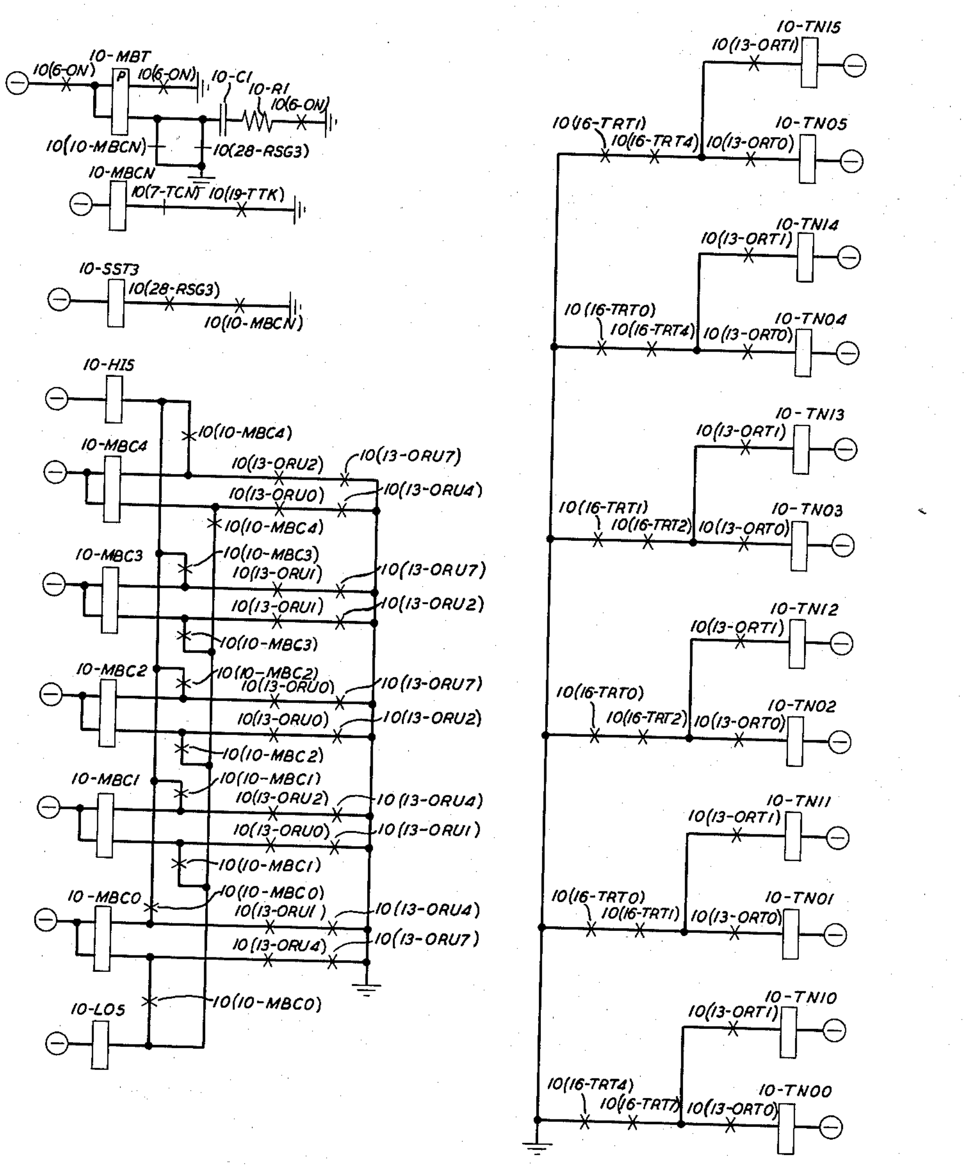

The third translation is omitted because none of relays 10–TN00 through 10–TN05 and 10–TN10 through 10–TN15 can operate when the tens digit of the terminating rate treatment is a 9. As may be observed from a study of the operation paths for these relays on the right-hand side of Fig. 10, they can be operated only when the tens digit of the terminating rate has a value of 0 through 5. This non-operation of one of these relays prevents the operation of relay 28–RSG3 which controls the initiation of the third translation, since the operation path of relay 28–RSG3 includes the make contacts shown on Fig. 21 of one of relays 10–TN00 through 10–TN05 and 10–TN10 through 10–TN15, one of which must be operated in order that relay 28–RSG3 can operate.

Since relays 4–PRL and 4–VTC in the transverter are now operated as before described, the transverter now releases the billing indexer and signals the sender that the call should be completed to the vacant terminating code intercept route. No AMA tape record is made.

This feature does not apply to calls to toll statement areas not arranged for diversion of free calls since the terminating code translation is not provided for such areas.

3.4 *Denied terminating ABX codes*

It is possible that one or more areas may have certain offices to which calls cannot be completed on a wholly automatic basis due to certain peculiarities of these offices. For example, there are certain step-by-step offices having party lines in which the fourth numerical of the called subscriber number is used for ringing and for distinguishing the various parties on the line. Calls of this type should be handled only by operators and should not be dialed by the calling subscriber. Facilities are provided herein to intercept calls of this type which are inadvertently dialed by the calling party since false charging might occur on calls to lines of this type if they were allowed to proceed to completion on an automatic basis. The billing indexer is arranged to recognize calls of this type and to route them to an intercept operator. Denied codes of this type, in areas arranged for bulk billing or diversion of free calls are arranged to provide a terminating rate treatment tens digit of 9 and a units digit of 1.

The terminating code 980 is represented by terminal 30–980 which is shown connected to terminal 30–01. It is assumed that this code is denied in all three areas. A jumper is connected to this terminal and selectively threaded through coils 22–A2, 22–A7, 23–B0, 23–B1, 24–C2, 24–C7, 25–D0, 25–D1, 26–E2, 26–E7, 27–F0, 27–F1, to terminal 28–02. The surge current through this jumper will fire the tubes associated with the above-enumerated coils which in turn will, depending upon which one of relays 5–TAR0, 1, or 2 is operated, cause the operation of relays 16–TRT2, 16–TRT7, 16–TRU0, and 16–TRU1 to represent a terminating rate treatment of 91.

These calls are similar in many respects to calls to vacant terminating ABX codes as described in section 3.3. Certain codes may be denied in only one or two areas. The jumpers are run accordingly.

Relay 19–TTK operates as hereinbefore described and closes a path from ground through make contacts 4(19–TTK), 4(7–VTC1), 4(16–TRU0), 4(16–TRU1), break contacts 4(2–FAC), make contacts 4(1–IC0) to the winding of relay 4–DNC in the transverter to operate it. The operation of this relay causes the transverter to signal the sender that the call should be completed to the denied terminating cone intercept operator.

3.5 *Reorder position*

As has been described in connection with bulk-billed areas, all terminals in the originating office code translator (Figs. 11 and 12) which represent vacant office codes and vacant office code and rate class combinations are cross-connected to terminal 12–VOC. Make contacts on relays 6–OA0, 1, 4, 7 and 6–OB0, 1, 4, 7 as shown in the lower left-hand corner of Fig. 11, apply a ground to terminal 11–08 in the event that an operator erroneously keys a 0 or a 1 in the A or B digit position of the originating code. The ground on terminal 11–08 is extended to terminal 12–VOC. A jumper is connected to terminal 12–VOC and is threaded only through coil 26–E4 and connected to terminal 28–01. The resulting surge of current through this jumper fires the tube associated with coil 26–E4, which, in turn, causes the operation of relay 15–ROP. The operation of relay 15–ROP closes a ground through make contacts 2(15–ROP) to the winding of relay 2–ROP1 to operate it. The operation of relay 15–ROP also extends the ground from terminal 18–01 through make contacts 18(15–ROP) to the winding of relay 18–OTK which now operates. This contact on relay 15–ROP effectively short-circuits the contacts on the other relays which normally would operate during the first translation. Since the jumper connected to terminal 12–VOC is only wired through coil 26–E4, the normal information is not derived during the first translation and therefore this short circuit path to operate relay 18–OTK is necessary. The path from terminal 18–01 to the winding of relay 18–OTK includes break contacts 18(8–ROPK) which is a check relay which checks to insure that none of the relays associated with any of the other coils except coil 26–E4 are operated at this time. The operation of the relay over which this circuit operates is shown in the upper right-hand corner of Fig. 8. As may be observed, the operation of any of relays 15–ECO–2, 15–ATO–2, 14–RG0, 1, 2, 4, 7; 14–OIN0, 1, 2, 4, 7; 13–ORU0, 1, 2, 4, 7; or 13–ORT0, 1 will cause relay 8–ROPK to operate. The operation of this relay would, by means of its break contacts 18(8–ROPK), prevent the operation of relay 18–OTK when make contacts 18(15–ROP) operate.

Another condition which will cause relay 2–ROP1 to operate occurs, as previously described, when a working code and rate class combination is registered and if a recorder group check failure or a match of calling and called codes on intra-area calls is detected.

In all of these cases in which relay 2–ROP1 operates, relay 2–PRL does not operate since the two are mutually exclusive. Relay 2–ROP1 operated indicates that an error was made in the reception of the originating code and ordinarily causes the CAMA operator to be recalled by operating relay 4–ROP in the transverter. This is accomplished by the closure of a path extending from ground through make contacts 4(5–GC), 4(18–OTK), 4(7–ABX), 4(2–ROP1), to the terminal 401. From this terminal a plurality of paths exists over which the ground thereon may be extended to operate relay 4–ROP in the transverter which, in turn, effects the necessary circuit actions to recall the operator.

In the event that the call is to be billed on the toll statement basis, the ground on terminal 401 is extended through make contacts 4(8–TS), break contacts 7(5–7DG), terminal 402, make contacts 4(6–OD), 4(1–IC0) to the winding of relay 4–ROP which now operates. In the event that the call is to be bulk-billed and that 7 digits were dialed, the ground is extended from terminal 401 through make contacts 7(5–7DG) to terminal 402 and then over the same path just described to operate relay 4–ROP.

In both of these examples of how relay 4–ROP in the transverter is operated, operation of the relay takes place immediately after the end of the first translation. The billing indexer is then released without making any further translations. As has already been described, the billing indexer is released immediately after the end of the first translation when relay TS operates since only one translation is made for calls billed on a toll statement basis. Only a single translation is made when relays 2–ROP1 and 5–7DG are both operated. The terminating rate information obtained on the second translation is derived in part from information obtained during the first translation. Since the operation of relays 2–ROP1 together with 5–7DG indicates that part of the information supplied to the billing indexer for the first translation is defective, any information derived therefrom would likewise be defective and therefore, there would be no point in proceeding with a second translation which is based, in part, on defective information, since any result derived therefrom would also be defective.

However, for 10 digit calls which are arranged for bulk billing or for diversion of free calls, as manifested by the operation of relay 8–BBFC instead of relay 8–TS, the second translation is made and the ground on terminal 401 is extended through make contacts 4(19–TTK), break contacts 4(7–VTC1), 4(8–TS), 4(5–7DG), to terminal 402 and then on to relay 4–ROP in a similar manner. The break contacts 4(7–VTC1) are in this path so that in the event the calling subscriber dials a vacant terminating code in error at the same time an error in the originating code operates relay 2–ROP1, he will not be connected to the reorder operator brought in by the operation of relay 4–ROP. There is no advantage in recalling the operator when a vacant or denied terminating code is dialed at the same time an originating code error is also made. If the originating error were corrected, the call would subsequently be routed to intercept because of the same terminating error and would have to be dialed again in any event. Therefore, it is desirable to check the terminating code when possible, and if it is of the vacant or denied type, to route the call to an intercept operator immediately and to disregard the reorder position signal. In this case, relay 4–ROP is not operated and the subscriber is connected to the intercept operator in a manner similar to that already described.

Figure 4:
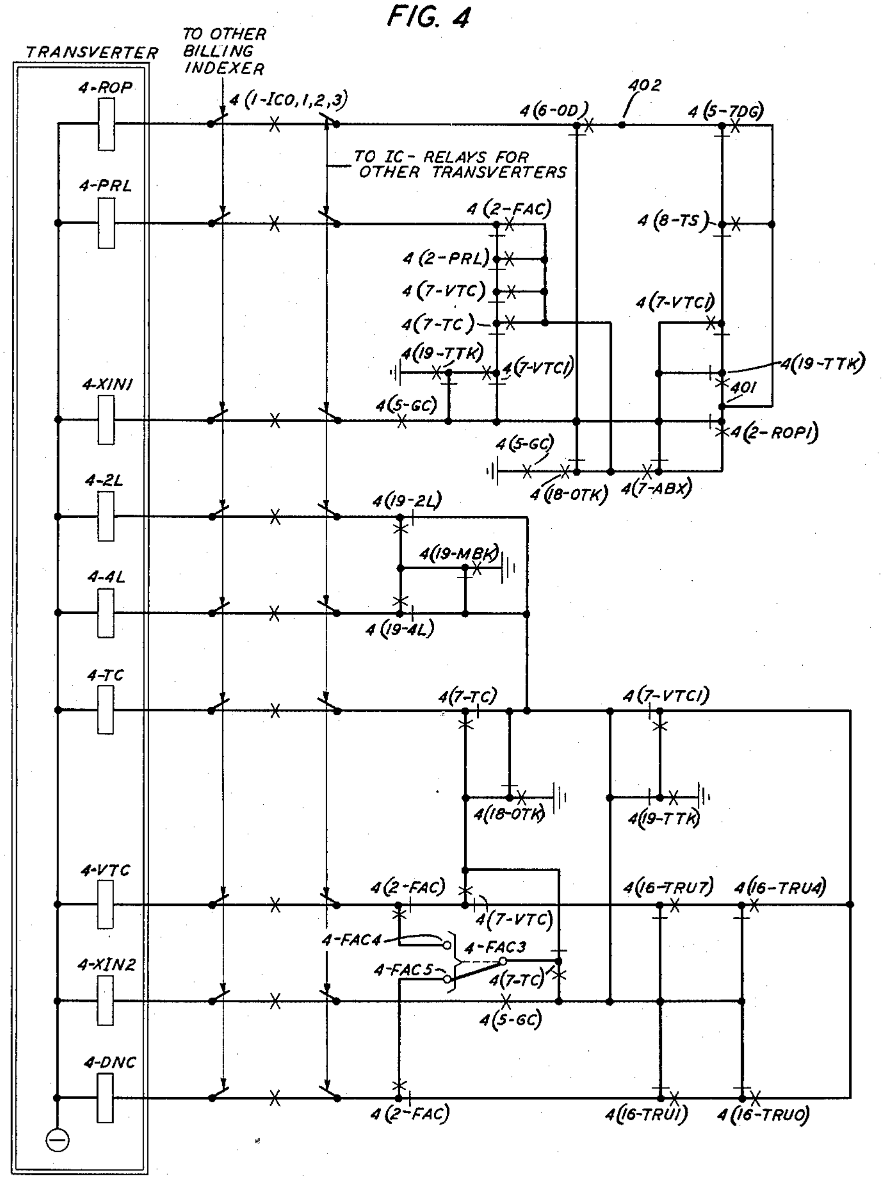
Figure 5:
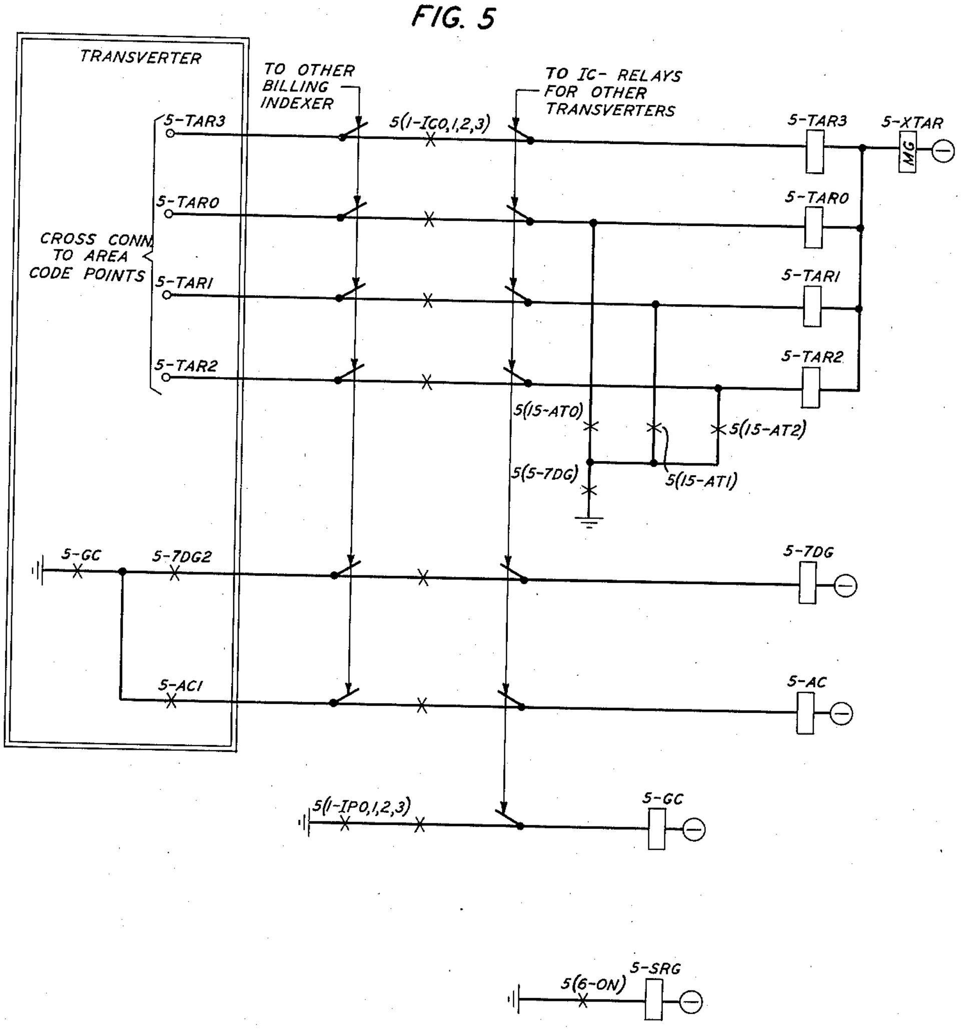

A recorder condition, as manifested by the operation of relay 2–ROP1, however, is disregarded if encountered on calls to test lines and test boards as manifested by the operation of relay 7–TC, since there is no charging involved for these calls. One of the trouble conditions causing the operation of relay 2–ROP1 is disregarded in the event that a toll code or an area code was dialed in the terminating office code position as indicated by the operation of relay 7–VTC. This is effectively done by the arrangement of relays 7–ABX and 7–VTC which are mutually exclusive with respect to one another insofar as their operating paths are concerned. Therefore, when relay 7–VTC is operated in response to the dialing of a toll code or an area code in the terminating office code position, the make contacts of relay 7–ABX as shown on sheet 4 are necessarily in a normal condition and, therefore, a ground cannot be completed through the make contacts of relay 2–ROP1 to get to terminal 401. In this event, a path is closed on Fig. 4 from ground on make contacts 4(5–GC), 4(18–OTK), 4(7–VTC), break contacts 4(2–PRL), 4(2–FAC), make contacts 4(1–IC0) to the winding of relay 4–PRL in the transverter which now operates. An additional path on Fig. 4 is also closed from ground on make contacts 4(18–OTK), 4(7–VTC), break contacts 4(2–FAC), make contacts 4(1–IC0) to the winding of relay 4–VTC in the transverter which now operates. The simultaneous operation of relay 4–VTC and 4–PRL in the transverter causes the transverter to route the call to an intercept operator.

The check for vacant and denied ABX codes is made only on 10 digit calls (relay 5–AC is being operated at this time) to areas arranged for bulk billing and/or diversion of free calls (relay 8–BBFC having operated in this event). On 7 digit calls the identity of the terminating area is obtained from the originating area information during the first translation by the operation of one of relays 15–AT0, 1, 2. The operation of relay 2–ROP1 indicates that the originating area information is either lacking or is incorrect. Therefore, in these cases, the check of the terminating code is omitted.

3.51 *Calls requiring ROP signal*

For 7 digit calls and calls to toll statement areas not arranged for diversion of free calls, the closure of make contacts 4(18–OTK) causes a ground from make contacts 4(5–GC) to be extended through make contacts 4(18–OTK), 4(7–ABX), 4(2–ROP1) operated and through make contacts 4(5–7DG) operated or make contacts 4(8–TS) with contacts 4(7–DG) normal to terminal 402 and then to relay 4–ROP in the transverter. The transverter releases the billing indexer and signals the sender to recall the CAMA operator for a second attempt. No tape record is made at this time. The second translation is not made because relay 5–AC is normal while relay 2–ROP1 is operated or because relay 8–BBFC is normal.

For 10 digit calls to areas arranged for bulk billing or for toll statement treatment with diversion of free calls, the second translation is made as relays 8–BBFC and 5–AC are operated. If the terminating code is a working code, relay 7–VTC1 does not operate. Upon the operation of relay 19–TTK, ground through make contacts 4(5–GC), 4(18–OTK), 4(7–ABX), 4(2–ROP1), 4(19–TTK), break contacts 4(7–VTC1), 4(8–TS), 4(5–7DG) is extended to terminal 402 and then over the path previously described to operate relay 4–ROP in the transverter causing it to function as above. The third translation is not made as the path to operate relay 28–RSG3 is open at the contacts of relay 2–ROP1.

3.52 *ROP signal disregarded*

Relay 7–VTC1 operates for 10 digit calls as in the above case if the terminating code is vacant or denied. This prevents the transmission of the ground to operate relay 4–ROP in the transverter and causes the relay 4–VTC or 4–DNC to be operated as before. Relay 4–PRL is operated with relays 19–TTK and 7–VTC1 operated and with relays 7–TC, 7–VTC, and 2–PRL normal.

Calls to test lines and test boards with a recall operator indication proceed as previously described through closure of ground to the lead to operate relay 4–TC in the transverter. The path to operate relay 4–PRL is closed with relay 5–GC, 18–OTK and 7–TC operated while relays 7–VTC and 2–PRL are normal.

If a toll code or area code is received in the terminating office code position, and a recall operator condition is detected, the lead to operate relay 4–VTC in the transverter is closed as before. The path to operate relay 4–ROP in the transverter is open since relay 7–ABX is normal. The path to operate relay 4–PRL is closed with relays 5–GC, 18–OTK and 7–VTC operated with relay 2–PRL normal. On calls which are identified automatically, relay 4–ROP is prevented from operating as relay 6–OD is normal. This results in a trouble record.

3.53 *False area code detection*

It is possible that a calling subscriber may erroneously dial his own area code when attempting to call a subscriber in a distant part of his own national area. Provision is made in the present invention to detect the presence of area codes on calls not requiring them and at the option of the telephone company to allow these calls to be completed in the normal manner or to route them to an intercept operator.

Assume, that a calling subscriber in area 0 erroneously dials his own area code when attempting to place a call to a called subscriber within his own area. In this case, ground on terminal 201 is extended through break contacts 2(5–7DG) (relay 5–7DG being normal when 10 digits are dialed), through make contacts 2(15–AT0) (the operation of relay 15–AT0 indicating that the originating area is 0), through make contacts 2(5–TAR0) (the operation of relay 5–TAR0 indicating that the terminating area is also 0) to terminal 2–FAC0. This terminal may, in turn, be cross-connected to terminal 2–FAC2 or 2–FAC1. In the event it is cross-connected to terminal 2–FAC1, a ground is extended through terminal 204 and then through the match check circuit to operate either relay 2–ROP1 or 2–PRL in the manner already described.

If, on the other hand, terminal 2–FAC0 is cross-connected to terminal 2–FAC2 as shown, the ground on terminal 2–FAC0 operates relay 2–FAC. The operation of relay 2–FAC extends a path from ground, to make contacts 4(18–OTK), break contacts 4(7–TC), to terminal 4–FAC3. The ground on this terminal may be cross-connected to either of terminals 4–FAC4 or 4–FAC5. Depending upon the cross-connection used, the ground on terminal 4–FAC3 is extended through one of terminals 4–FAC4 or 4–FAC5 through make contacts 4(2–FAC) to operate either relay 4–VTC or 4–DNC in the transverter. The operation of either of these relays causes the transverter to route the call to an intercept operator.

Relay 2–FAC does not operate on reorder conditions caused by vacant code or recorder group check failure. Calls to test lines or test boards will allow relay 2–FAC to operate without any further effect.

4 *Trouble conditions*

4.1 *Cross check of transmitting leads*

Figure 3:
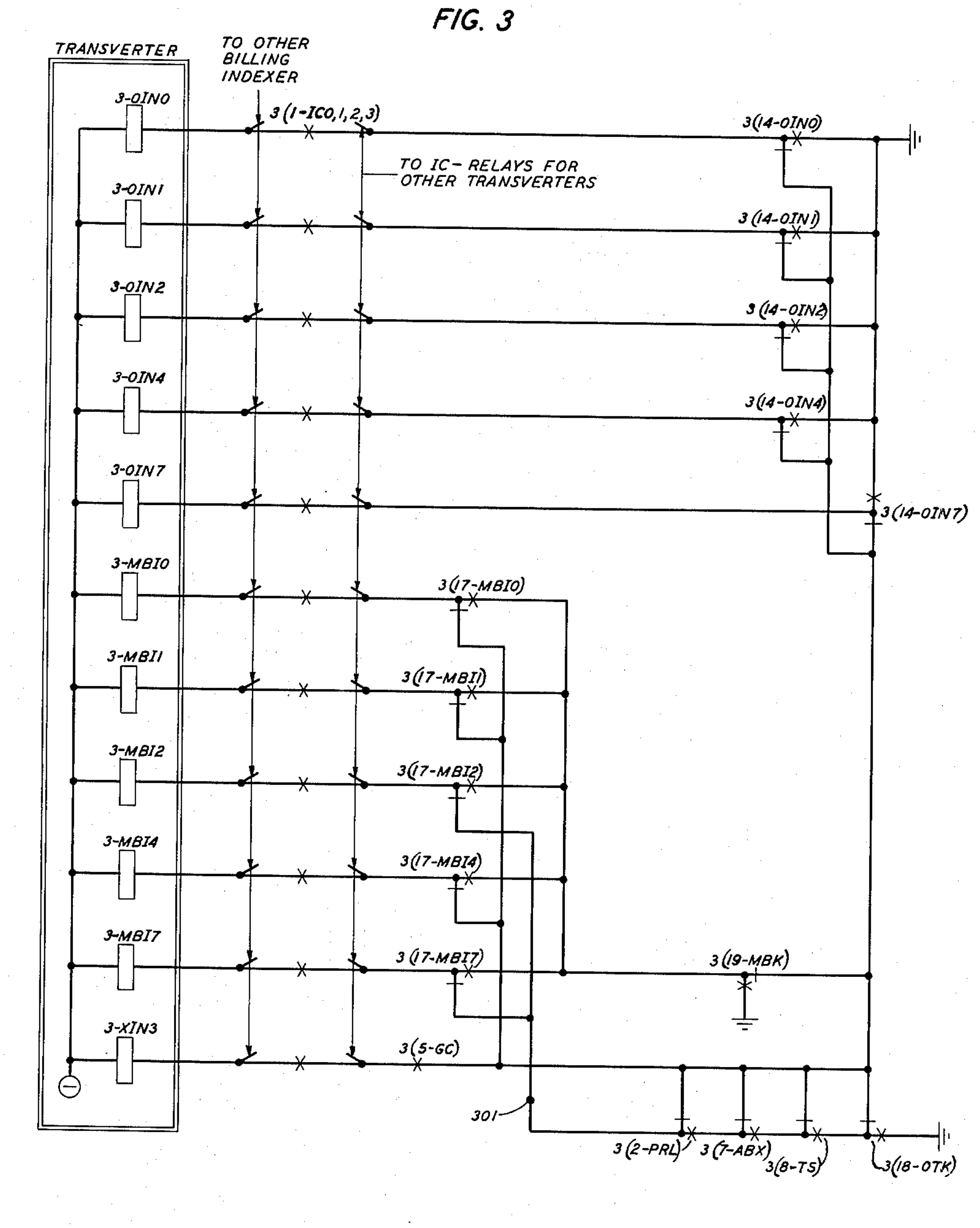

The leads to the transverter relays shown on Figs. 3 and 4 are connected through normal contacts of the billing indexer relays which control them to the leads leading to one of relays 4–XIN1, 4–XIN2, or 3–XIN3 in the transverter. A false ground on any of these leads or on any part of the associated wiring would operate one of these three relays. This cross check is maintained from the time the billing indexer is seized until a particular lead is grounded during the progress of a call as previously described. Operation of one of these three relays causes the transverter to prevent release of the billing indexer and to call for a trouble record to be made.

4.2 *Call fails to complete*

Timing circuits are provided in the transverter to cover the operation of the billing indexer. If the billing indexer does not complete its functions within the allowed time, the transverter calls for a trouble record. Conditions which may cause such a failure include open check paths for relays 18–OTK, 19–TTK and 19–MBK due to too many or too few coil output register or control relays operated, open paths which prevent the advance of the circuit or a return of the required information, etc.

4.3 *Circuit fails to release*

Figure 9:
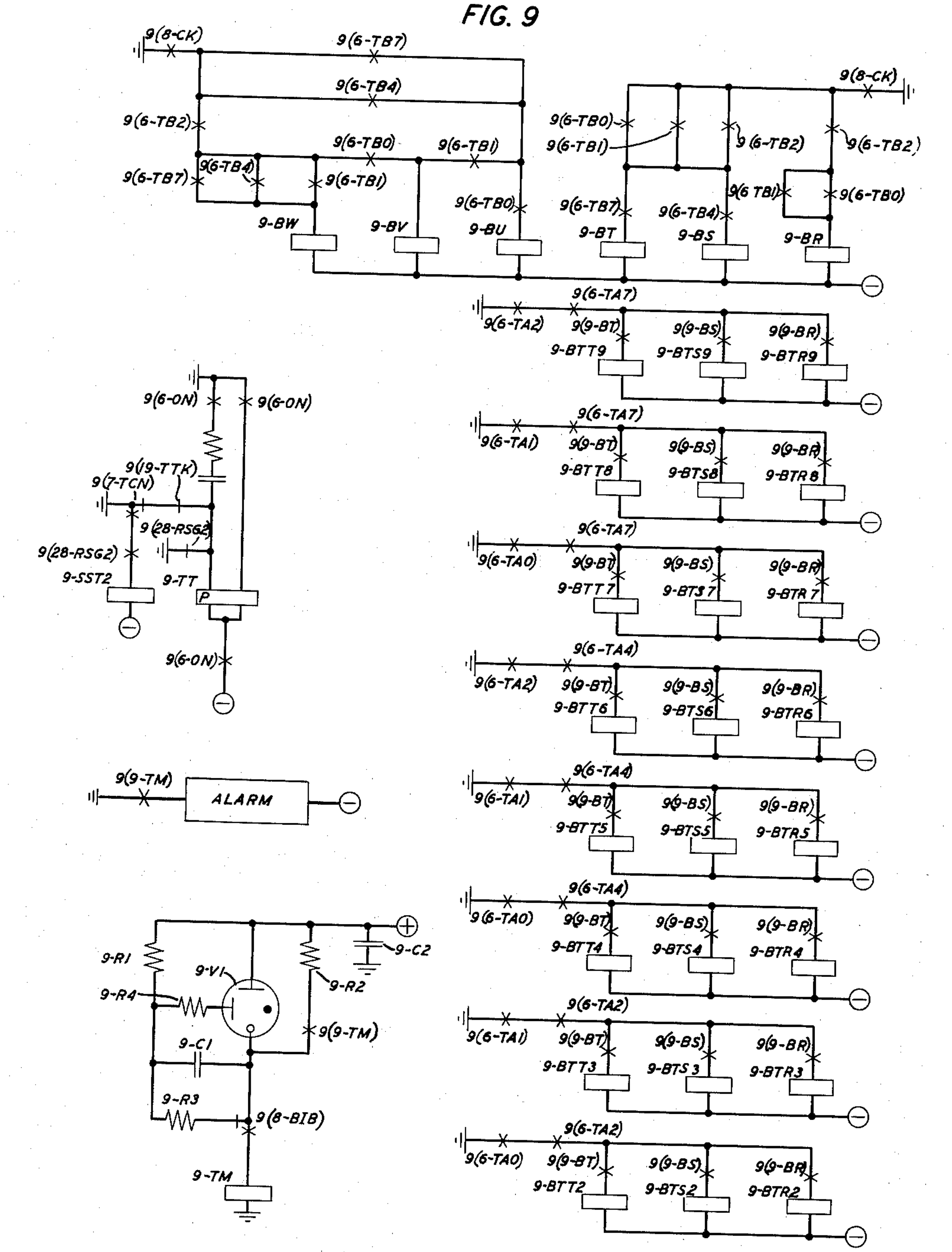

Relay 8–BIB is held operated by the make contacts on a number of relays to insure the release of these relays before the release of the billing indexer and its seizure for another call. With this arrangement, relay 8–BIB might be held permanently due to a circuit defect thereby permanently holding the billing indexer in a busy condition and keeping it out of service. The timer circuit comprising relay 9–TM is provided to respond to and give an alarm in the event of such a condition. The circuit for this relay comprising tube 9–V1 is started when relay 8–BIB operates and condenser 9–C1 begins to charge to a positive potential through resistor 9–R1. However, the billing indexer has usually finished its function and restored to normal long before condenser 9–C1 has had sufficient time to charge to a potential which would enable the start anode of tube 9–V1 to fire. If, however, the circuit does not release within approximately 6 to 12 seconds, the tube 9–V1 fires, operates relay 9–TM which closes a circuit through make contacts 9(9–TM) to sound the alarm shown diagrammatically on Fig. 9.

Following is a chart which lists in its first column each relay disclosed in the accompanying drawings. The second column states in what section of the description each relay contained in the first column is first mentioned and described. The third column contains a brief comment which describes the function performed by each relay when it operates. It is believed that this information will be useful to the reader in an application of this size in the event that he desires to refresh his recollection concerning the function of any relay, or in case he wishes to review the section in which it is first described.

| Relay | Operation First Described in Section | Function Performed by Relay |
|---|---|---|
| 1-IP0, 1, 2, 3 | 1.01 | These relays are connected to form a preference circuit which insures that only one transverter can seize a billing indexer at any one time. |
| 1-IC0, 1, 2, 3 | 1.01 | These relays are connector type relays and have a large number of contacts which close to interconnect the billing indexer with the transverter which has just seized the billing indexer. The closure of the contacts on any one of these relays closes the paths over which the transverter sends information to the billing indexer and over which the billing indexer transmits its output information to the transverter. |
| 1-IB0, 1, 2, 3 | 1.01 | Three out of four of these relays operate whenever the billing indexer is busy. The one of these relays which is associated with the transverter which seized the billing indexer does not operate The three relays which operate close a path whereby any later operating transverters will attempt to seize the second rather than the first billing indexer. |
| 2-RGA | 1.075 | The operation of this relay indicates a partial match check between the recorder group number as obtained from the first translation and the recorder group number as obtained from the sender. |
| 2-FAC | 1.076 also see 3.53 | The operation of this relay indicates a false area code, i.e., that the calling subscriber erroneously dialed his own national area code when trying to complete a call to a subscriber located within the same national area. |
| 2-ROP1 | 1.076 | The operation of this relay indicates a match between the calling and called office codes and initiates circuit operations to recall an operator. It is also operated for vacant originating codes. |
| 2-PRL | 1.076 | The operation of this relay indicates that the calling and called office codes do not match and that the CAMA operator's position may be released. |
| 3-OIN0, 1, 2, 4, 7 | 1.072 | These relays, which are in the transverter, are operated by the billing indexer to register the office index digit in 2 out of 5 code form. |
| 3-MBI0, 1, 2, 4, 7 | 1.112 | These relays, which are in the transverter, are operated in a 2 out of 5 code by the billing indexer to register the message billing index. |
| 3-XIN3 | 4.1 | This relay is used for checking purposes to check for false grounds or shorts in the transmitting leads between the transverter and billing indexer. |
| 4-PRL | 1.079 | This relay is in the transverter and is operated by the billing indexer when the CAMA operator position is to be released. |
| 4-2L | 1.112 | This relay, which is in the transverter, is operated by the billing indexer as a signal that a two-line initial entry is to be perforated. |
| 4-4L | 1.112 | This relay, which is in the transverter, is operated by the billing indexer as a signal that a four-line initial entry is to be perforated. |
| 4-TC | 3.1 | This relay, which is in the transverter, is operated by the billing indexer to signify a call to a test line or a test board. |
| 4-VTC | 3.2 | This relay, which is in the transverter, is operated by the billing indexer to signify that a toll code or a national area code was dialed in error in the terminating office code position on 10 digit calls, or that a vacant ABX code was dialed. |
| 4-DNC | 3.4 | This relay, which is in the transverter, is operated by the billing indexer to signify that a denied terminating office code had been dialed. |
| 4-ROP | 3.5 | This relay which is in the transverter, is operated by the billing indexer when the CAMA operator is to be recalled. |
| 4-XIN1, 2 | 4.1 | These relays are used for checkin purposes to check for false grounds or shorts in the transmitting leads between the transverter and billing indexer. |
| 5-GC | 1.01 | The operation of this relay supplies a number of grounds to other parts of the billing indexer. |
| 5-7DG | 1.02 | This relay is operated by the transverter to indicate a 7 digit call. |
| 5-AC | 1.02 | This relay is operated by the transverter to indicate that the subscriber dialed ten digits for an area code call. |
| 5-TAR0, 1, 2, 3 | 1.03 | One of these relays is operated on each call to indicate whether the called subscriber is located within one of local areas 0, 1 or 2 or whether he is located within some other national area as manifested by the operation of relay 5-TAR3. |
| 5-SRG | 1.01 | This relay is used for maintenance purposes and provides a means of separating the grounds where a large number of wires are connected to one point. |
| 5-XTAR | 1.03 | This relay is of the marginal type and operates only when, due to a circuit defect, two or more of relays 5-TAR0 through 5-TAR3 are operated simultaneously. |
| 6-BI, 1, 2 | 1.01 | These relays are in the transverter and represent billing indexers 1 and 2, respectively. The operation of one of these relays indicates to the transverter that it has successfully seized the billing indexer represented thereby. |
| 6-ON | 1.01 | The operation of this relay indicates an off-normal condition of the billing indexer and during this time the relay supplies a large number of holding grounds to various parts of the circuit. |
| 6-OA0, 1, 2, 4, 7 | 1.02 | These relays are selectively operated by signals from the transverter to store in 2 out of 5 code form the A digit of the originating office code. |
| 6-OB0, 1, 2, 4, 7 | 1.02 | These relays are operated in a 2 out of 5 code to store the B digit of the originating office code. |
| 6-OC0, 1, 2, 4, 7 | 1.02 | These relays are operated in a 2 out of 5 code to store the C digit of the originating office code. |
| 6-OAR0, 1, 2 | 1.02 | These three relays represent the three areas served by the CAMA office on an originating basis. One of these relays is operated on each call to indicate in which one of the three possible areas the calling office is located. |
| 6-ORC0, 1, 2 | 1.02 | These relays represent rate class information. One of these is operated on each call to indicate the rate class. |
| 3-TA0, 1, 2, 4, 7 | 1.02 | These relays are operated in a 2 out of 5 code to represent the A digit of the called office code. On 7 digit calls the signals to operate these relays come from the transverter, while on area code calls the signals come from the sender. |
| 6-TB0, 1, 2, 4, 7 | 1.02 | These relays are operable in a 2 out of 5 code to represent the B digit of the called office code. These relays are operated by the transverter on a 7 digit call and by the sender on a 10 digit call. |
| 6-TC0, 1, 2, 4, 7 | 1.02 | These relays are operable to represent in a 2 out of 5 code form the C digit of the called office code. These relays are operated by the transverter on a 7 digit call and by the sender on a 10 digit area code call. |
| 6-AD | 1.02 | This relay is operated by the transverter to indicate a call for which the calling number is automatically identified. |
| 6-OD | 1.02 | This relay is operated by the transverter to indicate a call for which the calling number is to be ascertained by the operator. |
| 7-ABX | 1.04 | The operation of this relay indicates that the A and B digits of the terminating office code are in the series of digits used for central office designations (220-299, 320-399, etc.). |
| 7-TC | 1.04 | The operation of this relay indicates that the A and B digits received for the terminating office code represent calls to test lines or test boards. |
| 7-VTC | 1.04 | The operation of this relay indicates that a toll code (0XX or 1XX) or an area code (X0X or X1X) was dialed in error in the terminating office code position. |
| 7-B2 . . . 7-B9 | 1.05 | One of these relays is operated on every call to represent in decimal form the value of the B digit of the originating office code. |

| Relay | Operation First Described in Section | Function Performed by Relay |
|---|---|---|
| 7-CA . . . 7-CE | 1.05 | These relays are used in the originating code translation. Each relay represents two different possible values for the C digit of the originating office code. |
| 7-SST1 | 1.07 | The operation of this relay causes the surge current to be sent through the coil jumper used during the first translation. |
| T-OT | 1.079 | This relay comprises the timer for the originating code translation. It operates after all circuits involved in this translation have had time to operate and perform their designated functions. |
| 7-OCN | 1.01 | This relay connects the register relays that are used on the first translation with the gas tubes. |
| 7-TCN | 1.09 | This relay interconnects the register relays used in the terminating code translation with the gas tubes. |
| 7-VTC1 | 1.09 | This relay operates when a vacant or denied terminating office code is dialed by the subscriber. |
| 8-BIB | 1.01 | The operation of this relay indicates that the billing indexer has been seized and that it is busy. In its operated position it supplies certain operating potentials to circuits on Fig. 1 to prevent a later operating transverter from seizing the billing indexer during the time in which it is busy. |
| 8-CK | 1.04 | This relay is wired in a check circuit which allows the relay to operate only in the event that the originating and terminating office codes have been entered into the register relays of Fig. 6 in a plausible form (2 out of 5 code form). |
| 8-BBFC | 1.03 | The operation of this relay indicates that the call is to be billed on a bulk basis, or on a toll statement basis with free call diversion. |
| 8-TS | 1.03 | The operation of this relay indicates that the call is to be billed on a toll statement basis, without diversion of free calls. |
| 8-ROPK | 1.079 | This is a check relay and operates whenever any one of the relays used in the first translation operates. If relay 15-ROP operates, this relay should not. |
| 9-BR, 9-BS . . . 9-BW. | 1.08 | These relays are operated two at a time to represent the B digit of the terminating office code. |
| 9-BTR2 . . . 9<br>9-BTS2 . . . 9<br>9-BTT2 . . . 9 | 1.08 | These relays are used in the terminating code translator. The numerical suffix following each relay represents the translated value of the A digit of the terminating code while the alphabetical designation of the relay represents a partial translation of the B digit. |
| 9-TT | 1.09 | This relay comprises the timer for the terminating code translation and operates after all circuits involved therein have had sufficient time to operate and perform their functions. |
| 9-SST2 | 1.09 | This relay is operated during the terminating office code translation to send the surge current through the jumper used at this time. |
| 9-TM | 4.3 | This relay is associated with a timer circuit which operates and sounds an alarm in the event that the billing indexer takes more than the normal amount of time to complete its function on a call. |
| 10-MBC0, 1, 2, 3, 4 | 1.10 | These relays are connector relays for the third translation. One relay is operated on each call to connect the register relays of Fig. 16 with the output of the desired one of the five coil fields which are used on this translation. These relays represent the originating rate treatment units digits of 0 to 4 and 5 to 9, respectively. |
| 10-LO5<br>10-HI5 | 1.10 | These relays are used in combination with relays 10-MBC0, 1, 2, 3, 4 to uniquely determine the value of the originating rate treatment units digits. Relay 10-LO5 is operated in combination with one of the other relays when the units digit is from 0 to 4 while relay 10-HI5 is operated in combination with one of the other relays when the units digit has a value of from 5 to 9. |

| Relay | Operation First Described in Section | Function Performed by Relay |
|---|---|---|
| 10-TN00 . . . 05<br>10-TN10 . . . 15 | 1.10 | These relays are used in the third translation and represent the different combinations of the tens digits of the terminating and originating rate treatments. For example, relay 10-TN10 represents an originating rate treatment tens digit of 1 and a terminating rate treatment tens digit of 0. |
| 10-MBCN | 1.11 | This relay is operated on the third translation to close a path to interconnect the register relays of Fig. 17 with the output of the coil field which is used on this translation. |
| 10-MBT | 1.11 | This relay comprises part of the timer circuit for the third translation and operates after all the relays used therein have had ample time to operate and perform their designated functions. |
| 10-SST3 | 1.11 | This relay operates during the third translation and causes the surge current to be sent over the jumper used in this translation. |
| 13-ORT0, 1 | 1.071 | One of these relays is operated on every call to record the originating rate treatment tens digit of either a 0 or a 1. |
| 13-ORU0, 1, 2, 4, 7 | 1.071 | These relays are operated in a 2 out of 5 code on every call to record the units digit of the originating rate treatment. |
| 14-OIN0, 1, 2, 4, 7 | 1.072 | These relays store the originating office index in 2 out of 5 code form. |
| 14-RG0, 1, 2, 4, 7 | 1.075 | These relays operate in a 2 out of 5 code form to identify the recorder group number. |
| 15-AT0, 1, 2 | 1.073 | The operated one of these relays indicates the area transfer digit which in turn identifies the originating area. |
| 15-ROP | 1.079 | This relay is operated from coil 26-E4 through which is threaded the jumper connected to all vacant originating office codes. |
| 15-EC0, 1, 2 | 1.07 | The operated one of these relays indicates the entry combination digit for the call. |
| 16-TRT0, 1, 2, 4, 7 | 1.09 | These relays are operated during the terminating office code translation to represent in a 2 out of 5 code form the tens digit of the terminating rate treatment. |
| 16-TRU0, 1, 2, 4, 7 | 1.09 | These relays are operated during the terminating office code translation to represent in a 2 out of 5 code form the units digit of the terminating rate treatment. |
| 17-MBI0, 1, 2, 4, 7 | 1.11 | These relays are used during the third translation to store in a 2 out of 5 code the message billing index. |
| 18-OTK | 1.079 | The operation of this relay indicates that the proper number of relays in each set of the register relays involved in the originating code translation are operated. |
| 19-TTK | 1.09 | This relay is used in the terminating office code translation and operates when all the relays used in this translation have operated in a plausible combination. |
| 19-2L | 1.112 | This relay operates after the third translation to signal the transverter that a two-line initial entry is to be perforated. |
| 19-4L | 1.112 | This relay operates at the end of the third translation to signal the transverter that a four-line initial entry is to be perforated. |
| 19-MBK | 1.112 | This relay operates at the end of the third translation providing that the message billing index register relays shown on Fig. 17 have operated in a plausible combination and providing that one of relays 19-2L, 19-4L and 19-EK have operated. |
| 19-EK | 1.112 | This is a check relay and operates if the billing index is 0 or 9 to complete a path for the operation of relay 19-MBK, the message billing index check relay. |
| 28-RSG1 | 1.07 | The relay is connected to all the jumpers which are used in the first translation. In operating, it performs a number of functions one of which is to cause a heavy surge current to flow through the selected jumper used during the first translation. |
| 28-RSG2 | 1.09 | This relay operates when the path for the terminating office code translation is closed. |
| 28-RSG3 | 1.11 | This relay operates when the path for the third translation is closed. |

It is to be understood that the above-described arrangements are but illustrative of the application of the principles of the invention. Numerous other arrangements may be devised by those skilled in the art without departing from the spirit and scope of the invention.

What is claimed is:

1. In combination, a first means for recording a plurality of simultaneously received items of input information requiring translation, other recording means for recording a plurality of items of translated information, a translator, means to operate said translator successively under the control of said first recording means to translate said simultaneously received items of input information, means under the control of said translator to operate said other recording means successively to record the translated information, and means operable under the control of said other recording means after the first operation of said translator to determine whether a succeeding translation is to be made.

2. In combination, a first means for recording a plurality of simultaneously received items of input information requiring translation, other recording means for recording a plurality of items of translated information, an inductive translator, means to operate said inductive translator successively under the control of said first recording means to translate said simultaneously received items of input information, means under the control of said inductive translator to operate said other recording means successively to record the translated information, and means operable under the control of said other recording means after the first operation of said translator to determine whether a succeeding translation is to be made.

3. In combination, a first means for recording a plurality of simultaneously received items of input information requiring translation, other recording means for recording a plurality of items of translated information, a translator, means to cause said translator to make a first and a second translation under the control of said first recording means to translate said simultaneously received items of input information, means under the control of said translator to operate said other recording means successively to record the translated information, means under control of said other recording means to cause said translator to make a third translation, and means responsive to the receipt of defective information by said first recording means whereby said translator is prevented from making a third translation.

4. In combination, a first means for recording a plurality of simultaneously received items of input information requiring translation, other recording means for recording a plurality of items of translation information, a translator, means to cause said translator to make a first and a second translation under the control of said first recording means to translate said simultaneously received items of input information, means under the control of said translator to operate said other recording means successively to record the translated information, means operable under the control of said other recording means to determine whether a succeeding translation is to be made, and means including said last-named means operable upon the receipt of defective information during the first translation to prevent a succeeding translation from being made.

5. In combination, a first means for recording a plurality of simultaneously received items of input information requiring translation, other recording means for recording a plurality of items of translated information, a translator, means to cause said translator to make a first and a second translation under the control of said first recording means to translate said simultaneously received items of input information, means under the control of said translator to operate said other recording means successively to record the translated information, means operable under the control of said other recording means to determine whether a succeeding translation is to be made, and means including said other recording means operable upon the receipt of defective information during the second translation to prevent a succeeding translation from being made.

6. In a billing indexer for deriving billing data pertaining to a telephone call in response to the receipt of information pertaining to said call, a translator having an input and an output, means for first impressing information pertaining to the calling office for said call on the input of said translator, means operated by said translator in response to the receipt of said information to register derived data pertaining to said calling office, means for impressing information pertaining to the called office for said call on the input of said translator, means operated by said translator in response to the receipt of said called office information to register derived data pertaining to said called office, means for impressing said derived data pertaining to the calling and called offices on the input of said translator, and means operated by said translator in response to the receipt of said last-named data to derive further information pertaining to said call.

7. In a billing indexer for deriving billing data pertaining to a telephone call in response to the receipt of information pertaining to said call, a translator having an input and an output, means for first impressing information pertaining to the calling office for said call on the input of said translator, means operated by said translator in response to the receipt of said information to register derived data pertaining to said calling office, means for impressing information pertaining to the called office for said call on the input of said translator means operated by said translator in response to the receipt of said called office information to register derived data pertaining to said called office, means for impressing said derived data pertaining to the calling and called offices on the input of said translator, means operated by said translator in response to the receipt of said last-named data to derive further information pertaining to said call, and means operable under the control of the translator at the end of each of the first two translations to determine whether a succeeding translation is to be made.

8. In a billing indexer for deriving billing data pertaining to a telephone call in response to the receipt of information pertaining to said call, a translator having an input and an output, means for first impressing information pertaining to the calling office for said call on the input of said translator, means operated by said translator in response to the receipt of said information to register derived data pertaining to said calling office, means for impressing information pertaining to the called office for said call on the input of said translator, means operated by said translator in response to the receipt of said called office information to register derived data pertaining to said called office, means for impressing said derived data pertaining to said calling and called offices on the input of said translator, means operated by said translator in response to the receipt of said last-named data to derive certain billing information pertaining to said call, and means responsive to the receipt of defective information pertaining to the calling office whereby the translator is prevented from making further translations for said call.

9. In a billing indexer for deriving billing data pertaining to a telephone call in response to the receipt of information pertaining to said call, a translator having an input and an output, means for first impressing information pertaining to the calling office for said call on the input of said translator, means operated by said translator in response to the receipt of said calling office information to register derived data pertaining to said calling office, means for impressing information pertaining to the called office for said call on the input of said translator, means operated by said translator in response to the receipt of said called office information to register derived data pertaining to said called office, means for impressing said derived data pertaining to said calling and called offices on the input of said translator, means operated by said translator in response to the receipt of said last-named data to derive billing information pertaining to said call, and means responsive to the receipt of defective information pertaining to the called office whereby the translator is prevented from making a further translation for said call.

10. In a billing indexer for deriving billing data pertaining to telephone calls in response to the receipt of information regarding said calls, a translator comprising a plurality of induction coils each of which has a pair of output terminals, a first group of conductors each of which is selectively threaded through said coils and each of which represents a unique combination of a calling office code and billing characteristics, means responsive to the receipt of information pertaining to a call for causing a surge of current to flow through the one conductor in said first group which represents the calling office for said call together with the billing characteristics for said call, an output potential being impressed on the output terminals of each coil through which said last-named conductor is threaded in response to said surge current flowing therethrough, means responsive to the potential appearing on the outputs of said coils to register derived calling office billing information, a second group of conductors each of which is selectively threaded through said coils and each of which represents a different called office code, means responsive to the receipt of information pertaining to said call for causing a surge of current to flow through the one conductor in said second group which represents the called office for said call, an output potential being impressed across the output terminals of each coil through which said last-named conductor is threaded, means responsive to said last-named output potentials appearing on said coils for registering derived billing information pertaining to said called office, a third group of conductors each of which is selectively threaded through said coils and each of which represents a unique combination of derived billing information pertaining to said calling and called offices, means responsive to the registration of said derived billing information pertaining to said calling and called offices to cause a surge of current to flow through the one conductor in said third group which represents the particular combination of derived billing data pertaining to the calling and called offices for said call, an output potential being impressed across the output terminals of said coils in response to the last-named surge of current therethrough, and means responsive to said last-named output potentials to register desired billing information pertaining to said call.

11. In combination, an inductive translator having a coil field comprising a plurality of coils through which are selectively threaded a plurality of conductors, means for impressing a surge of current on a first one of said conductors, means respnosive to the surge of current over said first conductor to register derived data, means operable upon the end of said registration for impressing a surge of current on a second one of said conductors, means responsive to the surge of current on the second one of said conductors to register other derived data, means responsive to the registration of said data to cause a surge of current to flow through a third one of said conductors, and means responsive to the surge of current through said third one of said conductors to register additional derived data.

12. In combination, an inductive translator having a coil field comprising a plurality of coils through which are selectively threaded a plurality of conductors, means for impressing a surge of current on a first one of said conductors, means responsive to the surge of current over said first conductor to register derived data, means operable upon said registration for impressing a surge of current on a second one of said conductors, means responsive to the surge of current on the second one of said conductors to register other derived data, means responsive to the registration of said data to cause a surge of current to flow through a third one of said conductors, means responsive to the surge of current through said third one of said conductors to register additional derived data, and means operable under control of said first two named registrations to determine whether a succeeding translation is to be made.

13. In combination, an inductive translator having a coil field comprising a plurality of coils through which are selectively threaded a plurality of conductors, means for impressing a surge of current on a first one of said conductors, means responsive to the surge of current over said first conductor to register derived data, means operable upon said registration for impressing a surge of current on a second one of said conductors, means responsive to the surge of current on the second one of said conductors to register other derived data, means responsive to the registration of said data to cause a surge of current to flow through a third one of said conductors, means responsive to the surge of current through said third one of said conductors to register additional derived data, and means operable upon the registration of defective data following the first-named translation to prevent any succeeding translations from being made.

14. In combination, an inductive translator having a coil field comprising a plurality of coils through which are selectively threaded a plurality of conductors, means for impressing a surge of current on a first one of said conductors, means responsive to the surge of current over said first conductor to register derived data, means operable upon said registration for impressing a surge of current on a second one of said conductors, means responsive to the surge of current on the second one of said conductors to register other derived data, means responsive to the registration of said data to cause a surge of current to flow through a third one of said conductors, means responsive to the surge of current through said third one of said conductors to register additional derived data, and means operable upon the registration of defective data following either of said first two named translations to prevent a succeeding translation from being made.

15. In a billing indexer for receiving a plurality of items of input information requiring translation, recording means for recording a plurality of items of translated information, a translator, means to cause said translator to make a first and a second translation upon the receipt of said items of input information, means under the control of said translator to operate said recording means successively to record items of translated information, means operable under control of said recording means for causing said translator to make a third translation, means operable under the control of said recording means to determine whether a succeeding translation is to be made, and means including said other recording means operable upon the receipt of defective information during the second translation to prevent a succeeding translation from being made.

16. In a billing indexer for receiving a plurality of items of input information requiring translation, recording means for recording a plurality of items of translated information, a translator, means to cause said translator to make a first and a second translation upon the receipt of said items of input information, means under the control of said translator to operate said recording means successively to record items of translated information, means operable under the control of said recording means to determine whether a succeeding translation is to be made, and means including said last-named means operable upon the receipt of defective information during the first translation to prevent a succeeding translation from being made.

17. In a billing indexer for receiving a plurality of items of input information requiring translation, recording means for recording a plurality of items of translated information, a translator, means to cause said translator to make a first and a second translation upon the receipt of said items of input information, means under the control of said translator to operate said recording means successively to record items of translated information, means under control of said recording means for causing said translator to make a third translation, and means responsive to the receipt of defective information by said translator for the second translation whereby it prevents a third translation from being made.

18. In a billing indexer for simultaneously receiving a plurality of items of input information requiring translation, recording means for recording a plurality of items of translated information, an inductive translator, means to operate said inductive translator successively upon the receipt of said simultaneously received items of input information, means under the control of said inductive translator to operate said recording means successively to record items of translated information, and means under the control of said recording means after the first and second operation of said translator to determine whether a succeeding translation is to be made.

19. In a billing indexer for simultaneously receiving a plurality of items of input information requiring translation, recording means for recording a plurality of items of translated information, a translator, means to operate said translator successively upon the receipt of said simultaneously received items of input information, means under the control of said translator to operate said recording means successively to record items of translated information, and means operable under the control of said recording means after the first operation of said translator to determine whether a succeeding translation is to be made.

References Cited in the file of this patent

UNITED STATES PATENTS

| | | |
|---|---|---|
| 2,297,365 | Ostline | Sept. 29, 1942 |
| 2,631,195 | Ostline | Mar. 10, 1953 |
| 2,843,838 | Abbott | July 15, 1958 |
| 2,851,534 | Bray et al. | Sept. 9, 1958 |